(12) United States Patent
Abraham et al.

(10) Patent No.: US 10,409,083 B2
(45) Date of Patent: Sep. 10, 2019

(54) STRUCTURED LIGHT PROJECTION AND IMAGING

(71) Applicant: MANTISVISION LTD., Petach Tikva (IL)

(72) Inventors: Martin Abraham, Hod Hasharon (IL); Eyal Gordon, Haifa (IL)

(*) Notice: Subject to any disclaimer, the term of this patent is extended or adjusted under 35 U.S.C. 154(b) by 725 days.

(21) Appl. No.: 14/823,008

(22) Filed: Aug. 11, 2015

(65) Prior Publication Data
US 2016/0223828 A1 Aug. 4, 2016

Related U.S. Application Data

(60) Provisional application No. 62/036,158, filed on Aug. 12, 2014.

(51) Int. Cl.
*G01C 3/08* (2006.01)
*G02B 27/42* (2006.01)
(Continued)

(52) U.S. Cl.
CPC ...... *G02B 27/4233* (2013.01); *G01B 11/2513* (2013.01); *G01C 3/02* (2013.01);
(Continued)

(58) Field of Classification Search
CPC ............ G02B 27/4233; G02B 27/0037; G02B 27/09; H04N 13/254; H04N 5/332;
(Continued)

(56) References Cited

U.S. PATENT DOCUMENTS 4,175,662 A 11/1979 Zold
8,090,194 B2 * 1/2012 Golrdon ............ G01B 11/2513
382/154
(Continued)

FOREIGN PATENT DOCUMENTS

CN 106796661 A 5/2017
WO WO 2008/062407 A2 5/2008
(Continued)

OTHER PUBLICATIONS

PCT Written Opinion of the International Searching Authority issued in PCT International Application No. PCT/IB2015/056078 dated Feb. 9, 2016.
(Continued)

*Primary Examiner* — Samantha K Abraham
(74) *Attorney, Agent, or Firm* — Finnegan, Henderson, Farabow, Garrett & Dunner LLP

(57) ABSTRACT

An optical system, including: (a) an emitter array including a plurality of individual emitters, wherein each emitter in the emitter array is operable to emit a light beam which is characterized by a native beam width; (b) an optical subunit, operable to transform a plurality of light beams emitted by the emitter array, wherein each of the transformed light beams is characterized by an expanded beam width that is wider than the native beam width of the corresponding light beam and is wider than a facilitating beam width; and (c) a diffractive optical element that is capable of diffracting the transformed light beams to provide light patterns whose angular resolution meets a light pattern target angular resolution criteria.

15 Claims, 28 Drawing Sheets

(51) Int. Cl.
*H04N 13/254* (2018.01)
*G01B 11/25* (2006.01)
*G06K 9/20* (2006.01)
*G01C 3/02* (2006.01)
*G02B 27/00* (2006.01)
*G02B 27/09* (2006.01)
*H04N 5/33* (2006.01)
*G03B 21/10* (2006.01)
*G03B 21/606* (2014.01)

(52) U.S. Cl.
CPC ......... *G02B 27/0037* (2013.01); *G02B 27/09* (2013.01); *G06K 9/2036* (2013.01); *H04N 5/332* (2013.01); *H04N 13/254* (2018.05); *G03B 21/10* (2013.01); *G03B 21/606* (2013.01)

(58) Field of Classification Search
CPC .... G01B 11/2513; G01C 3/02; G06K 9/2036; G03B 21/10; G03B 21/606
See application file for complete search history.

(56) References Cited

U.S. PATENT DOCUMENTS

| | | | |
|---|---|---|---|
| 8,208,719 | B2 | 6/2012 | Gordon et al. |
| 8,538,166 | B2 | 9/2013 | Gordon et al. |
| 9,915,827 | B2 | 3/2018 | Gordon |
| 2002/0167751 | A1 | 11/2002 | Lee et al. |
| 2005/0047472 | A1 | 3/2005 | Gruhlke |
| 2008/0291954 | A1 | 11/2008 | Aphek et al. |
| 2009/0207342 | A1 | 8/2009 | Yamaguchi et al. |
| 2010/0013911 | A1 | 1/2010 | Jacobs et al. |
| 2011/0158508 | A1 | 6/2011 | Shpunt et al. |
| 2011/0181704 | A1 | 7/2011 | Gordon et al. |
| 2012/0243100 | A1 | 9/2012 | Kessler |
| 2013/0038881 | A1 | 2/2013 | Pesach et al. |
| 2013/0135588 | A1 | 5/2013 | Popovich et al. |
| 2013/0156330 | A1 | 6/2013 | Kane et al. |
| 2013/0182226 | A1 | 7/2013 | Silverstein |
| 2013/0242053 | A1 | 9/2013 | Bjelkhagen et al. |
| 2013/0250066 | A1* | 9/2013 | Abraham ........... G01B 11/2513 348/46 |
| 2014/0028800 | A1 | 1/2014 | Tin |
| 2015/0022642 | A1 | 1/2015 | Appin et al. |
| 2016/0050401 | A1 | 2/2016 | Gordon |

FOREIGN PATENT DOCUMENTS

| | | |
|---|---|---|
| WO | WO 2013/144952 A1 | 10/2013 |
| WO | WO 2016/024200 A3 | 2/2016 |
| WO | WO 2016/024203 A2 | 2/2016 |

OTHER PUBLICATIONS

PCT International Search Report issued in PCT International Application No. PCT/IB2015/056078 dated Feb. 9, 2016.
PCT International Preliminary Search Report on Patentability issued in PCT International Application No. PCT/IB2015/056078 dated Feb. 14, 2017.
PCT International Search Report issued in PCT International Application No. PCT/IB2015/056074 dated Apr. 8, 2016.
PCT Written Opinion of the International Searching Authority issued in PCT International Application No. PCT/IB2015/056074 dated Apr. 8, 2016.
Sazbon et al., Qualitative Real-Time Range Extraction for Preplanned Scene Partitioning Using a Laser Beam Coding, *Pattern Recognition Letters* 26, pp. 1772-1781 (2005).
Vuylsteke, P. et al., "Range Image Acquisition with a Single Binary-Encoded Light Pattern," *IEEE Transaction on Pattern Analysis and Machine Intelligence (PAMI)*, vol. 12, Issue 2, pp. 148-164 (1990).
Battle, J et al., "Recent Progress in Coded Structured Light as a Technique to Solve the Correspondence Problem," *Pattern Recognition Society*, vol. 31, Issue 7, pp. 963-982 (1998).
Salvi, J. et al., "Pattern Codification Strategies in Structured Light Systems," *Pattern Recognition*, vol. 37, Issue 4, pp. 827-849 (2004).
Salvi, J. et al., "A State of the Art in Structured Light Patterns for Surface Profilometry," *Pattern Recognition*, vol. 43, Issue 8, pp. 2666-2680 (2010).
Zhang, S. et al, "High-resolution, Real-Time 3D Shape Acquisition," IEEE Computer Society, Proceedings of the 2004 IEEE Computer Society Conference on Computer Vision and Pattern Recognition Workshops (CVPRW '04), 2004, 10 pages total.
Hoshino, H. et al., "Measurement of the 3-D Shape of Specular Polyhedrons Using an M-array Coded Light Source", Proceedings of the IEE Instrumentation and Measurement Technology Center (IMTC), pp. 1329-1332, Hamamatsu, Japan, May 10-12, 1994.

* cited by examiner

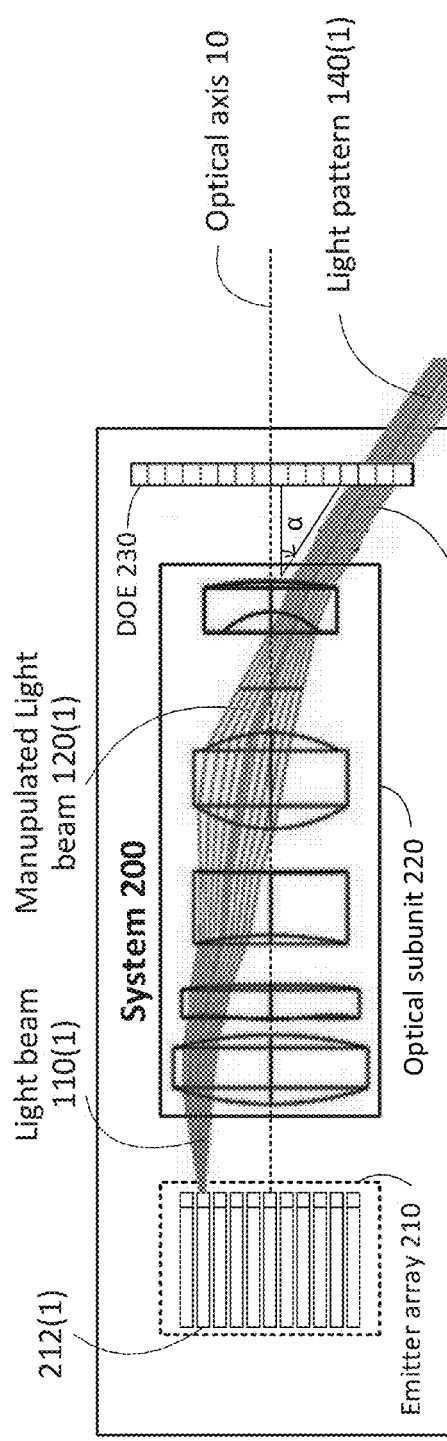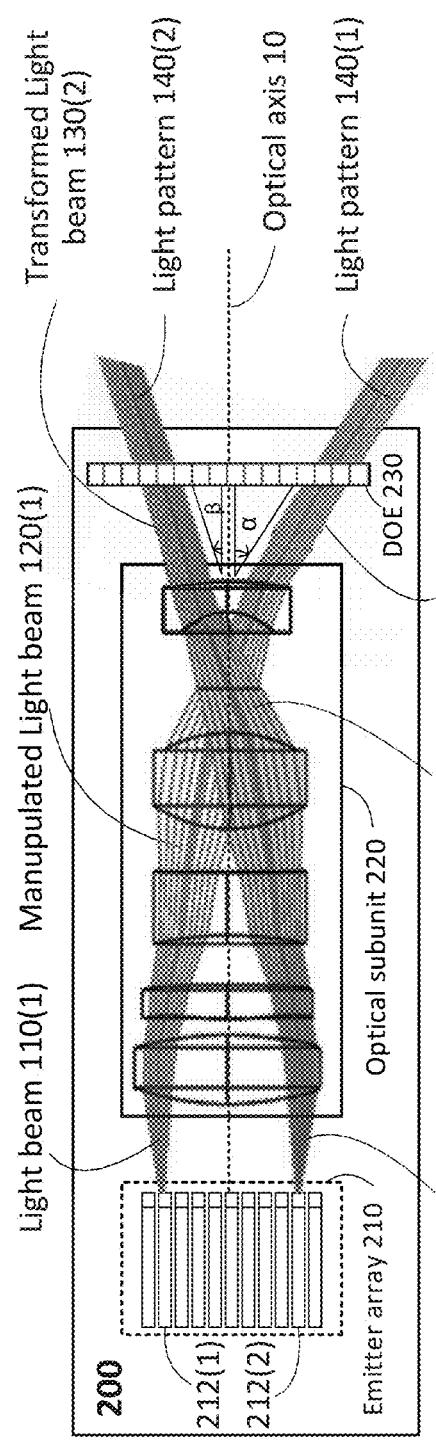

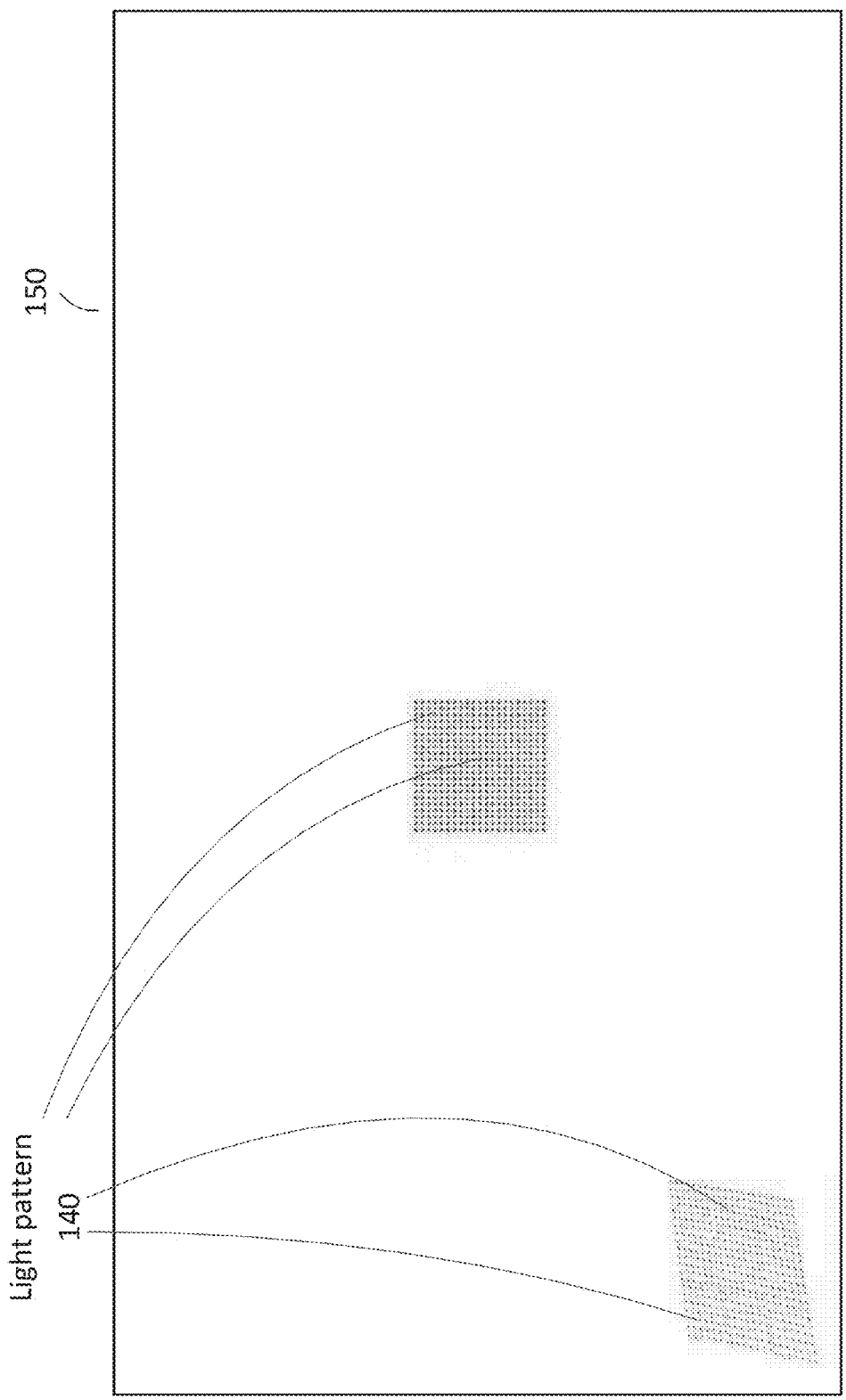

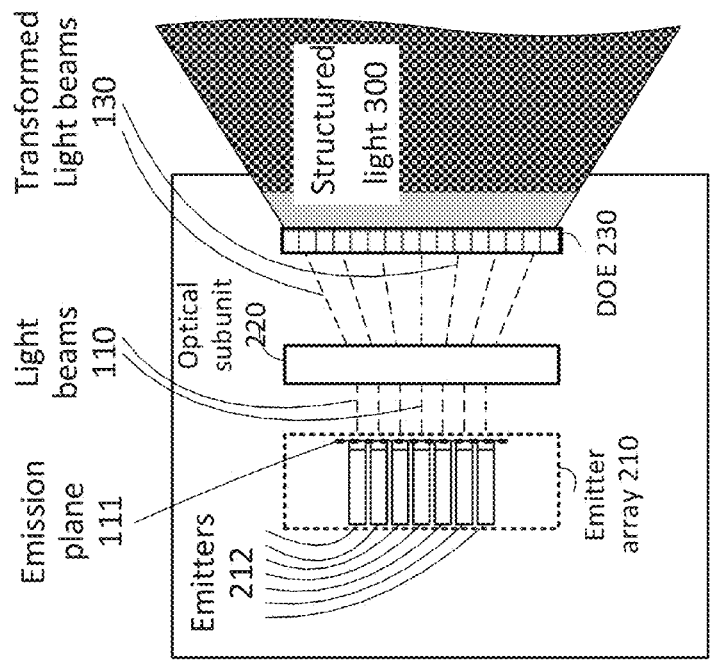
Diagram 11.2
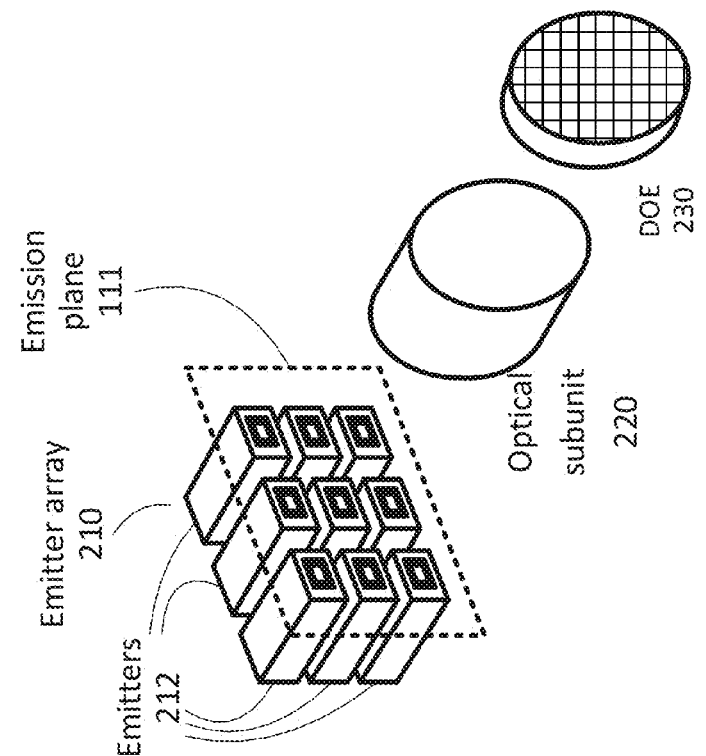
Diagram 11.1
FIG. 13

| 610 emitting a plurality of light beams, each of which being characterized by a native beam width |

↓

| 620 transforming the plurality of light beams so that each of the transformed light beams is characterized by an expanded beam width that is wider than the native beam width of the corresponding light beam and is wider than a facilitating beam width |

| 621 transforming the plurality of light beams so that each of the transformed light beams is characterized by a second beam divergence that is smaller than the first beam divergence of the corresponding light beam |

| 621 transforming the plurality of light beams so that the expanded beam widths of each of the plurality of transformed light beams is at least 3 times larger than the native beam width of the corresponding light beams |

↓

| 630 directing the transformed light beams toward the DOE |

| 631 deflecting the plurality of light beams and projecting the plurality of transformed light beams onto the diffractive optical element at different angles of incidence |

↓

| 640 diffracting the transformed light beams by a diffractive optical element (DOE) to provide light patterns whose angular resolution meets a light pattern target angular resolution criteria |

500              FIG. 20

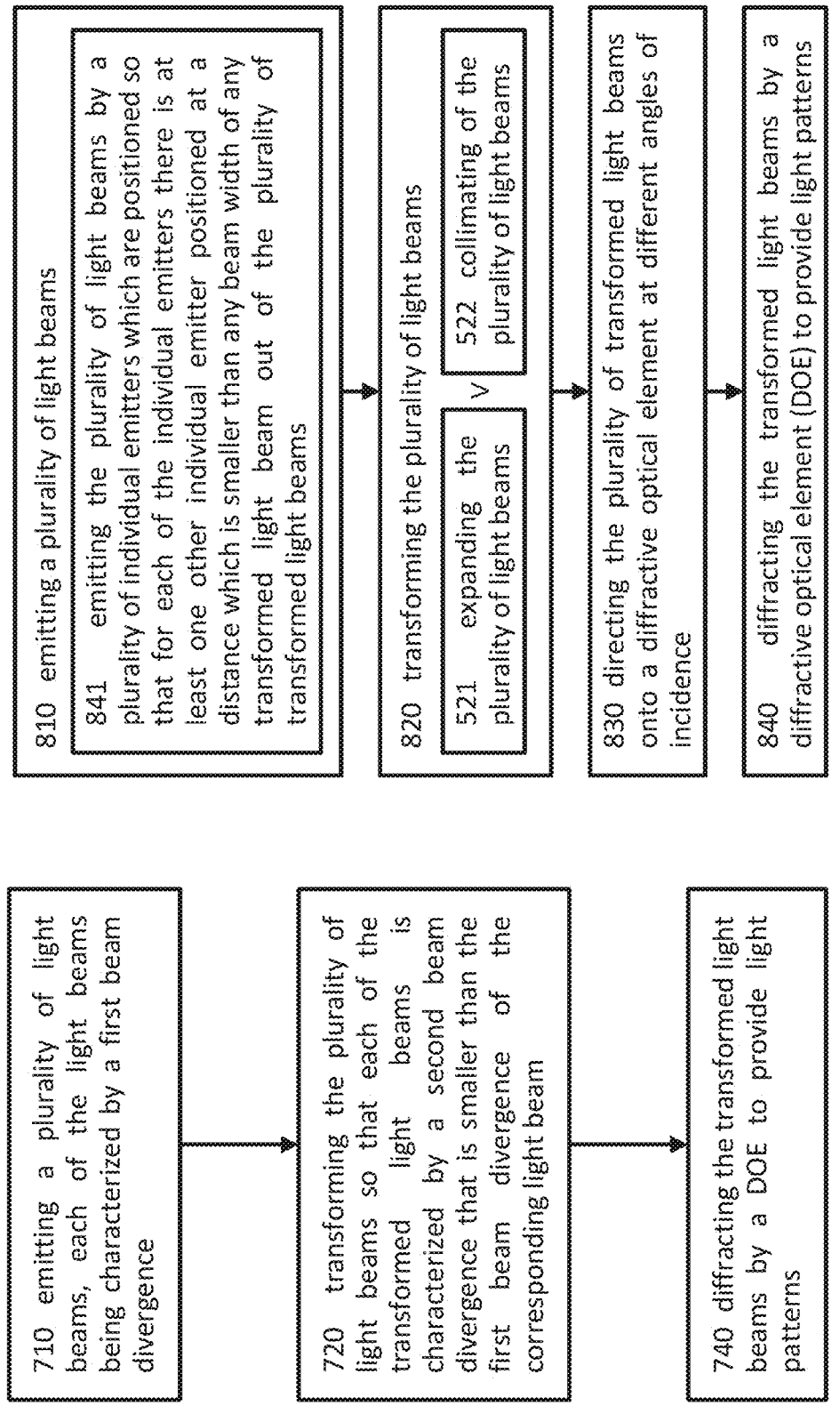

710 emitting a plurality of light beams, each of the light beams being characterized by a first beam divergence 711 emitting the plurality of light beams so that the first beam divergence of any of the emitted light beams is larger than the facilitating beam divergence by at least one order of magnitude 720 transforming the plurality of light beams so that each of the transformed light beams is characterized by a second beam divergence that is smaller than the first beam divergence of the corresponding light beam 730 directing the transformed light beams toward the DOE 731 deflecting the plurality of light beams and projecting the plurality of transformed light beams onto the diffractive optical element at different angles of incidence 740 diffracting the transformed light beams by a diffractive optical element (DOE) to provide light patterns

STRUCTURED LIGHT PROJECTION AND IMAGING

RELATED APPLICATIONS

The present application claims priority from U.S. Provisional Patent Application No. 62/036,158.

FIELD

The invention is related to systems, methods, and computer program products for structured light projection and imaging.

BACKGROUND

Sazbon et al. describe a method of this sort for range estimation in "Qualitative Real-Time Range Extraction for Preplanned Scene Partitioning Using Laser Beam Coding," Pattern Recognition Letters 26 (2005), pages 1772-1781, which is incorporated herein by reference. A phase-only filter codes the laser beam into M different diffraction patterns, corresponding to M different range segments in the workspace. Thus, each plane in the illuminated scene is irradiated with the pattern corresponding to the range of the plane from the light source. A common camera can be used to capture images of the scene, which may be processed to determine the ranges of objects in the scene. The authors describe an iterative procedure for designing the phase-only filter based on the Gerchberg-Saxton algorithm.

US Patent Publication No. 2011/0158508 to Shpunt et al. discloses a method for mapping which uses a diffractive optical element and includes projecting onto an object a pattern of multiple spots having respective positions and shapes, such that the positions of the spots in the pattern are uncorrelated, while the shapes share a common characteristic. An image of the spots on the object is captured and processed so as to derive a three-dimensional (3D) map of the object.

U.S. Pat. Nos. 8,090,194, 8,208,719 and 8,538,166 to Gordon et al. and International Publication No. WO2008062407 also to Gordon et al. disclose various aspects of structured light projection and imaging as well features, hardware and algorithms used in structured light projection and imaging.

GENERAL DESCRIPTION

In accordance with an aspect of the presently disclosed subject matter, there is provided an optical system, including: (a) an emitter array including a plurality of individual emitters, wherein each emitter in the emitter array is operable to emit a light beam which is characterized by a native beam width; (b) an optical subunit, operable to transform a plurality of light beams emitted by the emitter array, wherein each of the transformed light beams is characterized by an expanded beam width that is wider than the native beam width of the corresponding light beam and is wider than a facilitating beam width; and (c) a diffractive optical element (DOE) that is capable of diffracting the transformed light beams to provide light patterns whose angular resolution meets a light pattern target angular resolution criteria.

In accordance with an embodiment of the presently disclosed subject matter, there is further provided a system, wherein the optical subunit is an optical assembly including a plurality of optical elements.

In accordance with an embodiment of the presently disclosed subject matter, there is further provided a system, wherein each emitter in the emitter array is operable to emit a light beam whose native beam width is narrower than the facilitating beam width by at least one order of magnitude.

In accordance with an embodiment of the presently disclosed subject matter, there is further provided a system, wherein the optical subunit is an optical assembly including a plurality of optical elements having a common optical axis common to the plurality of optical elements.

In accordance with an embodiment of the presently disclosed subject matter, there is further provided a system, wherein the optical subunit is operable to transform the plurality of light beams to provide the plurality of transformed light beams using transforming optical components included in the optical subunit, wherein the transforming optical components are common to the plurality of light beams.

In accordance with an embodiment of the presently disclosed subject matter, there is further provided a system, wherein the emitter array and the optical subunit are positioned relative to one another such that the optical subunit further transforms the plurality of light beams by deflecting the plurality of light beams so that the plurality of transformed light beams are projected onto the diffractive optical element at different angles of incidence, resulting in providing of a structured light pattern which includes the plurality of light patterns.

In accordance with an embodiment of the presently disclosed subject matter, there is further provided a system, wherein each emitter in the emitter array is operable to emit a light beam, out of the plurality of light beams, which is characterized by a first beam divergence; wherein the optical subunit is further operable to transform the plurality of light beams so that each of the transformed light beams is characterized by a second beam divergence that is smaller than the first beam divergence of the corresponding light beam.

In accordance with an embodiment of the presently disclosed subject matter, there is further provided a system, wherein for each individual emitter of the emitter array there is at least one other individual emitter of the emitter array positioned at a distance which is at least 10 times smaller than any beam-width of any transformed light beam out of the plurality of transformed light beams.

In accordance with an embodiment of the presently disclosed subject matter, there is further provided a system, wherein the expanded beam widths of each of the plurality of transformed light beams is at least 3 times larger than the native beam width of the corresponding light beams.

In accordance with an embodiment of the presently disclosed subject matter, there is further provided a system, wherein In accordance with an embodiment of the presently disclosed subject matter, there is further provided a system, wherein the optical subunit is a telecentric optical subunit.

In accordance with an embodiment of the presently disclosed subject matter, there is further provided a system, wherein the plurality of individual emitters are positioned on a focal plane of the optical subunit.

In accordance with an embodiment of the presently disclosed subject matter, there is further provided a system, wherein the plurality of light beams propagates to the optical subunit in substantially parallel paths.

In accordance with an embodiment of the presently disclosed subject matter, there is further provided a system, wherein the plurality of light patterns provided by the diffractive optical element are copies of a predetermined light pattern.

In accordance with an embodiment of the presently disclosed subject matter, there is further provided a system, wherein the copies of the predetermined light pattern are adjacent to each other.

In accordance with an embodiment of the presently disclosed subject matter, there is further provided a system, wherein the utilization of the single diffractive optical element by the optical system for the generating of the plurality of copies of the predetermined light pattern facilitates projection of a high contrast and high clarity overall output pattern of the optical system.

In accordance with an embodiment of the presently disclosed subject matter, there is further provided a system, wherein each provided copy of the predetermined light pattern partly overlaps at least one other provided copy of the predetermined light pattern.

In accordance with an embodiment of the presently disclosed subject matter, there is further provided a system, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a system, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a system, further including projection optics to image at least a part of a structured light pattern which includes the plurality of light patterns onto an object, an imaging sensor adapted to capture an image of the object with the structured light pattern projected thereon, and a processing unit adapted to process the image to determine range parameters.

In accordance with an embodiment of the presently disclosed subject matter, there is further provided a system, wherein the optical subunit includes a plurality of optical elements having a common optical axis common to the plurality of optical elements, wherein the common optical axis is folded at least once.

In accordance with an embodiment of the presently disclosed subject matter, there is further provided a system, wherein each emitter of the emitter array is a vertical-cavity surface-emitting laser (VCSEL) emitter.

In accordance with an embodiment of the presently disclosed subject matter, there is further provided a system, wherein the emitter array is dense with individual emitters of coherent light beams, thereby enabling spatially efficient providing of a high energy structured light pattern.

In accordance with an aspect of the presently disclosed subject matter, there is provided an optical system, including: (a) an emitter array including a plurality of individual emitters, wherein each emitter in the emitter array is operable to emit a light beam which is characterized by a first beam divergence; (b) an optical subunit, operable to transform a plurality of light beams emitted by the emitter array, wherein each of the transformed light beams is characterized by a second beam divergence that is smaller than the first beam divergence of the corresponding light beam; and (c) a diffractive optical element (DOE) capable of diffracting the transformed light beams to provide light patterns.

In accordance with an embodiment of the presently disclosed subject matter, there is further provided a system, wherein the optical subunit is an optical assembly including a plurality of optical elements.

In accordance with an embodiment of the presently disclosed subject matter, there is further provided a system, wherein a facilitating beam divergence is defined for the DOE so that incidence upon the DOE of coherent light beams whose divergence is lower than the facilitating beam divergence result in provision of light patterns whose contrast meets a light pattern target contrast criteria; wherein the second beam divergences of the plurality of transformed light beams are lower than the facilitating beam divergence.

In accordance with an embodiment of the presently disclosed subject matter, there is further provided a system, wherein each emitter in the emitter array is operable to emit a light beam whose first beam divergence is larger than the facilitating beam divergence by at least one order of magnitude.

In accordance with an embodiment of the presently disclosed subject matter, there is further provided a system, wherein the optical subunit is an optical assembly including a plurality of optical elements having a common optical axis common to the plurality of optical elements.

In accordance with an embodiment of the presently disclosed subject matter, there is further provided a system, wherein the optical subunit is operable to transform the plurality of light beams to provide the plurality of transformed light beams using transforming optical components included in the optical subunit, wherein the transforming optical elements are common to the plurality of light beams.

In accordance with an embodiment of the presently disclosed subject matter, there is further provided a system, wherein the emitter array and the optical subunit are positioned relative to one another such that the optical subunit further transform the plurality of light beams by deflecting the plurality of light beams so that the plurality of transformed light beams are projected onto the diffractive optical element at different angles of incidence, resulting in providing of a plurality of light patterns by the diffractive optical element.

In accordance with an embodiment of the presently disclosed subject matter, there is further provided a system, wherein the optical subunit is a telecentric optical subunit.

In accordance with an embodiment of the presently disclosed subject matter, there is further provided a system, wherein the plurality of individual emitters are positioned on a focal plane of the optical subunit.

In accordance with an embodiment of the presently disclosed subject matter, there is further provided a system, wherein the plurality of light beams propagates to the optical subunit in substantially parallel paths.

In accordance with an embodiment of the presently disclosed subject matter, there is further provided a system, wherein the plurality of light patterns provided by the diffractive optical element are copies of a predetermined light pattern.

In accordance with an embodiment of the presently disclosed subject matter, there is further provided a system, wherein the copies of the predetermined light pattern are adjacent to each other.

In accordance with an embodiment of the presently disclosed subject matter, there is further provided a system, wherein the utilization of the single diffractive optical element by the optical system for the generating of the plurality of copies of the predetermined light pattern facilitates projection of a high contrast and high clarity overall output pattern of the optical system.

In accordance with an embodiment of the presently disclosed subject matter, there is further provided a system, wherein each provided copy of the predetermined light pattern partly overlaps at least one other provided copy of the predetermined light pattern.

In accordance with an embodiment of the presently disclosed subject matter, there is further provided a system, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a system, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a system, further including projection optics to image at least a part of a structured light pattern which includes the plurality of light patterns onto an object, an imaging sensor adapted to capture an image of the object with the structured light pattern projected thereon, and a processing unit adapted to process the image to determine range parameters.

In accordance with an embodiment of the presently disclosed subject matter, there is further provided a system, wherein the optical subunit includes a plurality of optical elements having a common optical axis common to the plurality of optical elements, wherein the common optical axis is folded at least once.

In accordance with an embodiment of the presently disclosed subject matter, there is further provided a system, wherein each emitter of the emitter array is a vertical-cavity surface-emitting laser (VCSEL) emitter.

In accordance with an embodiment of the presently disclosed subject matter, there is further provided a system, wherein the emitter array is dense with individual emitters of coherent light beams, thereby enabling spatially efficient providing of a high energy structured light pattern.

In accordance with an aspect of the presently disclosed subject matter, there is provided an optical system, including: (a) an emitter array including a plurality of individual emitters, wherein each emitter in the emitter array is operable to emit a light beam; (b) an optical subunit, operable to: (i) transform a plurality of light beams emitted by the emitter array, wherein the transformation includes expansion and/or collimation of the plurality of light beams; and (ii) to direct the plurality of transformed light beams onto the diffractive optical element at different angles of incidence, resulting in providing of a plurality of light patterns by the diffractive optical element; and (c) a diffractive optical element (DOE) that is capable of diffracting the transformed light beams to provide light patterns.

In accordance with an embodiment of the presently disclosed subject matter, there is further provided a system, wherein for each individual emitter of the emitter array there is at least one other individual emitter of the emitter array positioned at a distance which is smaller than any beam width of any transformed light beam out of the plurality of transformed light beams.

In accordance with an embodiment of the presently disclosed subject matter, there is further provided a system, wherein the optical subunit is an optical assembly including a plurality of optical elements.

In accordance with an embodiment of the presently disclosed subject matter, there is further provided a system, wherein the optical subunit includes a plurality of optical elements having a common optical axis common to the plurality of optical elements.

In accordance with an embodiment of the presently disclosed subject matter, there is further provided a system, wherein the optical subunit is operable to transform the plurality of light beams to provide the plurality of transformed light beams using transforming optical components, out of the plurality of optical components, which are common to the plurality of light beams.

In accordance with an embodiment of the presently disclosed subject matter, there is further provided a system, wherein the emitter array and the optical subunit are positioned relative to one another such that the optical subunit further transform the plurality of light beams by deflecting the plurality of light beams so that the plurality of transformed light beams are projected onto the diffractive optical element at different angles of incidence, resulting in providing of a plurality of light patterns by the diffractive optical element.

In accordance with an embodiment of the presently disclosed subject matter, there is further provided a system, wherein the optical subunit is a telecentric optical subunit.

In accordance with an embodiment of the presently disclosed subject matter, there is further provided a system, wherein the plurality of individual emitters are positioned on a focal plane of the optical subunit.

In accordance with an embodiment of the presently disclosed subject matter, there is further provided a system, wherein the plurality of light beams propagates to the optical subunit in substantially parallel paths.

In accordance with an embodiment of the presently disclosed subject matter, there is further provided a system, wherein the plurality of light patterns provided by the diffractive optical element are copies of a predetermined light pattern.

In accordance with an embodiment of the presently disclosed subject matter, there is further provided a system, wherein the copies of the predetermined light pattern are adjacent to each other.

In accordance with an embodiment of the presently disclosed subject matter, there is further provided a system, wherein the utilization of the single diffractive optical element by the optical system for the generating of the plurality of copies of the predetermined light pattern facilitates projection of a high contrast and high clarity overall output pattern of the optical system.

In accordance with an embodiment of the presently disclosed subject matter, there is further provided a system, wherein each provided copy of the predetermined light pattern partly overlaps at least one other provided copy of the predetermined light pattern.

In accordance with an embodiment of the presently disclosed subject matter, there is further provided a system, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a system, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a system, further including projection optics to image at least a part of a structured light pattern which includes the plurality of light patterns onto an object, an imaging sensor adapted to capture an image of the object with the structured light pattern projected thereon, and a processing unit adapted to process the image to determine range parameters.

In accordance with an embodiment of the presently disclosed subject matter, there is further provided a system, wherein the optical subunit includes a plurality of optical elements having a common optical axis common to the plurality of optical elements, wherein the common optical axis is folded at least once.

In accordance with an embodiment of the presently disclosed subject matter, there is further provided a system, wherein each emitter of the emitter array is a vertical-cavity surface-emitting laser (VCSEL) emitter.

In accordance with an embodiment of the presently disclosed subject matter, there is further provided a system, wherein the emitter array is dense with individual emitters of coherent light beams, thereby enabling spatially efficient providing of a high energy structured light pattern.

In accordance with an aspect of the presently disclosed subject matter, there is provided an optical system, including: (a) an emitter array including a plurality of individual emitters arranged so as to form a planar emission plane, wherein each emitter in the emitter array is operable to emit a light beam; (b) an optical subunit, operable to: (i) transform a plurality of light beams emitted by the emitter array, wherein the transformation includes expansion and/or collimation of the plurality of light beams; and (ii) to direct the plurality of transformed light beams onto the diffractive optical element at different angles of incidence, resulting in providing of a plurality of light patterns by the diffractive optical element; and (c) a diffractive optical element (DOE) that is capable of diffracting the transformed light beams to provide light patterns.

In accordance with an embodiment of the presently disclosed subject matter, there is further provided a system, wherein the optical subunit includes a plurality of optical elements having a common optical axis common to the plurality of optical elements.

In accordance with an embodiment of the presently disclosed subject matter, there is further provided a system, wherein the optical subunit is operable to transform the plurality of light beams to provide the plurality of transformed light beams using transforming optical components, out of the plurality of optical components, which are common to the plurality of light beams.

In accordance with an embodiment of the presently disclosed subject matter, there is further provided a system, wherein the emitter array and the optical subunit are positioned relative to one another such that the optical subunit further transform the plurality of light beams by deflecting the plurality of light beams so that the plurality of transformed light beams are projected onto the diffractive optical element at different angles of incidence, resulting in providing of a plurality of light patterns by the diffractive optical element.

In accordance with an embodiment of the presently disclosed subject matter, there is further provided a system, wherein the optical subunit is a telecentric optical subunit.

In accordance with an embodiment of the presently disclosed subject matter, there is further provided a system, wherein the plurality of individual emitters are positioned on a focal plane of the optical subunit.

In accordance with an embodiment of the presently disclosed subject matter, there is further provided a system, wherein the plurality of light beams propagates to the optical subunit in substantially parallel paths.

In accordance with an embodiment of the presently disclosed subject matter, there is further provided a system, wherein the plurality of light patterns provided by the diffractive optical element are copies of a predetermined light pattern.

In accordance with an embodiment of the presently disclosed subject matter, there is further provided a system, wherein the copies of the predetermined light pattern are adjacent to each other.

In accordance with an embodiment of the presently disclosed subject matter, there is further provided a system, wherein the utilization of the single diffractive optical element by the optical system for the generating of the plurality of copies of the predetermined light pattern facilitates projection of a high contrast and high clarity overall output pattern of the optical system.

In accordance with an embodiment of the presently disclosed subject matter, there is further provided a system, wherein each provided copy of the predetermined light pattern partly overlaps at least one other provided copy of the predetermined light pattern.

In accordance with an embodiment of the presently disclosed subject matter, there is further provided a system, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a system, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a system, further including projection optics to image at least a part of a structured light pattern which includes the plurality of light patterns onto an object, an imaging sensor adapted to capture an image of the object with the structured light pattern projected thereon, and a processing unit adapted to process the image to determine range parameters.

In accordance with an embodiment of the presently disclosed subject matter, there is further provided a system, wherein the optical subunit includes a plurality of optical elements having a common optical axis common to the plurality of optical elements, wherein the common optical axis is folded at least once.

In accordance with an embodiment of the presently disclosed subject matter, there is further provided a system, wherein each emitter of the emitter array is a vertical-cavity surface-emitting laser (VCSEL) emitter.

In accordance with an aspect of the presently disclosed subject matter, there is provided an optical system, including: (a) an emitter array including a plurality of individual emitters, wherein each emitter in the emitter array is operable to emit a light beam; (b) an optical subunit, operable to transform a plurality of light beams emitted by the emitter array, wherein the transformation includes expansion and/or collimation of the plurality of light beams; (c) a diffractive optical element (DOE) that is capable of diffracting the transformed light beams to provide light patterns; wherein a combination of the optical subunit and the diffractive optical element is characterized by a distortion function; wherein the plurality of individual emitters are arranged in a nonuniform configuration whose relation to a predefined uniform grid is an inverse function of the distortion function.

In accordance with an embodiment of the presently disclosed subject matter, there is further provided a system, wherein the optical subunit is operable to direct the plurality of transformed light beams onto the diffractive optical element at different angles of incidence, resulting in providing of a plurality of light patterns by the diffractive optical element.

In accordance with an embodiment of the presently disclosed subject matter, there is further provided a system, wherein the optical subunit is a telecentric optical subunit.

In accordance with an embodiment of the presently disclosed subject matter, there is further provided a system, wherein the plurality of individual emitters are positioned on a focal plane of the optical subunit.

In accordance with an embodiment of the presently disclosed subject matter, there is further provided a system, wherein the plurality of light beams propagates to the optical subunit in substantially parallel paths.

In accordance with an embodiment of the presently disclosed subject matter, there is further provided a system, wherein the plurality of light patterns provided by the diffractive optical element are copies of a predetermined light pattern.

In accordance with an embodiment of the presently disclosed subject matter, there is further provided a system, wherein the copies of the predetermined light pattern are adjacent to each other.

In accordance with an embodiment of the presently disclosed subject matter, there is further provided a system, wherein the utilization of the single diffractive optical element by the optical system for the generating of the plurality of copies of the predetermined light pattern facilitates projection of a high contrast and high clarity overall output pattern of the optical system.

In accordance with an embodiment of the presently disclosed subject matter, there is further provided a system, wherein each provided copy of the predetermined light pattern partly overlaps at least one other provided copy of the predetermined light pattern.

In accordance with an embodiment of the presently disclosed subject matter, there is further provided a system, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a system, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a system, further including projection optics to image at least a part of a structured light pattern which includes the plurality of light patterns onto an object, an imaging sensor adapted to capture an image of the object with the structured light pattern projected thereon, and a processing unit adapted to process the image to determine range parameters.

In accordance with an embodiment of the presently disclosed subject matter, there is further provided a system, wherein the optical subunit includes a plurality of optical elements having a common optical axis common to the plurality of optical elements, wherein the common optical axis is folded at least once.

In accordance with an embodiment of the presently disclosed subject matter, there is further provided a system, wherein each emitter of the emitter array is a vertical-cavity surface-emitting laser (VCSEL) emitter.

In accordance with an aspect of the presently disclosed subject matter, there is provided a method for projection, the method including: (a) emitting a plurality of light beams, wherein each of the plurality of light beams is characterized by a native beam width; (b) transforming the plurality of light beams so that each of the transformed light beams is characterized by an expanded beam width that is wider than the native beam width of the corresponding light beam and is wider than a facilitating beam width; and (c) diffracting the transformed light beams by a diffractive optical element (DOE) to provide light patterns whose angular resolution meets a light pattern target angular resolution criteria.

In accordance with an embodiment of the presently disclosed subject matter, there is further provided a method, wherein the emitting includes emitting the plurality of light beams whose native beam widths are narrower than the facilitating beam width by at least one order of magnitude.

In accordance with an embodiment of the presently disclosed subject matter, there is further provided a method, further including deflecting the plurality of light beams, projecting the plurality of transformed light beams onto the diffractive optical element at different angles of incidence, and providing a plurality of light patterns by the diffractive optical element, wherein the structured light pattern includes the plurality of light patterns.

In accordance with an embodiment of the presently disclosed subject matter, there is further provided a method, wherein each light beam out of the plurality of light beams is characterized by a first beam divergence; wherein the transforming of the plurality of light beams includes transforming the plurality of light beams so that each of the transformed light beams is characterized by a second beam divergence that is smaller than the first beam divergence of the corresponding light beam.

In accordance with an embodiment of the presently disclosed subject matter, there is further provided a method, wherein the transforming of the plurality of light beams includes transforming the plurality of light beams so that the expanded beam widths of each of the plurality of transformed light beams is at least 3 times larger than the native beam width of the corresponding light beams.

In accordance with an embodiment of the presently disclosed subject matter, there is further provided a method, wherein the transforming is executed by a telecentric optical subunit.

In accordance with an embodiment of the presently disclosed subject matter, there is further provided a method, wherein the transforming is executed by an optical subunit, wherein the emitting is executed by a plurality of individual emitters which are positioned on a focal plane of the optical subunit.

In accordance with an embodiment of the presently disclosed subject matter, there is further provided a method, wherein the plurality of light beams propagates to the optical subunit in substantially parallel paths.

In accordance with an embodiment of the presently disclosed subject matter, there is further provided a method, wherein the plurality of light patterns provided by the diffractive optical element are copies of a predetermined light pattern.

In accordance with an embodiment of the presently disclosed subject matter, there is further provided a method, wherein the copies of the predetermined light pattern are adjacent to each other.

In accordance with an embodiment of the presently disclosed subject matter, there is further provided a method, wherein the plurality of copies of the predetermined light pattern facilitates projection of a high contrast and high clarity overall output pattern of the optical system.

In accordance with an embodiment of the presently disclosed subject matter, there is further provided a method, wherein each provided copy of the predetermined light pattern partly overlaps at least one other provided copy of the predetermined light pattern.

In accordance with an embodiment of the presently disclosed subject matter, there is further provided a method, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a method, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a method, further including projecting onto an object at least a part of a structured light pattern which includes the plurality of light patterns, capturing an image of the object with the structured light pattern projected thereon, and processing the image to determine range parameters.

In accordance with an embodiment of the presently disclosed subject matter, there is further provided a method, wherein the optical subunit includes a plurality of optical elements having a common optical axis common to the plurality of optical elements, wherein the common optical axis is folded at least once.

In accordance with an embodiment of the presently disclosed subject matter, there is further provided a method, wherein each emitter of the emitter array is a vertical-cavity surface-emitting laser (VCSEL) emitter.

In accordance with an embodiment of the presently disclosed subject matter, there is further provided a method, wherein the emitter array is dense with individual emitters of coherent light beams, thereby enabling spatially efficient providing of a high energy structured light pattern.

In accordance with an embodiment of the presently disclosed subject matter, there is further provided a method, wherein the emitter array includes a plurality of individual emitters arranged so as to form a planar emission plane.

In accordance with an embodiment of the presently disclosed subject matter, there is further provided a method, wherein a combination of the optical subunit and the diffractive optical element is characterized by a distortion function; wherein the plurality of individual emitters are arranged in a non-uniform configuration whose relation to a predefined uniform grid is an inverse function of the distortion function.

In accordance with an aspect of the presently disclosed subject matter, there is provided a method for projection, the method including: (a) emitting a plurality of light beams, wherein each of the plurality of light is characterized by a first beam divergence; (b) transforming the plurality of light beams so that each of the transformed light beams is characterized by a second beam divergence that is smaller than the first beam divergence of the corresponding light beam; and (c) diffracting the transformed light beams by a diffractive optical element (DOE) to provide light patterns.

In accordance with an embodiment of the presently disclosed subject matter, there is further provided a method, wherein the optical subunit is an optical assembly including a plurality of optical elements.

In accordance with an embodiment of the presently disclosed subject matter, there is further provided a method, wherein a facilitating beam divergence is defined for the DOE so that incidence upon the DOE of coherent light beams whose divergence is lower than the facilitating beam divergence result in provision of light patterns whose contrast meets a light pattern target contrast criteria; wherein the second beam divergences of the plurality of transformed light beams are lower than the facilitating beam divergence.

In accordance with an embodiment of the presently disclosed subject matter, there is further provided a method, wherein each emitter in the emitter array is operable to emit a light beam whose first beam divergence is larger than the facilitating beam divergence by at least one order of magnitude.

In accordance with an embodiment of the presently disclosed subject matter, there is further provided a method, wherein the optical subunit is an optical assembly including a plurality of optical elements having a common optical axis common to the plurality of optical elements.

In accordance with an embodiment of the presently disclosed subject matter, there is further provided a method, wherein the optical subunit is operable to transform the plurality of light beams to provide the plurality of transformed light beams using transforming optical components included in the optical subunit, wherein the transforming optical elements are common to the plurality of light beams.

In accordance with an embodiment of the presently disclosed subject matter, there is further provided a method, wherein the emitter array and the optical subunit are positioned relative to one another such that the optical subunit further transform the plurality of light beams by deflecting the plurality of light beams so that the plurality of transformed light beams are projected onto the diffractive optical element at different angles of incidence, resulting in providing of a plurality of light patterns by the diffractive optical element.

In accordance with an embodiment of the presently disclosed subject matter, there is further provided a method, wherein the transforming is executed by a telecentric optical subunit.

In accordance with an embodiment of the presently disclosed subject matter, there is further provided a method, wherein the transforming is executed by an optical subunit, wherein the emitting is executed by a plurality of individual emitters which are positioned on a focal plane of the optical subunit.

In accordance with an embodiment of the presently disclosed subject matter, there is further provided a method, wherein the plurality of light beams propagates to the optical subunit in substantially parallel paths.

In accordance with an embodiment of the presently disclosed subject matter, there is further provided a method, wherein the plurality of light patterns provided by the diffractive optical element are copies of a predetermined light pattern.

In accordance with an embodiment of the presently disclosed subject matter, there is further provided a method, wherein the copies of the predetermined light pattern are adjacent to each other.

In accordance with an embodiment of the presently disclosed subject matter, there is further provided a method, wherein the plurality of copies of the predetermined light pattern facilitates projection of a high contrast and high clarity overall output pattern of the optical system.

In accordance with an embodiment of the presently disclosed subject matter, there is further provided a method, wherein each provided copy of the predetermined light pattern partly overlaps at least one other provided copy of the predetermined light pattern.

In accordance with an embodiment of the presently disclosed subject matter, there is further provided a method, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a method, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a method, further including projecting onto an object at least a part of a structured light pattern which includes the plurality of light patterns, capturing an image of the object with the structured light pattern projected thereon, and processing the image to determine range parameters.

In accordance with an embodiment of the presently disclosed subject matter, there is further provided a method, wherein the optical subunit includes a plurality of optical elements having a common optical axis common to the plurality of optical elements, wherein the common optical axis is folded at least once.

In accordance with an embodiment of the presently disclosed subject matter, there is further provided a method, wherein each emitter of the emitter array is a vertical-cavity surface-emitting laser (VCSEL) emitter.

In accordance with an embodiment of the presently disclosed subject matter, there is further provided a method, wherein the emitter array is dense with individual emitters of coherent light beams, thereby enabling spatially efficient providing of a high energy structured light pattern.

In accordance with an embodiment of the presently disclosed subject matter, there is further provided a method, wherein the emitter array includes a plurality of individual emitters arranged so as to form a planar emission plane.

In accordance with an embodiment of the presently disclosed subject matter, there is further provided a method, wherein a combination of the optical subunit and the diffractive optical element is characterized by a distortion function; wherein the plurality of individual emitters are arranged in a non-uniform configuration whose relation to a predefined uniform grid is an inverse function of the distortion function.

In accordance with an aspect of the presently disclosed subject matter, there is provided a method for projection, the method including: (a) emitting a plurality of light beams; (b) transforming the plurality of light beams, the transforming including expanding and/or collimating of the plurality of light beams; (c) directing the plurality of transformed light beams onto a diffractive optical element at different angles of incidence; and (d) diffracting the plurality of transformed light beams by the diffractive optical element (DOE) to provide a plurality of light patterns; wherein the emitting includes emitting the plurality of light beams by a plurality of individual emitters which are positioned so that for each of the individual emitters there is at least one other individual emitter positioned at a distance which is smaller than any beam width of any transformed light beam out of the plurality of transformed light beams.

In accordance with an embodiment of the presently disclosed subject matter, there is further provided a method, wherein the transforming is executed by a telecentric optical subunit.

In accordance with an embodiment of the presently disclosed subject matter, there is further provided a method, wherein the transforming is executed by an optical subunit, wherein the emitting is executed by a plurality of individual emitters which are positioned on a focal plane of the optical subunit.

In accordance with an embodiment of the presently disclosed subject matter, there is further provided a method, wherein the plurality of light beams propagates to the optical subunit in substantially parallel paths.

In accordance with an embodiment of the presently disclosed subject matter, there is further provided a method, wherein the plurality of light patterns provided by the diffractive optical element are copies of a predetermined light pattern.

In accordance with an embodiment of the presently disclosed subject matter, there is further provided a method, wherein the copies of the predetermined light pattern are adjacent to each other.

In accordance with an embodiment of the presently disclosed subject matter, there is further provided a method, wherein the plurality of copies of the predetermined light facilitates projection of a high contrast and high clarity overall output pattern of the optical system.

In accordance with an embodiment of the presently disclosed subject matter, there is further provided a method, wherein each provided copy of the predetermined light pattern partly overlaps at least one other provided copy of the predetermined light pattern.

In accordance with an embodiment of the presently disclosed subject matter, there is further provided a method, wherein the predetermined light pattern includes multiple copies of a repeated subpattern, wherein in each provided copy of the predetermined light pattern at least one subpattern overlaps a subpattern of at least one other provided copy of the predetermined light pattern generated by light originating from another light emitter.

In accordance with an embodiment of the presently disclosed subject matter, there is further provided a method, further including an emitter array control system which is configured and operable to control activation of different subgroups of emitters of the emitter array, thereby resulting in providing of offset overall output patterns of the optical system at different times.

In accordance with an embodiment of the presently disclosed subject matter, there is further provided a method, further including projecting onto an object at least a part of a structured light pattern which includes the plurality of light patterns, capturing an image of the object with the structured light pattern projected thereon, and processing the image to determine range parameters.

In accordance with an embodiment of the presently disclosed subject matter, there is further provided a method, wherein the optical subunit includes a plurality of optical elements having a common optical axis common to the plurality of optical elements, wherein the common optical axis is folded at least once.

In accordance with an embodiment of the presently disclosed subject matter, there is further provided a method, wherein each emitter of the emitter array is a vertical-cavity surface-emitting laser (VCSEL) emitter.

In accordance with an embodiment of the presently disclosed subject matter, there is further provided a method, wherein the emitter array is dense with individual emitters of coherent light beams, thereby enabling spatially efficient providing of a high energy structured light pattern.

In accordance with an embodiment of the presently disclosed subject matter, there is further provided a method, wherein the emitter array includes a plurality of individual emitters arranged so as to form a planar emission plane.

In accordance with an embodiment of the presently disclosed subject matter, there is further provided a method, wherein a combination of the optical subunit and the diffractive optical element is characterized by a distortion function; wherein the plurality of individual emitters are arranged in a non-uniform configuration whose relation to a predefined uniform grid is an inverse function of the distortion function.

in accordance with an aspect of the presently disclosed subject matter, there is provided a method, including: (a) obtaining optical characteristics of a doe positioned at a given distance from a light source; (b) obtaining data in respect of a provisional light beams emission layout through the doe; (c) obtaining a target emission layout; and (d) determining an emitters layout based on the target emission layout and based on the provisional light beams emission layout.

In accordance with an embodiment of the presently disclosed subject matter, there is further provided a method, wherein the determining comprises determining an emitters layout, such that light emitted by a light source positioned at the given distance from the DOE and having a plurality of emitters arranged according to the emitters layout is diffracted through the DOE is characterized by a layout that meets a target emission criterion that is based on the target emission layout.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1, 2, 3A and 3B are functional block diagrams illustrating various examples of optical system, in accordance with examples of the presently disclosed subject matter;

FIGS. 12A through 12G includes diagrams which are related to possible distortions in the light patterns generated by the system of FIG. 1, and ways to reduce such distortion, in accordance with examples of the presently disclosed subject matter;

FIGS. 13, 14 and 15 is a functional block diagram illustrating an example of an optical system, in accordance with examples of the presently disclosed subject matter;

FIGS. 17-24 are flow charts illustrating examples of various methods for projection, in accordance with examples of the presently disclosed subject matter.

Figure 1:
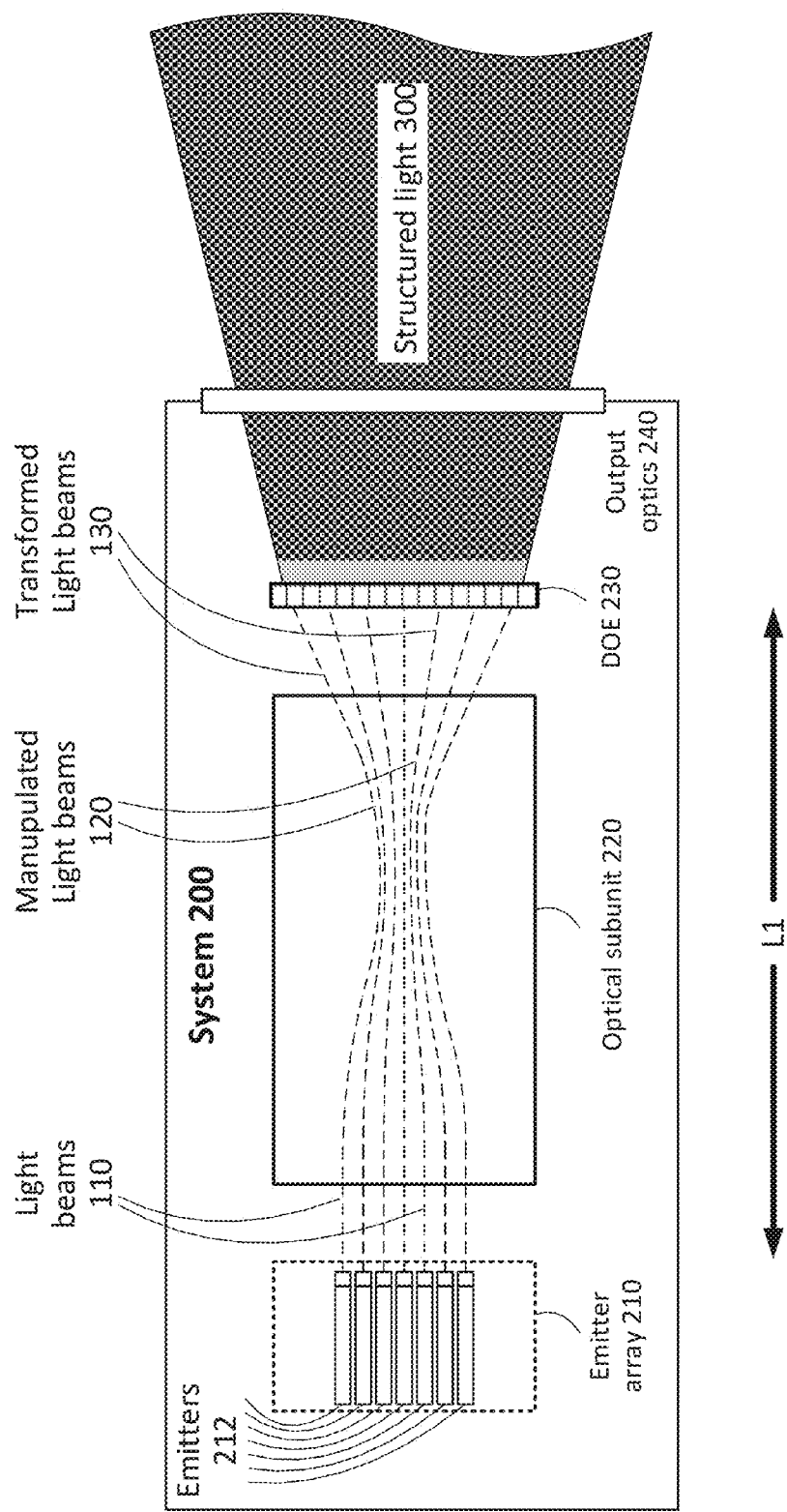

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Unless specifically stated otherwise, as apparent from the following discussions, it is appreciated that throughout the specification discussions utilizing terms such as "processing", "computing", "determining", "generating", "configuring", "selecting", "defining", or the like, include action and/or processes of a computer that manipulates and/or transforms data into other data, said data represented as physical quantities, e.g. such as electronic quantities, and/or said data representing the physical objects. The terms "computer", "processor", and "controller" should be expansively construed to cover any kind of electronic device, component or unit with data processing capabilities, including, by way of non-limiting example, a personal computer, a server, a computing system, a communication device, a processor (e.g. digital signal processor (DSP), and possibly with embedded memory), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

FIG. 1 is a functional block diagram illustrating an example of optical system 200, in accordance with examples of the presently disclosed subject matter. Optical system 200 can include emitter array 210 as a light source whose light can be diffracted by diffractive optical element 230, after being manipulated by optical subunit 220. Along this optical path, the light emitted by emitter array 210 is patterned to provide structured light 300 having a corresponding structured light pattern.

While not necessarily coded, the structured light pattern may be a coded light pattern. The term "coded light pattern" (also occasionally referred to as "structured light pattern" and "coded structured light pattern") is well accepted in the art, and should be construed in a non-limiting way to include patterns which are specially designed so that codewords are assigned to a set of locations (e.g. pixels or pixel neighborhoods) of the pattern. Every coded location (e.g. every coded pixel or coded pixel neighborhoods) has its own codeword, so there is a direct mapping from the codewords to the corresponding coordinates of the location (e.g. pixel or pixel neighborhood) in the pattern. The codewords are symbols (e.g. alphabetic characters such as numbers) which are embedded in the coded pattern, e.g. using any combination of one or more of the following: grey levels, colors, color levels, polarization and geometrical shapes. Examples of coded light pattern are disclosed in various patents and patent applications assigned to the assignee of the present application, such as U.S. Pat. Nos. 8,090,194, 8,538,166, 8,208,719, and International Publication No. WO2008/062407, all of which are hereby incorporated by reference in their entirety.

Emitter array 210 includes a plurality of individual emitters 212, and each emitter 212 in the emitter array 210 is operable to emit a light beam 110. Optical subunit 220 is operable to transform a plurality of light beams 110 emitted by emitter array 210; and diffractive optical element (DOE) 230 is capable of diffracting the transformed light beams 130 so as to provide light patterns.

Diffractive optical element (DOE) 230 is capable of diffracting an incident coherent to provide a light pattern. The term "diffractive optical element" (commonly abbreviated to DOE) is well accepted in the art, and should be construed in a non-limiting way to include phase elements that are capable of creating interference and diffraction to produce arbitrary distributions of light (usually predefined ones). Diffractive optical element 230 may include a thin micro structure pattern to alter the phase of the light propagated through it. This phase pattern, based on its predesign, can be capable of manipulating the light to almost any desired intensity profile of structured light 300.

Emitter array 210, which includes a plurality of individual emitters 212, is operable to emit a plurality of coherent light beams. Each emitter 212 in the emitter array is operable to emit a light beam, out of the aforementioned plurality of light beams. It is noted that while each of the emitted light beams is coherent within itself, the individual emitters may be implemented such that there is no coherence between the individual emitters. The individual emitters 212 of emitter array 210 may be laser emitters. Especially, each emitter 212 of emitter array 210 may be a vertical-cavity surface-emitting laser (VCSEL) emitter.

Optionally, each emitter 212 of the emitter array 210 is a vertical-cavity surface-emitting laser (VCSEL) emitter, each of which forms its own coherent light beam. Optionally, emitter array 210 is dense with individual emitters of coherent light beams, thereby enabling spatially efficient providing of a high energy structured light pattern.

It is noted that the number of emitters 212 in emitter array 210 may be selected according to different considerations such as (though not limited to): required light intensity of system 200, geometrical considerations, design of the structured light pattern to be projected by system 200, physical consideration (such as heat dissipation), and so on. In but few examples, emitter array 210 may be a 3×3 emitters array (i.e. including nine individual emitters 212 arrange in three rows of emitters, each include three individual emitters 212), a 10×20 emitters array, a 30×50 emitters array, a 100×100 emitters array, and so on. It is further noted that the design of the array is not necessarily a squared tiled or even rectangular tiled (i.e. emitters are arranged in rows and columns), and many other designs may be used for the arrangement of emitters 212 within the array. This may include, by way of example, hexagonal tiling, semi-regular tiling, and even irregular tiling.

The light from the various individual emitters 212 of emitter array 210 is provided to optical subunit 220, which is operable to transform the plurality of light beams to provide a plurality of transformed light beams, and to direct the plurality of transformed light beams onto diffractive optical element 230. For the readability of the drawings, the light beams as emitted by emitter array 210 are denoted as light beams 110, and the transformed light beam directed by optical subunit 220 onto DOE 230 are denoted 130. Within optical subunit, the light beams are referred to as manipulated light beams 120. It will nevertheless be clear to a person who is of ordinary skill in the art that the different numerals are used for illustrative purposes and that the different light beams numerals refer to the various stages that the beams of light go through within the system 200.

Optionally, system 200 may include output optics 240 through which the transformed light passes before exiting system 200 and being projected outside (e.g. onto a scene including one or more objects). Output optics may simply transfer the light as is (e.g. a protective window), but may possibly also further manipulate it (e.g. filter it, or direct it towards an object).

Optical subunit 220 may transform the light from emitter array 210 in many ways, in order for system 200 to yield the structured light pattern efficiently (i.e. transducing high percentage of the energy consumed by the emitter array to the projected structured light pattern) and with high quality. For example, structured light pattern efficiency can be defined by a certain (e.g. predefined) efficiency threshold, such as a certain percentage (say 80% or above) transducing of the energy consumed by the emitter array to the projected structured light pattern for a given quality threshold, for example, measured as a function of image resolution and/or a level of noise in the projected pattern. Some of the ways in which the light beams 100 are transformed in the optical subunit 220 are discussed below, with respect to the following figures. It is noted that while optical subunit 220 may include only a single element (e.g. a simple lens), in some cases it would include more than one element (e.g. a series of lenses), and therefore the optical subunit 220 is also occasionally referred to herein as optical assembly 220. In the example of FIG. 1, the path of the light beams within optical subunit 220 is an arbitrary illustrative example, and it is noted that different kinds of paths may be used (e.g. folded paths, etc.).

It is noted that system 200 may be a telecentric system. Optionally, optical subunit 220 may be a telecentric optical subunit, consisting of (or otherwise including) a telecentric compound lens (as is demonstrated for example in FIG. 2). In addition to the compound lens, the telecentric optical subunit (if implemented) may include additional optical components, e.g. mirrors for folding the optical path of the light beams in optical subunit 220. This may be achieved by placing the emitting ends of individual emitters 212 at the focal plane of the telecentric optical subunit (and especially in the focal plane of the telecentric compound lens of optical subunit 220, if so implemented. This is demonstrated by way of example in FIG. 2. Optionally, the plurality of individual emitters 212 are positioned on the back focal plane of the optical subunit. While not necessarily so, the compound lens which may be included in optical subunit 220 as described throughout the present disclosure may be implemented as a compound lens which is commonly referred to as a collimator.

It is noted that optical unit 220 (whether including a compound lens or not) may be designed to produce a desired field of view. It may also be corrected for aberrations and distortion.

As mentioned above, a single DOE element (DOE 230) is used for diffracting a plurality of light beams arriving from different emitters, after these light beams were transformed by optical subunit 220. In optical subunit 220 itself, the same components may be used in order to transform the plurality of light beams 110. That is, optionally, optical subunit 220 may be operable to transform the plurality of light beams 110 to provide the plurality of transformed light beams 130 using transforming optical components (e.g. lenses, mirrors, etc.) included in optical subunit 220, and these transforming optical components may be common to the plurality of light beams. It is noted that not necessarily all of the components of optical subunit 220 are used to transform every single one of light beams 110, and likewise not every light beam 110 must pass through (or be reflected from) all of the optical components of optical subunit 220.

Notably, the dimensions of system 200 may vary between different implementations of the system. For example, different dimensions of the system 200 can be selected according to a utilization for which the system is designated (e.g. overall required illumination pattern size, complexity and intensity, and so on). However, by way of a non-limiting example only, few possible dimensions will be stated.

For example, the distance between emitter array 210 and DOE 230 (denoted L1) may be in the scale of order of a centimeter (e.g. 5 to 50 millimeters). For example, the diameter of optical subunit 220 (and especially of a compound lens included in optical subunit 220), denoted D1, may be also in the same order of magnitude of about a centimeter (e.g. 1 to 20 millimeters). The focal length of a compound lens of optical subunit 220 may be in the same order of magnitude of about a centimeter (e.g. 1 to 20 millimeters). The diameter of each single emitter 212 in emitter array 210 may be in the scale of order of a millimeter (e.g. 0.005-1 millimeter). The field of view (FOV) to which system 200 projects structured light may vary greatly, e.g. between 15°-150°.

The FOV for system 200 may be designed based on various parameters, e.g. depending on the required application. For example, using system 200 for determining range parameters for automotive applications ((e.g. generating 3D image of object in front of the car) may require a large FOV (e.g. 90°), while medical applications may require a smaller FOV (e.g. 45°). Implementations which rely on dense epipolar separation may require the projected light pattern to have relatively low radial distortion, which dictates a relatively low FOV.

Figure 2:
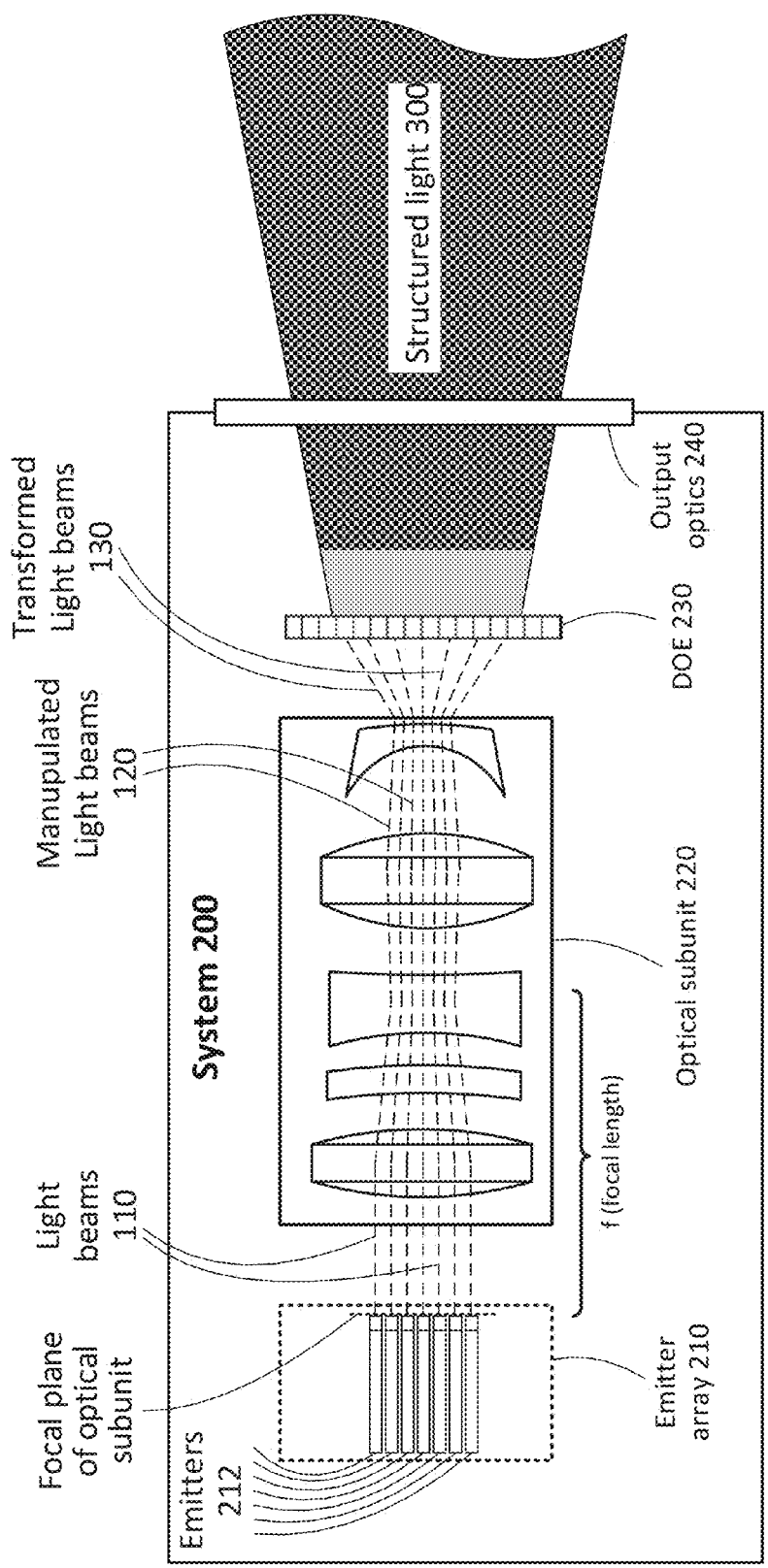

As also demonstrated in FIG. 2, optionally, emitter array 210 and optical subunit 220 are positioned relative to one another such that optical subunit 220 transforms the plurality of light beams 110 by deflecting the plurality of light beams 110, so that the plurality of transformed light beams 130 are projected onto diffractive optical element 230 at different angles of incidence. According to examples of the presently disclosed subject matter, transforming the light beams 130 such that they are projected onto diffractive optical element 230 at different angles of incidence can enable provisioning of a plurality of light patterns by the diffractive optical element 230. Each such light pattern can be a result of one or more transformed light beams striking the DOE 230 at a different angle than the transformed light beams which result in other light patterns.

If the transformed light beams 130 are projected onto DOE 230 at different angles, the structured light pattern projected by system 200 may include the aforementioned plurality of light patterns, as discussed in the previous paragraph. It is noted that the deflection of the plurality of light beams 110 by optical subunit 220 may include refracting these light beams once or more, reflecting these light beams once or more, or any other way of deflecting light beams. It is noted that while not necessarily so, each of the transformed light beams 130 which are deflected by optical subunit 220 may be projected onto DOE 230 at totally different angles (i.e. the incidence angle of the chief ray in each of these transformed light beams 130 would be singular, shared by no other chief ray of another transformed light beam 130).

FIGS. 3A and 3B are functional block diagrams illustrating an example of optical system 200, in accordance with examples of the presently disclosed subject matter.

In FIG. 3A, light rays of a single light beam 110(1) are traced, from emitter 212(1) of emitter array 210, through optical subunit 220 where it is deflected as manipulated light beam 120(1), to its projection onto DOE 230 as transformed light beam 130(1) at incidence angle α, where it is diffracted by diffractive optical element 230 to provide light pattern 140(1).

In FIG. 3B, light rays of two light beams are traced. In addition to light rays of light beam 110(1) discussed above, light rays of an additional light beam, light beam 110(2) are also traced. These light rays of light beam 110(2) are traced from emitter 212(2) of emitter array 210, through optical subunit 220 where it is deflected as manipulated light beam 120(2), to its projection onto DOE 230 as transformed light beam 130(2) at incidence angle β—which is different than the aforementioned angle α—where it is diffracted by the same diffractive optical element, DOE 230, to provide another light pattern 140(2). Clearly, the light rays emitted by other emitters 212 of emitter array 210 may strike onto DOE 230 at yet different angles (other than α and β), and are not illustrated in order to simplify the diagram.

As is demonstrated by way of example in FIG. 3B, the plurality of light beams 110 emitted by emitter array 210 may propagate to the optical subunit 220 in parallel (or substantially parallel) paths. Optionally, all of the light beams 110 may propagate to the optical subunit 220 parallel to a common optical axis 10. It is noted that light beams are parallel to each other even if not all of the rays of one of these light beams are exactly parallel to all of the rays of any other of the light beams—as can be seen, this may be difficult if not impossible due to native divergence of the light source. Light beams are considered parallel to each other if the chief rays of these light beams are parallel to each other. It is noted that the light beams emitted by the individual emitters do not have to be parallel to each other. This may be achieved, for example, by a proper design of a VCSEL array source, or a single field lens placed over the array.

Figure 4A:
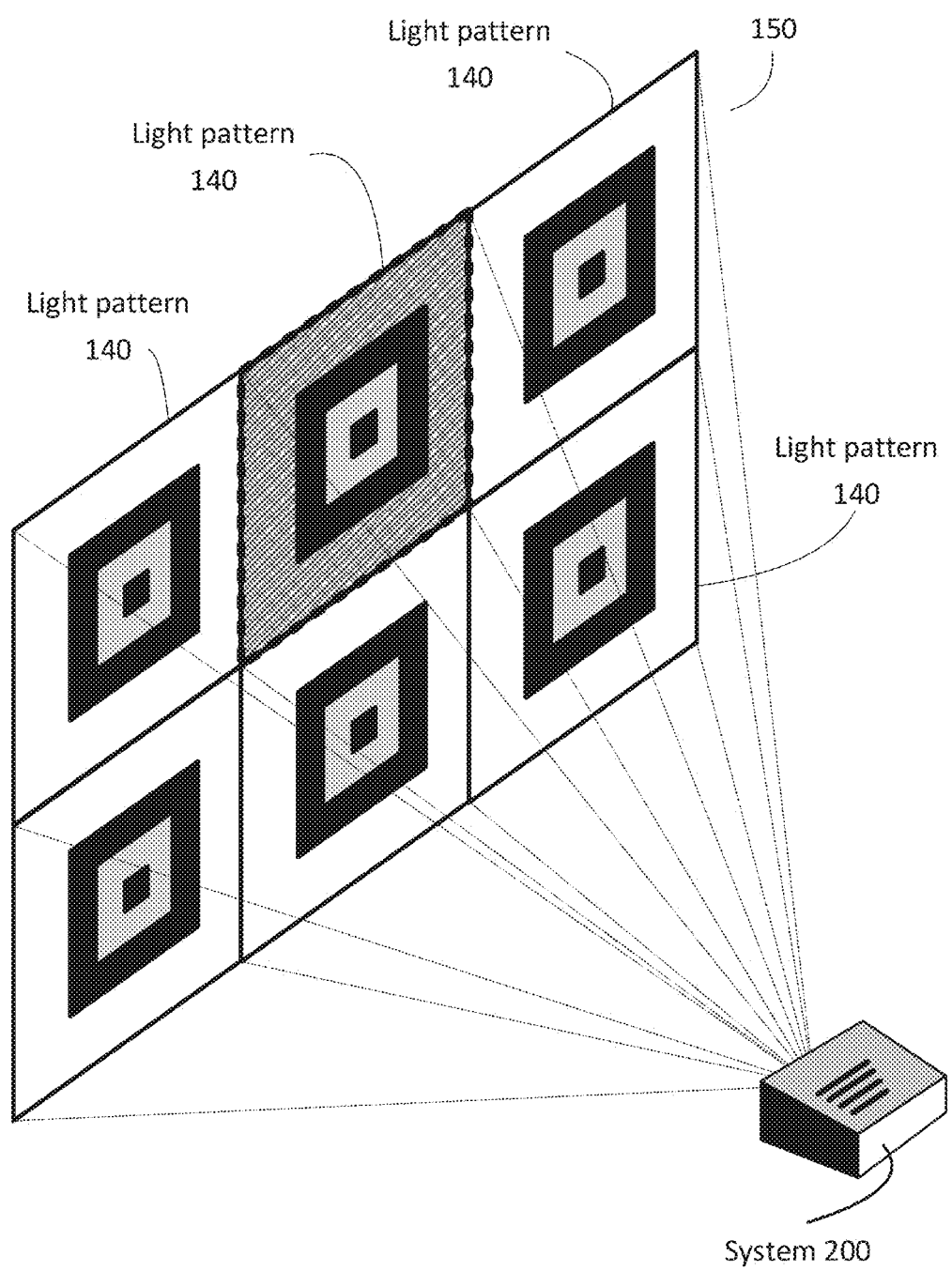
FIGS. 4A and 4B illustrate examples of an optical system within an environment which includes the optical system and a projection of structured light, in accordance with examples of the presently disclosed subject matter.

FIG. 4A illustrates an example of system 200 within an environment which includes system 200 and a projection of structured light (denoted 150), in accordance with examples of the presently disclosed subject matter. In the illustrated example of FIG. 4A, the light beam emitted by each individual emitter of the 3x2 emitter array of system 200 (not illustrated) results in projection of a single light pattern 140, to a total of six such light patterns. Each of the six light patterns is a square bull's-eye pattern (including a black square within a black square frame), and for the sake of illustration, the central top light pattern in the diagram is highlighted.

As can be seen, each of the light patterns 140 is emitted from system 200 in a different angle, and together the light patterns give rise to a structured light pattern projected by system 200, which is a structured light pattern consisting of six square bull's eye targets. Clearly, the shape of each individual pattern in the example of FIG. 4A is arbitrary, and various different light patterns may be designed, based on a desired structured light pattern to be projected by system 200. It is noted that in the illustrated example, the light patterns 140 resulting from the different emitters are contiguous with each other precisely, but this is not necessary, and different light patterns 140 may be designed to partly overlap each other, or be separated from one another and with various gaps in between the patterns.

Since the same DOE 230 is used for the diffraction of the entire plurality of transformed light beams, optionally the plurality of light patterns 140 provided by the diffractive optical element 230 are copies of a predetermined light pattern (such as the repeated square bull's eye pattern in the example of FIG. 4A). It is noted that the copies may be identical copies of each other (similar in pattern and in shape), but may also be spatially distorted copies of the predetermined light pattern. For example, light patterns 140 projected towards the margins of the structured light pattern 150 may be elongated with respect to light patterns 140 projected in the center of structured light pattern 150. This possible elongation may be due to any flat plane on which the structured light may be projected (and especially one which is perpendicular to the optical axis) forming different angles with the chief ray of each projected light pattern 140. Some kinds of distortion which may occur between the centers of different light patterns 140 are distortions types known in the art as "Barrel distortion" (in which image magnification decreases with distance from the optical axis), "Pincushion distortion" (in which image magnification increases with the distance from the optical axis) and "mustache distortion" (which behaves as barrel distortion close to the image center, and gradually turns into pincushion distortion towards the image periphery) or distortions similar thereto. Intensity distortions between the center and the sides of the structured light pattern may also potentially occur in some situations. Some ways in which distortion may be reduced in system 200 are discussed with respect to FIGS. 12A through 12G.

However, in all of these examples, the basic shape of the predetermined light pattern will be kept in all of its copies (e.g. the bull's eye pattern) and for this particular example the shape of the bull's eye pattern will change from being square to a parallelogram. This can be designed to still be recognizable by an interpreter of the structured light pattern (e.g. processing unit 260 discussed below). Like the arrangement of emitters 212 in emitters array 210, the tiling between the copies of the predetermined light pattern (if implemented) is not necessarily a squared tiled or even rectangular tiled (i.e. light pattern copies are arranged in rows and columns), and many other types and shapes of tiling may be used such as, by way of example, hexagonal tiling, semi-regular tiling, and even irregular tiling (i.e. tiling without a repeated pattern).

As mentioned above, optionally the copies of the predetermined light pattern (if implemented) are adjacent to each other (e.g. each copy of the predetermined light pattern may optionally be adjacent to one, or two, or three, etc. other copies of the predetermined light pattern). This may be used for tiling an area whose size is much larger (e.g. at least 50 times larger) than a size of any of the projected copies of the predetermined light pattern. This way, using a relatively simple diffractive optical element as DOE 230 (which is cheaper to design and to manufacture) which is designed to diffract an incident coherent light beam to provide a relatively simple light pattern—to generate much larger and more complex or intricate structured light pattern, e.g. as demonstrated (in small scale, only 6 times larger) in FIG. 4A.

Even more so, in the example of system 200 proposed above, a single diffractive optical element (DOE 230) is used for generating the plurality of copies of the predetermined light pattern, thereby facilitating projection of a high contrast and high clarity overall output pattern of the optical system. In other words, the configuration of system 200 (e.g. utilization of a single diffractive optical element the generating of the plurality of copies of the predetermined light pattern) facilitates projection of a high contrast and high clarity overall output pattern of the optical system.

Figure 4B:
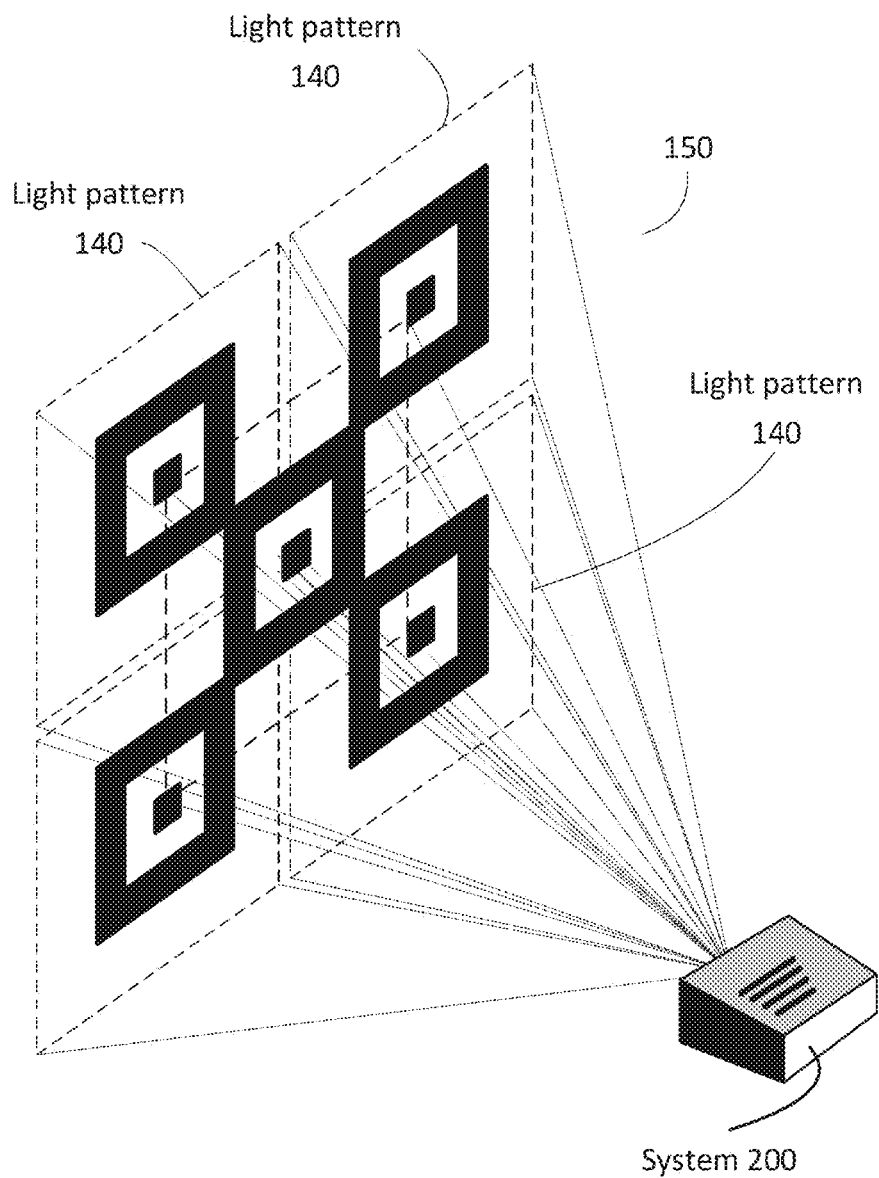

FIG. 4B illustrates an example of system 200 within an environment which includes system 200 and a projection of structured light (denoted 150), in accordance with examples of the presently disclosed subject matter. In the illustrated example of FIG. 4B, the light beam emitted by each individual emitter of the emitter array of system 200 (not illustrated, including five emitters) results in projection of a single light pattern 140, to a total of five such light patterns. Like in FIG. 4A, each of the five light patterns is a square bull's-eye pattern (including a black square within a black square frame). The edges of each of the patterns 140 are marked by a dashed line. As can be seen, each of the patterns 140 partly overlaps at least one other pattern 140.

Optionally, system 200 may be designed so that each provided copy of the predetermined light pattern partly overlaps at least one other provided copy of the predetermined light pattern. The percent of the overlap between two patterns may vary, but it may very well exceed 25% (and possibly significantly more). Overlapping between such patterns may be used for reducing speckle noise, as discussed, for example, with respect to FIG. 4C.

Figure 4C:
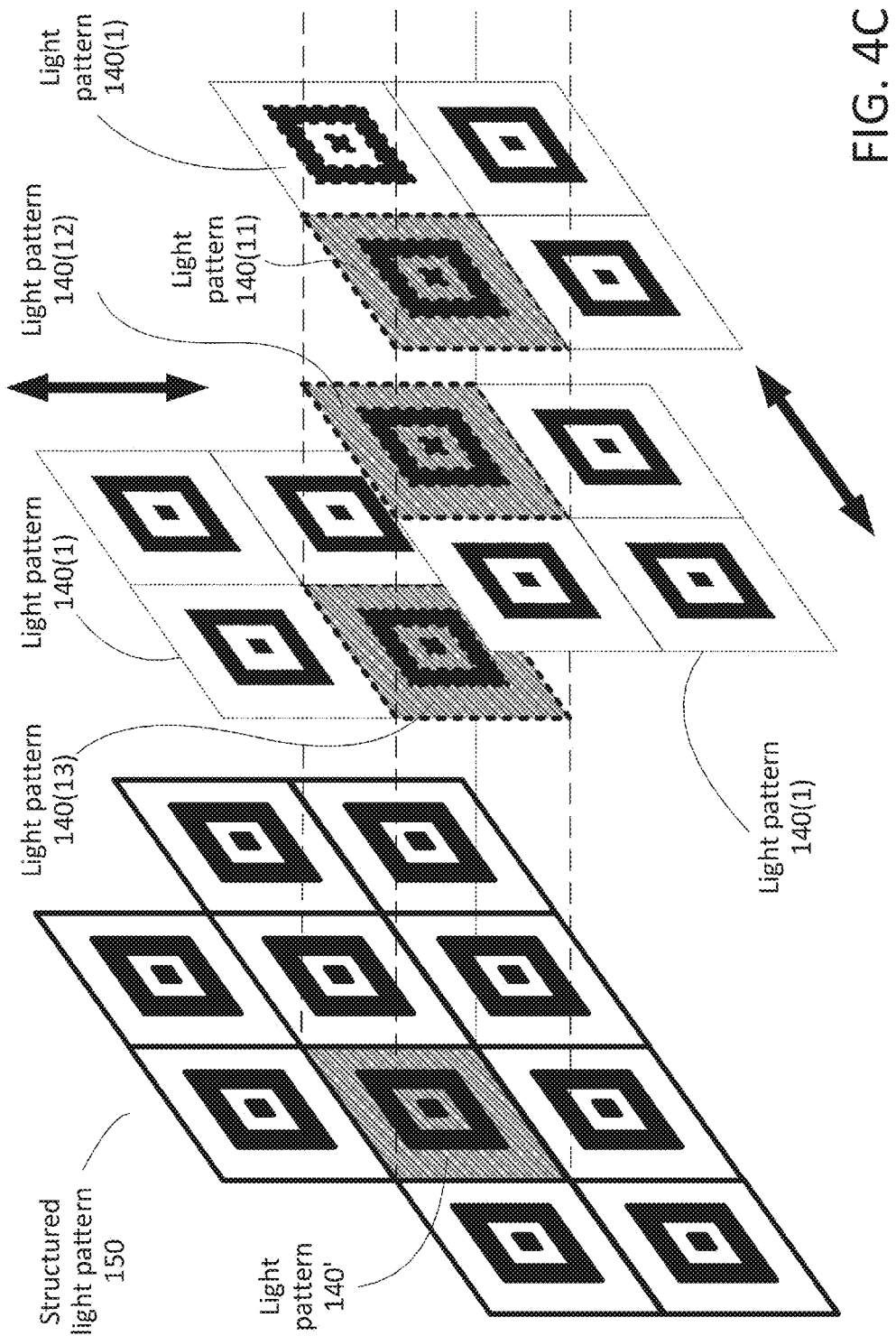
FIG. 4C is an exploded view of an example of the projection of an optical system, including projection of structured light made of a plurality of partially overlapping light patterns, in accordance with examples of the presently disclosed subject matter.

FIG. 4C is an exploded view of an example of the projection of system 200 (not shown), including projection of structured light denoted 150 made of a plurality of partially overlapping light patterns 140, in accordance with examples of the presently disclosed subject matter. In the illustrated example of FIG. 4C, the light beam emitted by each individual emitter of the emitter array of system 200 (not illustrated, including three emitters) results in projection of a single light pattern 140(1), to a total of three such light patterns. In the case of FIG. 4C, each of the three light patterns 140(1) includes four square bull's-eye patterns.

As is demonstrated in the example of FIG. 4C, optionally, the predetermined light pattern (of which the light patterns 140(1) are copies) including multiple copies of a repeated subpattern (in this case—four copies of a repeated bull's eye pattern), wherein in each provided copy 140(1) of the predetermined light pattern, at least one subpattern (i.e. bull's eye pattern in the example) overlaps a subpattern of at least one other provided copy 140(1) of the predetermined light pattern which is generated by light originating from another light emitter. For example, the highlighted subpattern in structured light pattern 150 (denoted 140') is illuminated by subpatterns included in all of the three light patterns 140(11), 140(12) and 140(13) of FIG. 4C (the respective subpatterns are highlighted).

Therefore, the overall intensity in which this subpattern is illuminated arrives from three different individual emitters 212. Optionally, the individual emitters 212 of emitter array 210 are uncorrelated to each other at least in some respects, meaning that while possibly emitting in similar emission spectrum/wavelength, the phases of the different individual emitter are independent of each other. It is noted that such relation of uncorrelation may exist between any pair of emitters 212 in emitter array 210, and may also be limited (if implemented) to subgroups of emitters 212 within emitter array 210. Therefore, the overall intensity in which a subpattern is illuminated may arrive from a plurality of different individual emitters 212 whose phase is independent of each other. Since the illumination arrives from different sources whose phase is independent of each other, the speckle noise may be reduced in comparison to the speckle noise that would have been present in case the same subpattern had been illuminated with the same intensity by a single coherent source (such as a laser emitter).

The degree of overlapping between light patterns may be predesigned according to various criteria. Such criteria may be, for example, the amount of speckle noise desired to be reduced (the more overlapping the better), and on the other had the allowed minimal distance between the emitters (permitted by considerations such as heat dissipation and/or coherency independency).

Figure 5:
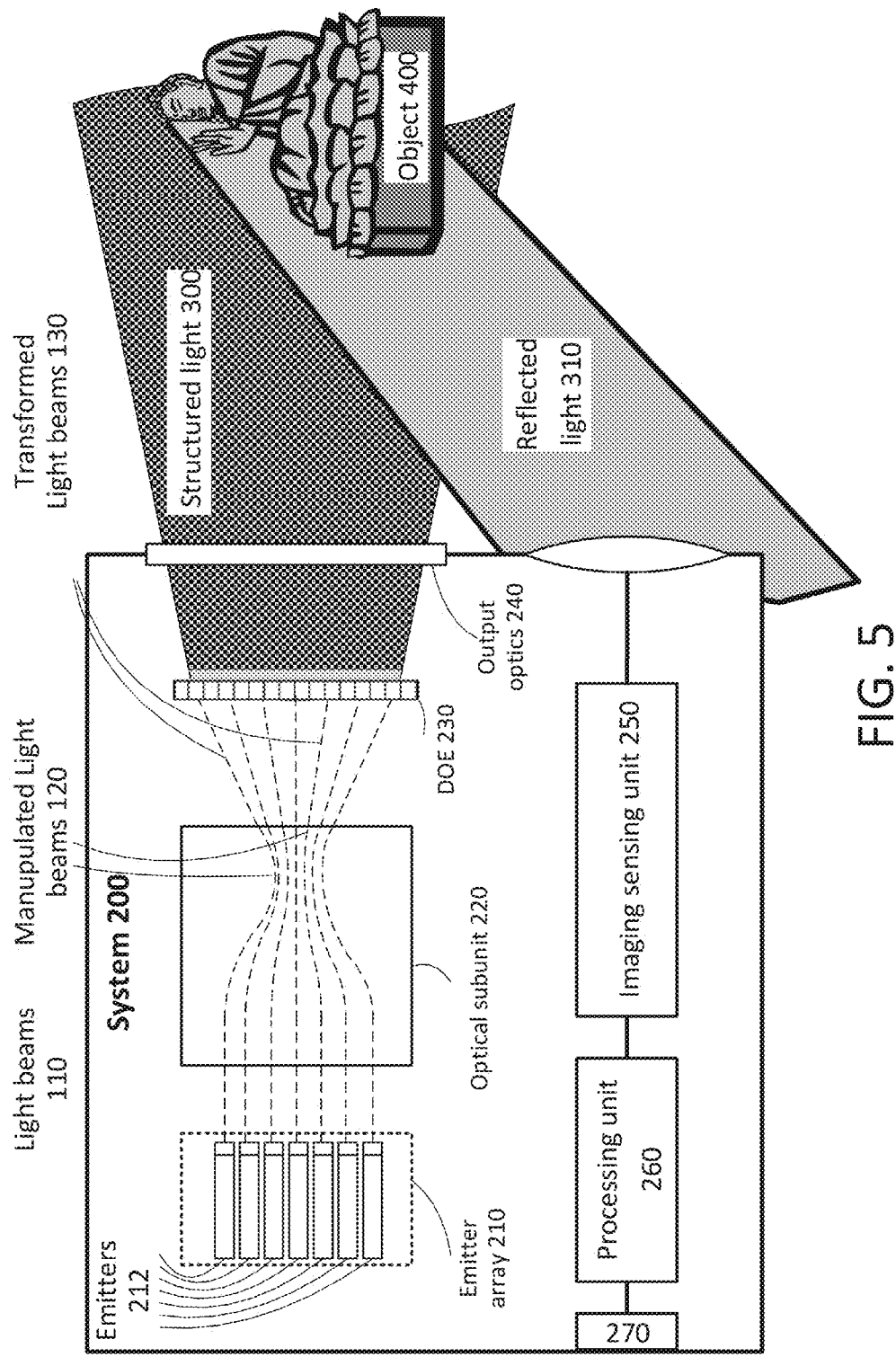
FIGS. 5 and 6 are functional block diagrams illustrating various examples of optical system, in accordance with examples of the presently disclosed subject matter.

FIG. 5 is a functional block diagram illustrating an example of optical system 200, in accordance with examples of the presently disclosed subject matter. In FIG. 5 there is presented a possible utilization of the projection of the structured light pattern 150 in system 200. It is noted that these possible uses are offered by way of a non-limiting example, as many other uses will present themselves to a person who is of skill in the art. Furthermore, while the functionalities of utilizing the projection of system 200 are discussed as being implemented by components of the same system 200, it will be clear that such functionalities may also be implemented by an external system and with additional, fewer or other components for utilizing the projection.

As exemplified in FIG. 4B, while not necessarily so system 200 may include projection optics (such as output optics 240) operable to image at least a part of the structured light pattern onto an object 400. System 200 may further include one or more imaging sensors 250 which are adapted to capture an image of object 400 with the structured light pattern 150 projected thereon. It is noted that the captured image may include only the light of structured light pattern 150 reflected from object 400 (denoted 310, e.g. if using illumination spectrum not found in the ambient lighting of object 150), but may also image additional light on top of the patterned light (such as ambient light reflecting from object 400, or light emitted by object 400). For example, the image of the object 400 can be an IR image.

System 200 in such an implementation may further include processing unit 260 which is adapted to process the image (or a plurality of images, e.g. video; possibly with the addition of other data used in the processing) in order to determine parameters for object 400. Especially, processing unit 260 may be configured and operable to process image data generated by the one or more imaging sensors 250 for determining range parameters for object 400, such as a depth values (e.g. distance from the camera 250) for different parts of the imaged object 400.

Different techniques may be used for analyzing patterned image of an object in order to determine range parameters for the objects. Several such techniques are discussed in U.S. Pat. Nos. 8,090,194, 8,208,719, 8,538,166, and International Publication No. WO2008/062407 assigned to the same assignee, all of which are incorporated herein by reference in their entirety.

Optionally, processing unit 260 may be configured and operable to provide to an external system information which is based on the range parameters determined by it (including the range parameters themselves and/or information which is selected and/or generated based on the range parameters). This may be facilitated by an optional hardware and/or software interface 270 which is illustrated in FIG. 5.

Figure 6:
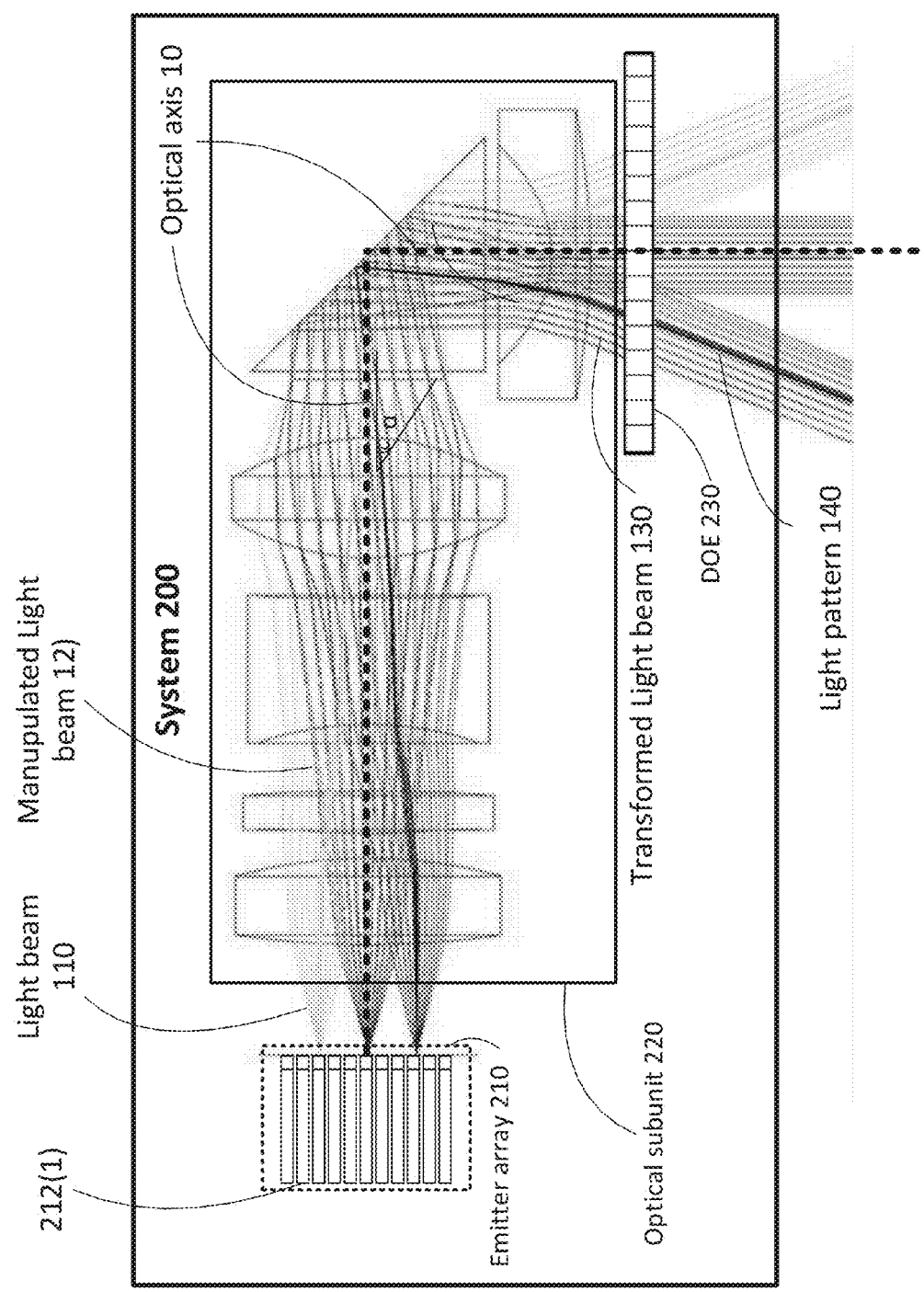

FIG. 6 is a functional block diagram illustrating an example of optical system 200, in accordance with examples of the presently disclosed subject matter. As discussed above, optionally the optical subunit 220 may include a plurality of optical elements having a common optical axis common to the plurality of optical elements (denoted optical axis 10 in FIGS. 3A and 3B). As demonstrated in FIG. 6, optionally the common optical axis 10 is folded at least once.

It is noted that optionally (e.g. as demonstrated in FIG. 6), the transformed light beams 130 which reach the DOE 230 may at least partially overlap with each other (i.e., with one or two or three, etc. other light beams) at the DOE plane.

Figure 7:
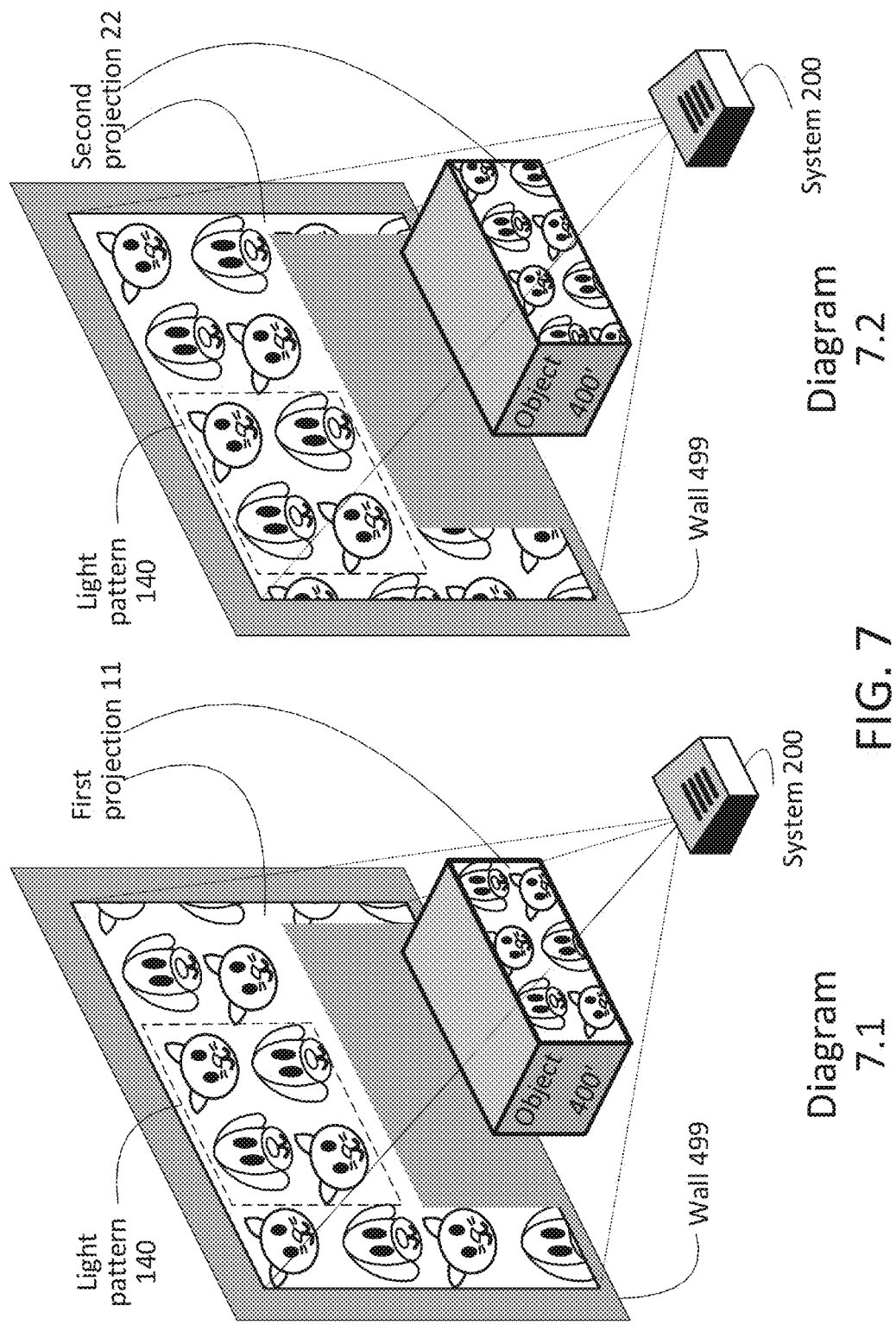
FIG. 7 illustrates an example of an optical system within an environment which includes the optical system and an object, in accordance with examples of the presently disclosed subject matter.

FIG. 7 illustrates an example of optical system 200 within an environment which includes system 200 and an object 400' in accordance with examples of the presently disclosed subject matter. For example, object 400' may be an object for which various parameters—e.g. range parameters—are to be determined by system 200.

As aforementioned, system 200 may be designed so that light beams which are emitted from different emitters 212 of the emitter array 210 result in projection of light pattern in different angles. As demonstrated in FIG. 3B, optionally the angle in which such light pattern resulting from a single emitter 212 is projected—depends on the position of this emitter 212 with respect to optical subunit 220. Such a configuration enables system 200 to project two or more different projections of the structured light pattern, which are shifted with respect to one another. Especially, such a configuration enables system 200 to project two different projections of the structured light pattern, which are rigidly translated with respect to one another.

In the example illustrated in FIG. 7, system 200 includes an emitter array control system (not illustrated) which is configured and operable to control activation of different subgroups of emitters 212 of emitter array 210, thereby resulting in providing of offset overall output patterns of the optical system at different times.

Figure 11:
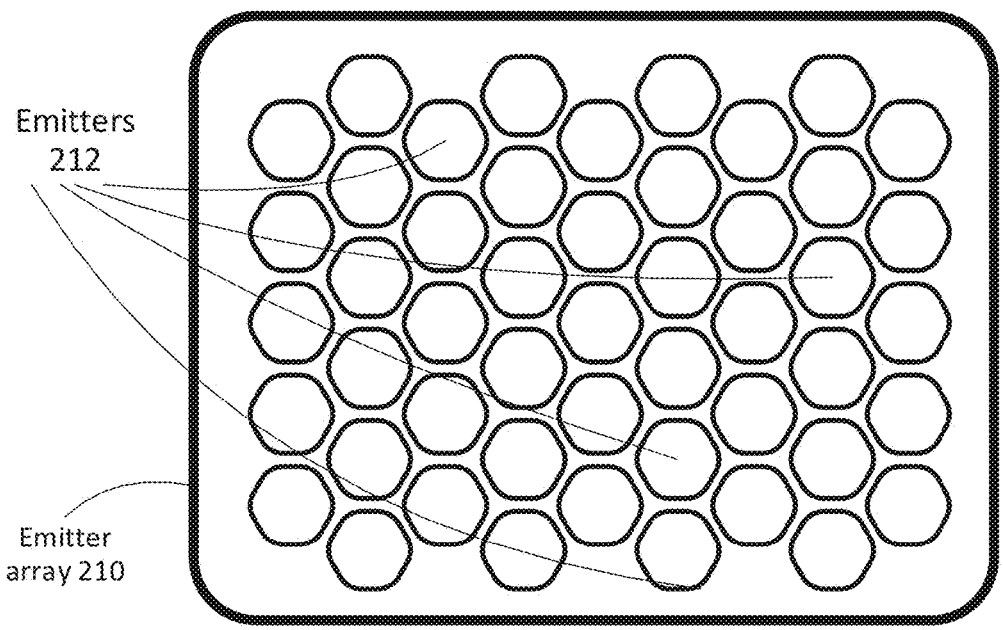
FIG. 11 illustrates a hexagonal configuration of emitter array in accordance with examples of the presently disclosed subject matter.

For example, the individual emitters 212 of emitter array 210 may be arranged in alternating rows (each subgroup including either odd or even rows) of a hexagonally tiled emitter array 210. In hexagonal tiling, each row is shifted with respect to the rows above and below it, and therefore for each emitter 212 in a given row, the adjacent emitters 212 in the adjacent rows of emitters are located diagonally with respect thereto. FIG. 11 illustrates a hexagonal configuration of emitter array in accordance with examples of the presently disclosed subject matter.

The result of such a configuration are exemplified in FIG. 7. such an alternating activation of different subgroups of emitters 212 may enable system 200 to project onto an object 400' (and onto a background scene which includes in this example a wall denoted 499) a first projection of the structured light pattern (denoted "First projection 11" in diagram 7.1 of FIG. 7) and a second projection of the structured light pattern (denoted "Second projection 22" in diagram 7.2 of FIG. 7). The light pattern created by the light of each light beam 110 is denoted light pattern 140 in the two diagrams of FIG. 7.

First projection 11 and second projection 22 of the structured light pattern 150 may be projected onto the scene in different times (for example, diagram 3A illustrates the environment in time T1, and diagram 3B illustrates the environment in time T2 which is later than T1). First projection 11 and second projection 22 of the structured light pattern 150 may be projected onto the scene at least partly concurrently, e.g. in a configuration in which the emitters 212 of different subgroups emits light in different wavelengths.

As can be seen, the first projection 11 and the second projection 22 of the structured light pattern (which in this case is a coded light pattern which includes alternating zoomorphic graphemes) are rigidly shifted with respect to one another. As is also demonstrated in FIG. 7, the structured light pattern may appear on different scale, depending on the distance of a lighted object from system 200, and one object may cast a shadow on another object, thereby hiding a part (or the entirety) of another object from system 200 from a given perspective.

In the following figures, examples of variations of some of the ways in which optical subunit 220 may transform the light of emitter array 210, and some of the benefits of such configurations, are discussed in greater detail.

Figure 8:
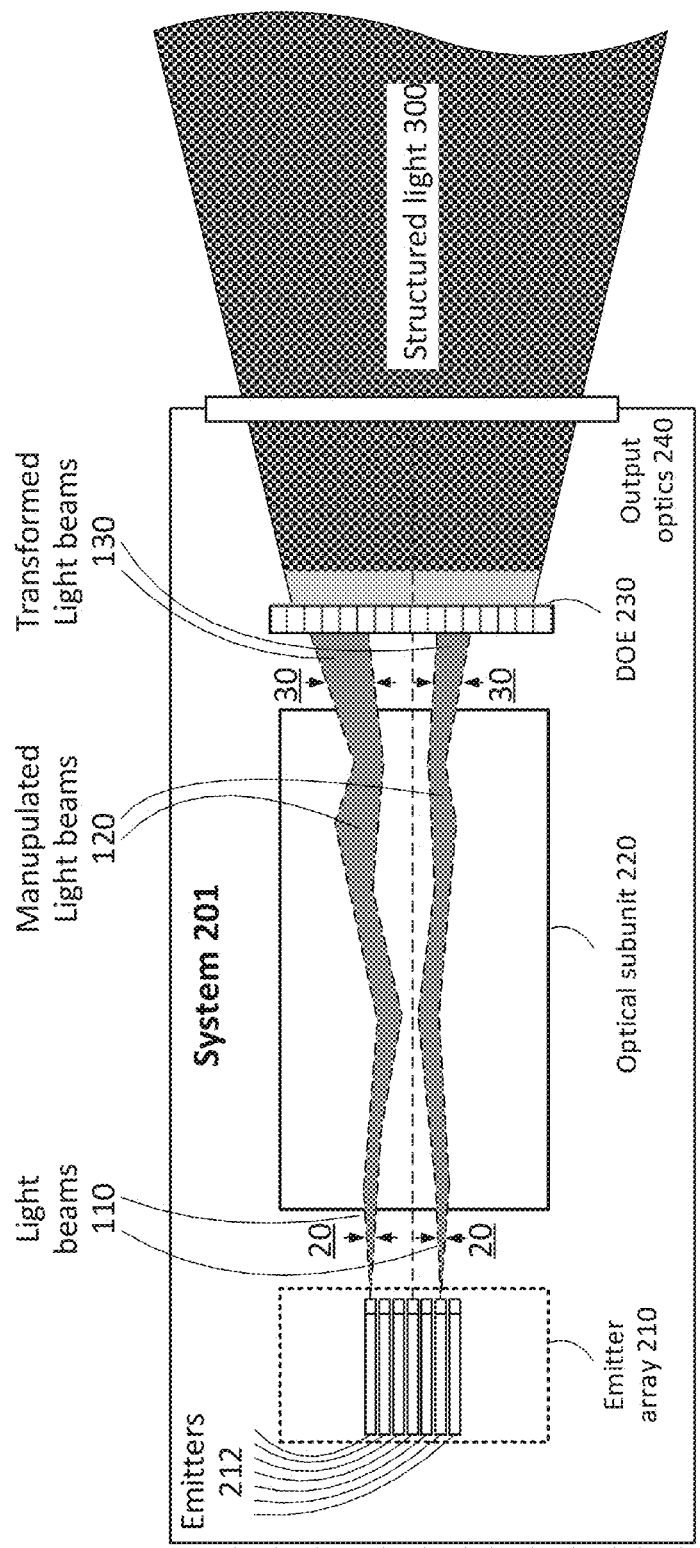
FIGS. 8, 9 and 10 are functional block diagrams illustrating various examples of optical system, in accordance with examples of the presently disclosed subject matter.

FIG. 8 is a functional block diagram illustrating an example of optical system 201 in accordance with examples of the presently disclosed subject matter. It is noted that system 201 may be implemented with any of the variations of system 200 discussed above. It is however noted that system 201 may incorporate any of the features, components and abilities discussed above with respect to system 200 as general. Furthermore, system 201 may incorporate any of the features, components and abilities discussed below with respect to systems 202, 203, 204 and 205. The components of system 201 are denoted using the same numeral reference used for the components of system 200, and the variations discussed with respect to these components in other parts of the document may also pertain, mutatis mutandis, to system 201.

In system 201, emitter array 210 includes a plurality of individual emitters 212. Each emitter 212 in the emitter array 210 of system 201 is operable to emit a light beam 110 which is characterized by a native beam width 10. Optical subunit 220 of system 201 is operable to transform a plurality of light beams 110 emitted by the emitter array 210, wherein each of the transformed light beams 130 is characterized by an expanded beam width 30 that is wider than the native beam width 10 of the corresponding light beam 110, and which is wider than a facilitating beam width. DOE 230 in system 201 is capable of diffracting the transformed light beams so as to provide light patterns whose angular resolution meets a light pattern target angular resolution criteria.

System 201 is an optical system which includes a diffractive optical element (DOE 230), capable of diffracting an incident coherent light beam to provide a light pattern. It is noted that while not necessarily so, the resolution of the light pattern provided by the DOE 230 has a positive correlation with a width of the incident light beam. That is, the wider the incident light beam, the finer resolution that the DOE would be able to produce.

A facilitating beam width is hereby defined for DOE 230, so that incidence upon DOE 230 of coherent light beams that are wider than the facilitating beam width would result in provision of light patterns whose angular resolution meets a light pattern target angular resolution criteria.

For example, for many practical DOE's the beam width should cover at least 4 periods of the grating structure. So, for example, if we require an inter beam resolution of 6 mRad at a wavelength of 850 nm, the grating period d will be given by $d \sin \theta = \lambda$, where $\theta = 6$ mRad, $\lambda = 850$ nm. From this $d = 0.14$ mm. Therefore to achieve this angular resolution of 6 mRad the beam width at the DOE has to be at least $4 \times d = 0.57$ mm Light emitters which emit coherent light beams that are wider than the facilitating beam width may be created. However, the physical size of such emitters, the heat which they produce or the possibility to pack a large number of such light sources into a compact packaging may render utilization of such light emitters impractical for system 201. Therefore, utilization of emitters which emit narrower light beams is investigated below with respect to system 201.

System 201 further includes emitter array 210 which includes a plurality of individual emitters. Emitter array 210 of system 201 is operable to emit a plurality of coherent light beams. Each emitter 212 in emitter array 210 of system 201 is operable to emit a light beam 110 (out of the plurality of light beams 110), which is characterized by a native beam width. For the sake of clarity of illustration, only two light beams 110 are illustrated in FIG. 8.

The beam diameter or beam width of an electromagnetic beam is the diameter along any specified line that is perpendicular to the beam axis and intersects it. Since beams typically do not have sharp edges, the diameter can be defined in many different ways. Some definitions of beam width which are well accepted in the art include D4σ, 10/90 (or 20/80) knife-edge, 1/e2, FWHM, and D86. It is noted that the native beam width of a light beam 110 emitted by an emitter 212 may be measured at any point between the respective emitter 212 and the point in which that light beam 110 meets the first optical component of optical subunit 220 (e.g. a lens, a mirror, etc.). Such native beam widths are denoted as native widths 20 in FIG. 8.

Optical subunit 220 in system 201 (which may be an optical assembly which includes a plurality of optical elements) is operable to transform the plurality of light beams 110 to provide a plurality of transformed light beams 130, and to direct the plurality of transformed light beams 130 onto the diffractive optical element 230, resulting in providing of a structured light pattern 150 (not illustrated) by optical system 201.

In system 201, each of the transformed light beams 130 is characterized by an expanded beam width (denoted 30) that is wider than the native beam width 20 of the corresponding light beam 110. Furthermore, the expanded beam widths 30 of the plurality of transformed light beams 130 are larger than the facilitating beam width.

The expansion of light beams 110 may enable utilizing light sources whose native beam width is below the aforementioned facilitating beam width of DOE 230 (e.g. which in turn may enable, for example, using emitters of smaller dimensions, using emitters which produce relatively less heat, pack a large number emitters into a tight volume, and so on).

Optionally, each emitter 212 in emitter array 210 is operable to emit a light beam whose native beam width is narrower than the facilitating beam width. Optionally, each emitter 212 in emitter array 210 is operable to emit a light beam whose native beam width is narrower than the facilitating beam width by a factor of at least 2. Optionally, each emitter 212 in emitter array 210 is operable to emit a light beam whose native beam width is narrower than the facilitating beam width by a factor of at least 5.

Optionally, each emitter 212 in emitter array 210 is operable to emit a light beam whose native beam width is narrower than the facilitating beam width by at least one order of magnitude.

For example, the native beam widths 20 of light beams 110 in system 201 may be 10-100 micrometer, while the expanded beam widths 30 of the corresponding transformed light beams 130 may be 100-1000 micrometer. Optionally, the expanded beam widths 30 of transformed light beams 130 in system 201 may be at least 3 times larger than the corresponding native beam widths 20 of the corresponding light beams 110.

An example of utilization for the expansion of beams for the miniaturization of system 201 is the ability to pack the emitters 212. For example, optionally for each individual emitter 212 of emitter array 210 there is at least one other individual emitter 212 of the emitter array 210 positioned at a distance which is at least 10 times smaller than any beam-width 30 of any transformed light beam 130 out of the plurality of transformed light beams 130.

As discussed with respect to system 200, optionally optical subunit 220 of system 201 is an optical assembly which includes a plurality of optical elements. Furthermore, this plurality of optical element may have a common optical axis common to the plurality of optical elements.

As discussed above (e.g. with respect to FIGS. 3A and 3B), emitter array 210 and optical subunit 220 may be positioned relative to one another such that optical subunit 220 further transforms the plurality of light beams (in addition to expanding the width of the beams) by deflecting the plurality of light beams 110, so that the plurality of transformed light beams 130 are projected onto diffractive optical element 230 at different angles of incidence, resulting in providing of a plurality of light patterns 140 by diffractive optical element 230 (where the structured light pattern 150 includes these plurality of light patterns 140).

It is noted that in addition to expanding the width of the light beams 110, optical subunit 220 may transform the light beams 110 in additional ways, which would contribute to the efficiency and quality of the projection of system 201 even more. For example, optical subunit 220 may further transform the light beams 110 in order to reduce their divergence (collimating the beams).

Each emitter 212 in the emitter array 210 is operable to emit a light beam 110 (out of the plurality of light beams 110) which is characterized by a divergence (referred to below as the first beam divergence of the light beam 110 of this emitter 212). Optionally, optical subunit 220 of system 201 is further operable to transform the plurality of light beams 110, so that each of the transformed light beams 130 is characterized by a second beam divergence that is smaller than the first beam divergence of the corresponding light beam 110. The reduction of the divergence of the light beams 110 is further investigated with respect to system 202.

Figure 9:
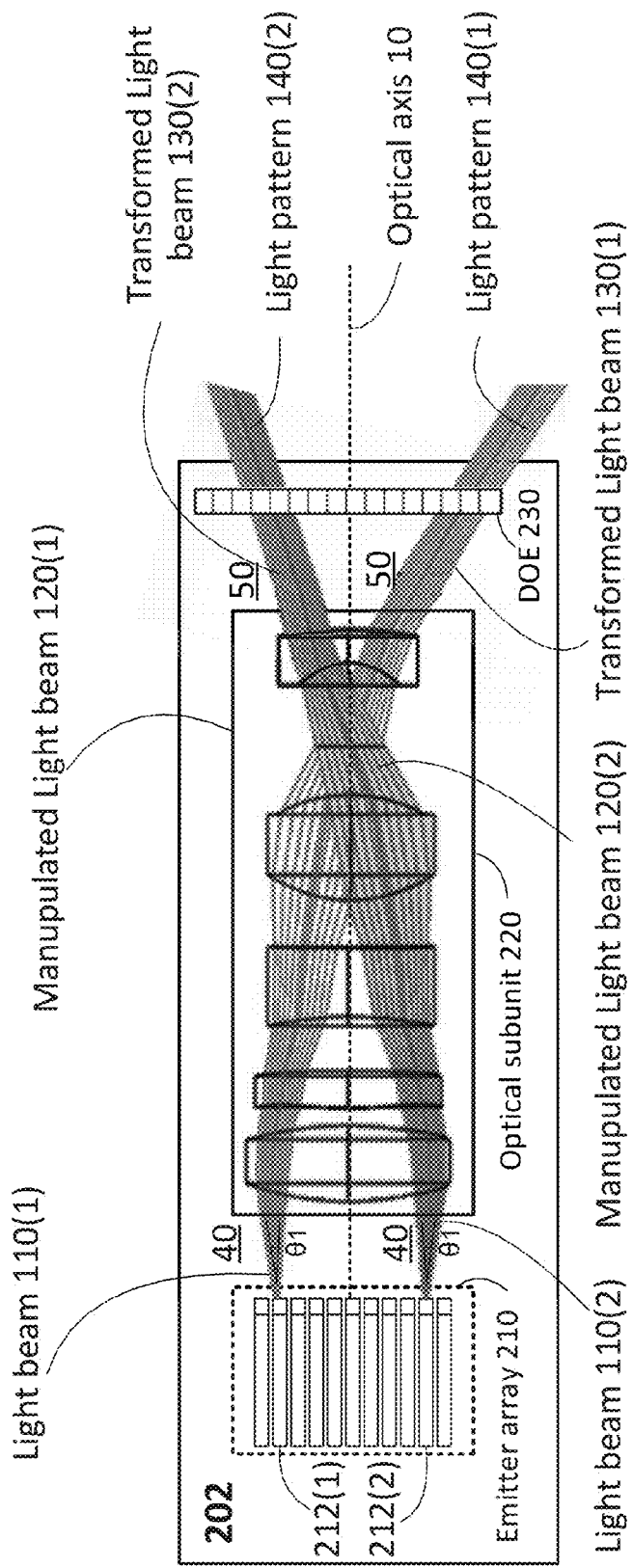

FIG. 9 is a functional block diagram illustrating an example of optical system 202 in accordance with examples of the presently disclosed subject matter. It is noted that in further examples, system 202 may be implemented with any of the variations of system 200 discussed above. It is however noted that system 202 may incorporate any of the features, components and abilities discussed above with respect to system 200 as general. Furthermore, system 202 may incorporate any of the features, components and abilities discussed below with respect to systems 201, 203, 204 and 205. The components of system 202 are denoted using the same numeral reference used for the components of system 200, and the variations discussed with respect to these components in other parts of the document may also pertain, mutatis mutandis, to system 202.

System 202 is an optical system which includes a diffractive optical element (DOE 230), capable of diffracting an incident coherent light beam to provide a light pattern. It is noted that while not necessarily so, the contrast of the light pattern provided by the DOE 230 has a negative correlation with the divergence of the incident light beam. That is, the lesser the divergence of the incident light beam, the better contrast will the DOE be able to produce.

Light emitters which emit coherent light beams and whose emitted light coherent light beams are characterized by relatively low divergence can be created. However, the physical size of such emitters, the heat they produce or the possibility to pack a large number of such light sources into a compact packing may render utilization of such light emitters impractical for system 202. Therefore, utilization of emitters which emit light beams with divergence that is larger than the divergence of the light beams which ultimately reaches the DOE is investigated below with respect to system 202.

System 202 is an optical system, which includes at least diffractive optical element 230 (capable of diffracting an incident coherent light beam to provide light pattern 150), emitter array 210 which includes a plurality of individual emitters 212, and optical subunit 230.

As aforementioned, each emitter 212 in emitter array 210 is operable to emit a light beam 110, out of the plurality of light beams 110, which is characterized by a first beam divergence. Such first beam divergence is denoted first beam divergence 40 in FIG. 9.

In system 202, emitter array 210 includes a plurality of individual emitters 212. Each emitter 212 in emitter array 210 is operable to emit a light beam 110 which is characterized by a first beam divergence. Optical subunit 220 in system 202 is operable to transform a plurality of light beams 110 emitted by emitter array 210, wherein each of the transformed light beams 130 is characterized by a second beam divergence that is smaller than the first beam divergence of the corresponding light beam 110. DOE 230 is capable of diffracting the transformed light beams to provide light patterns.

Optical subunit 220 is operable to transform the plurality of light beams 110 to provide a plurality of transformed light beams 130 and to direct the plurality of transformed light beams 130 onto diffractive optical element 230, to thereby provide structured light pattern 150 by optical system 202. Each of these transformed light beams 130 provided by optical subunit 220 of system 202 is characterized by a second beam divergence (denoted 50 in FIG. 9) that is smaller than the first beam divergence 40 of the corresponding light beam 110.

Optionally, a facilitating beam divergence ($\theta$max) is defined for DOE 230 so that incidence upon the DOE 230 of coherent light beams whose divergence is lower than the facilitating beam divergence ($\theta$beam<$\theta$max) results in provisioning of light patterns whose contrast meets a light pattern target contrast criteria. In such case, system 202 may be designed so that the second beam divergences 50 of the plurality of transformed light beams 130 in system 202 are lower than the facilitating beam divergence ($\theta$max). The light beams have to be wider than the facilitating beam width.

Therefore, transforming the light beams 110 by the optical subunit 220 of system 202 enables to achieve better contrast compared to a design that does not include the optical unit 220. Also, by transforming the light beams 110, it is possible to utilize emitters 210 which are capable of emitting light beams 110 that are characterized by larger divergence than would otherwise be required, and still receive a structured light pattern with high contrast. Furthermore, it is noted that emitters with narrow light beams (whose use for miniaturization etc. is discussed with respect to system 201 above) can also have larger divergence than is possible to achieve with emitters that produce wider light beams. Therefore, reducing the divergence of light beams 110 by optical subunit 220 enables utilizing emitters with divergence that is larger than the facilitating beam divergence, and also emitters which emit narrow light beams.

Optionally, each emitter 212 in emitter array 210 is operable to emit a light beam 110 whose first beam divergence 40 is larger than the facilitating beam divergence ($\theta$max) by at least one order of magnitude.

Optionally, each emitter 212 in emitter array 210 is operable to emit a light beam 110 whose native beam width 20 is narrower than the facilitating beam width by at least one order of magnitude, and whose first beam divergence 40 is larger than the facilitating beam divergence ($\theta$max) by at least one order of magnitude.

Optionally, optical subunit 220 may be operable to reduce a divergence of each light beam 110 out of the plurality the light beams 110 by at least 90% to provide the respective transformed light beam 130.

For example, the first beam divergences of the light beams 110 emitted by emitter array may be 100 mrad-500 mrad, while the second beam divergences of the corresponding light beams may be 5 mrad-50 mrad.

As aforementioned, optionally optical subunit 220 is operable to transform the plurality of light beams 110 to provide the plurality of transformed light beams 130 using transforming optical components of the optical subunit 220 which are common to the plurality of light beams 110.

As also discussed above, optionally emitter array 210 and optical subunit 220 are positioned relative to one another such that optical subunit 220 further transform the plurality of light beams 110 by deflecting the plurality of light beams 110 to thereby cause the plurality of transformed light beams 130 to be projected onto diffractive optical element 230 at different angles of incidence, resulting in providing of a plurality of light patterns 140 by the diffractive optical element.

As aforementioned, packing many individual emitters in a small emitter array may improve the quality of the structured light pattern 150 projected by system 200 in many ways, such as improving its angular resolution, its speckle noise, etc. It may also contribute to the miniaturization of system 200, to lowering the system's 200 energy consumption, etc.

Figure 10:
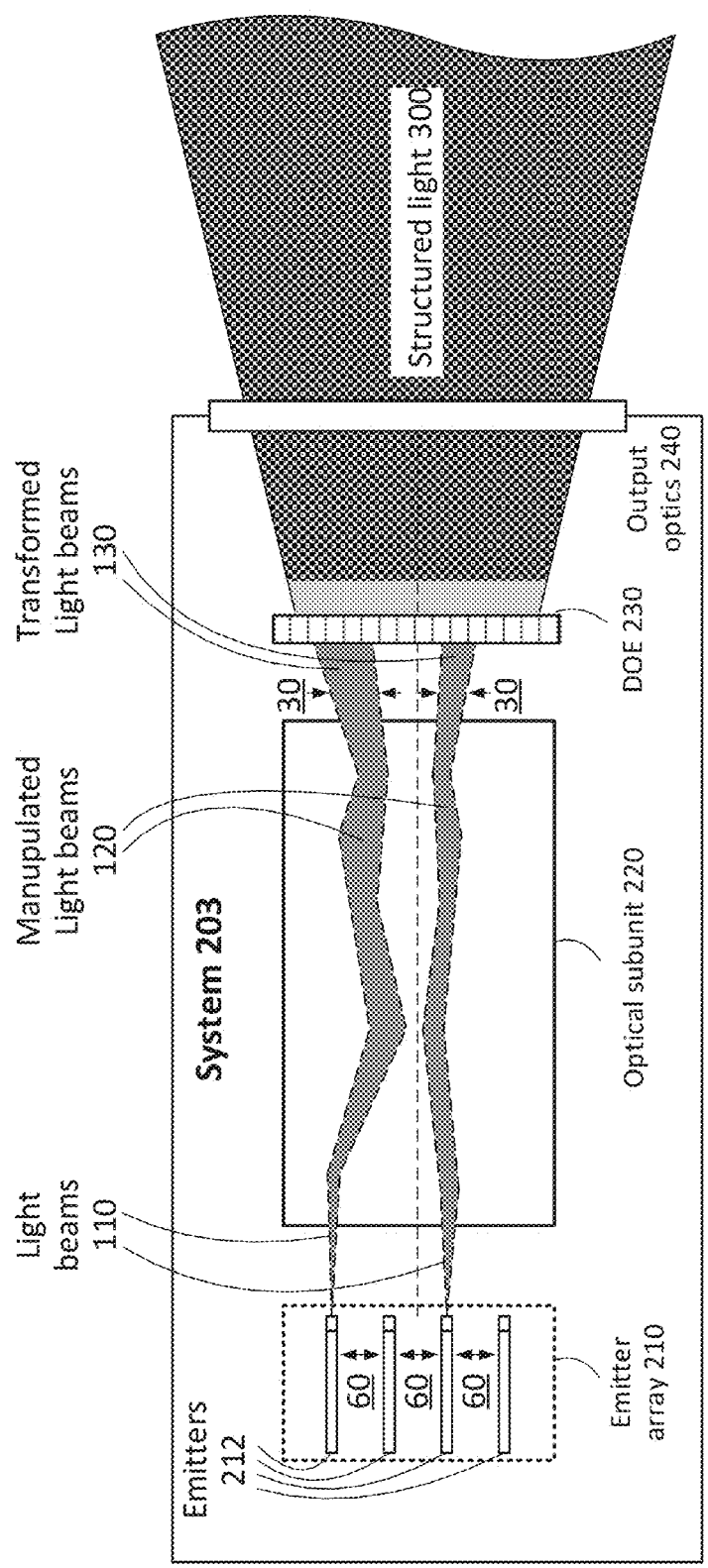

FIG. 10 is a functional block diagram illustrating an example of optical system 203 in accordance with examples of the presently disclosed subject matter. It is noted that system 203 may be implemented with any of the variations of system 200 discussed above. It is however noted that system 203 may incorporate any of the features, components and abilities discussed above with respect to system 200 as general. Furthermore, system 203 may incorporate any of the features, components and abilities discussed below with respect to systems 201, 202, 204 and 205. The components of system 203 are denoted using the same numeral reference used for the components of system 200, and the variations discussed with respect to these components in other part of the document may also pertain, mutatis mutandis, to system 203.

System 203 includes at least (a) diffractive optical element 230 which is capable of diffracting an incident coherent light beam to provide a light pattern, (b) emitter array 210 which includes a plurality of individual emitters 212 (the emitter array 210 is operable to emit a plurality of coherent light beams), and (c) optical subunit 220.

In system 203, emitter array 210 includes a plurality of individual emitters 212. Each emitter 212 in the emitter array 210 is operable to emit a light beam 110. Optical subunit 220 in system 203 is operable to:

a. transform a plurality of light beams 110 emitted by the emitter array 210, wherein the transformation includes expansion and/or collimation of the plurality of light beams 110; and
b. direct the plurality of transformed light beams onto the diffractive optical element at different angles of incidence, resulting in providing of a plurality of light patterns by the diffractive optical element.

DOE 230 in system 203 is capable of diffracting the transformed light beams to provide light patterns;

Furthermore, in emitter array 210 of system 203, for each individual emitter 212 there is at least one other individual emitter 212 of emitter array 210 which is positioned at a distance which is smaller than any beam width 30 of any transformed light beam 130 out of the plurality of transformed light beams 130. The distance between any two emitters is denoted 60 in FIG. 10.

As discussed above with respect to system 200, optionally optical subunit 220 is operable to transform the plurality of light beams 110 to provide the plurality of transformed light beams 130 using transforming optical components of optical subunit 220 which are common to the plurality of light beams 110.

FIGS. 12A through 12G include diagrams which are related to possible distortions in the light patterns generated by system 200, and ways to reduce such distortion, in accordance with examples of the presently disclosed subject matter. It is noted that distortion and other problems may occur throughout the generated light pattern, and especially at the edge of the field of projection of the light pattern. In the discussion pertaining to FIGS. 12A through 12G it is assumed that the light pattern 150 includes a plurality of points, and that structured light pattern 150 is constructed from a plurality of light patterns 140 (as discussed above, e.g. with respect to FIGS. 4A, 4B and 4C. The exemplary light pattern 140 used in the examples of FIGS. 12A through 12G is designed to include a plurality of regularly spaced points, as exemplified in FIG. 12A. In the following discussion pertaining to FIGS. 12A through 12G, light pattern 140 is also referred to as "tile pattern".

Figure 12A:
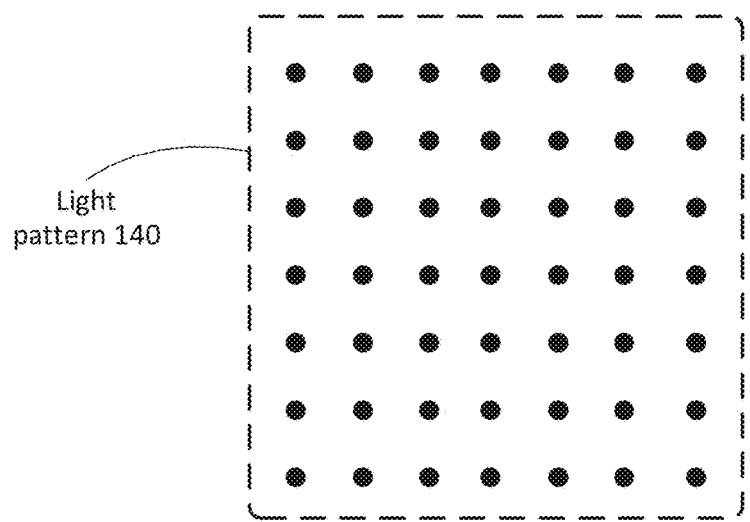
Figure 12B:
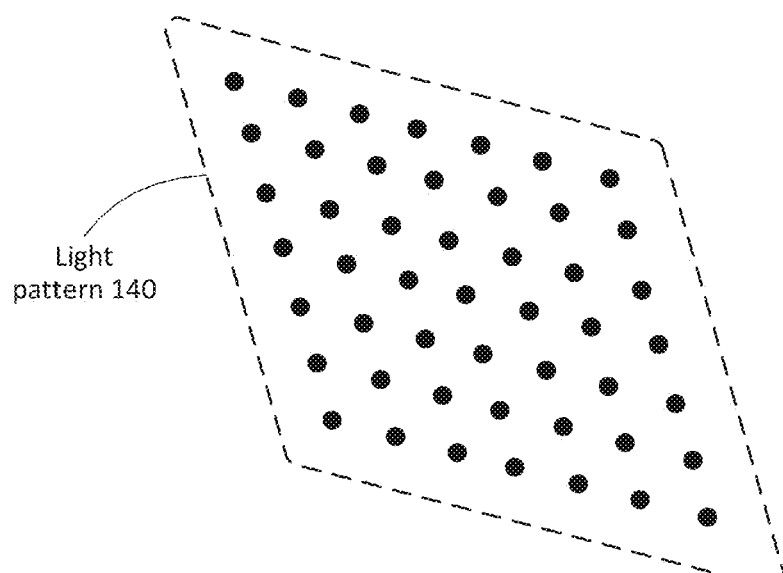

In the present example, the tile pattern 140 at the center of the field will form a nearly rectangular shape containing regularly spaced points, whereas at the edge of the field the points of each tile pattern will form a nearly parallelogram shape, as exemplified in FIG. 12B. The reason for this distortion of the tile pattern is that for different light beams emitted by different emitters 212 of emitter array 210, the distance of the chief ray of the light beams from the DOE to the object plane is very different for tile patterns located in different field points. It is noted that the distortion assumes a non-spherical plane on which the structured light pattern 150 is projected. If the object plane was spherical then the distance from DOE 230 to the object on which the light pattern is projected would have been the same.

In the example of FIGS. 12A through 12G, the tile pattern includes forty nine points formed by diffraction through DOE 230. The tile pattern of FIG. 14A is formed using a light beam whose chief ray angle (CRA) is zero. The source light beam in the example of FIG. 14A is a simple laser beam parallel to the optical axis. The source light beam in the example of FIG. 12B is a simple laser beam which propagates towards the DOE diagonally to the optical axis.

Figure 12C:
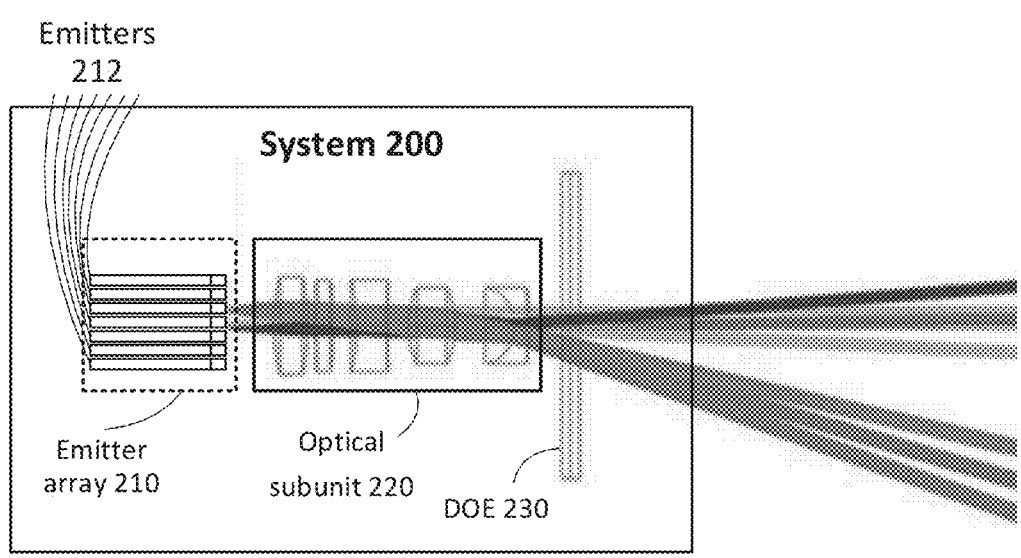
Figure 12D:
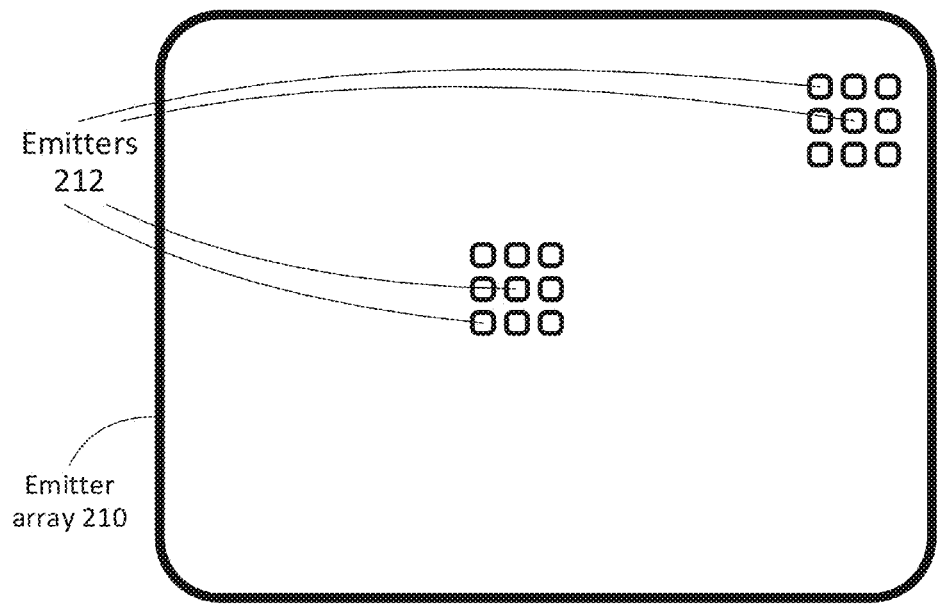
Figure 12F:
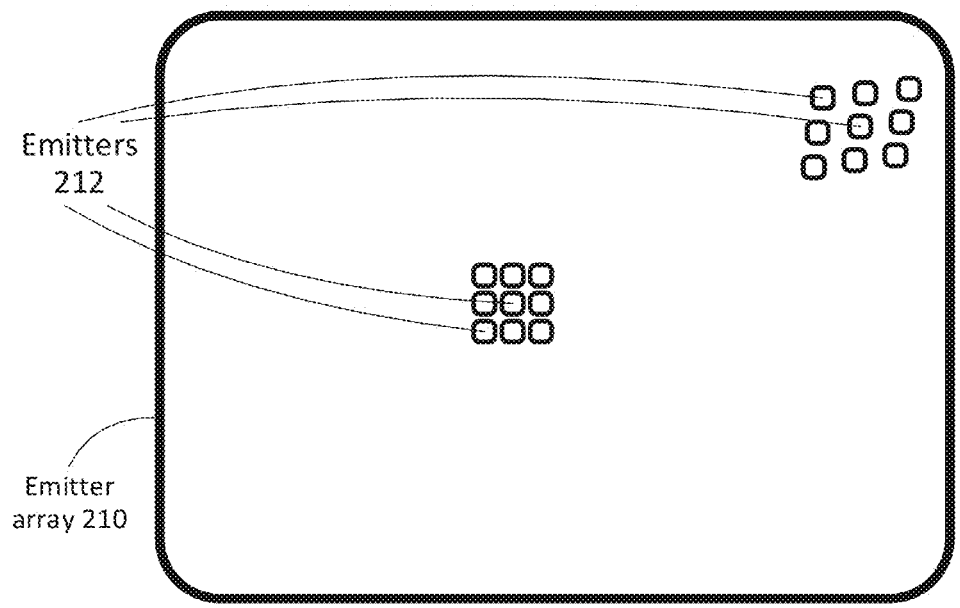
Figure 12E:
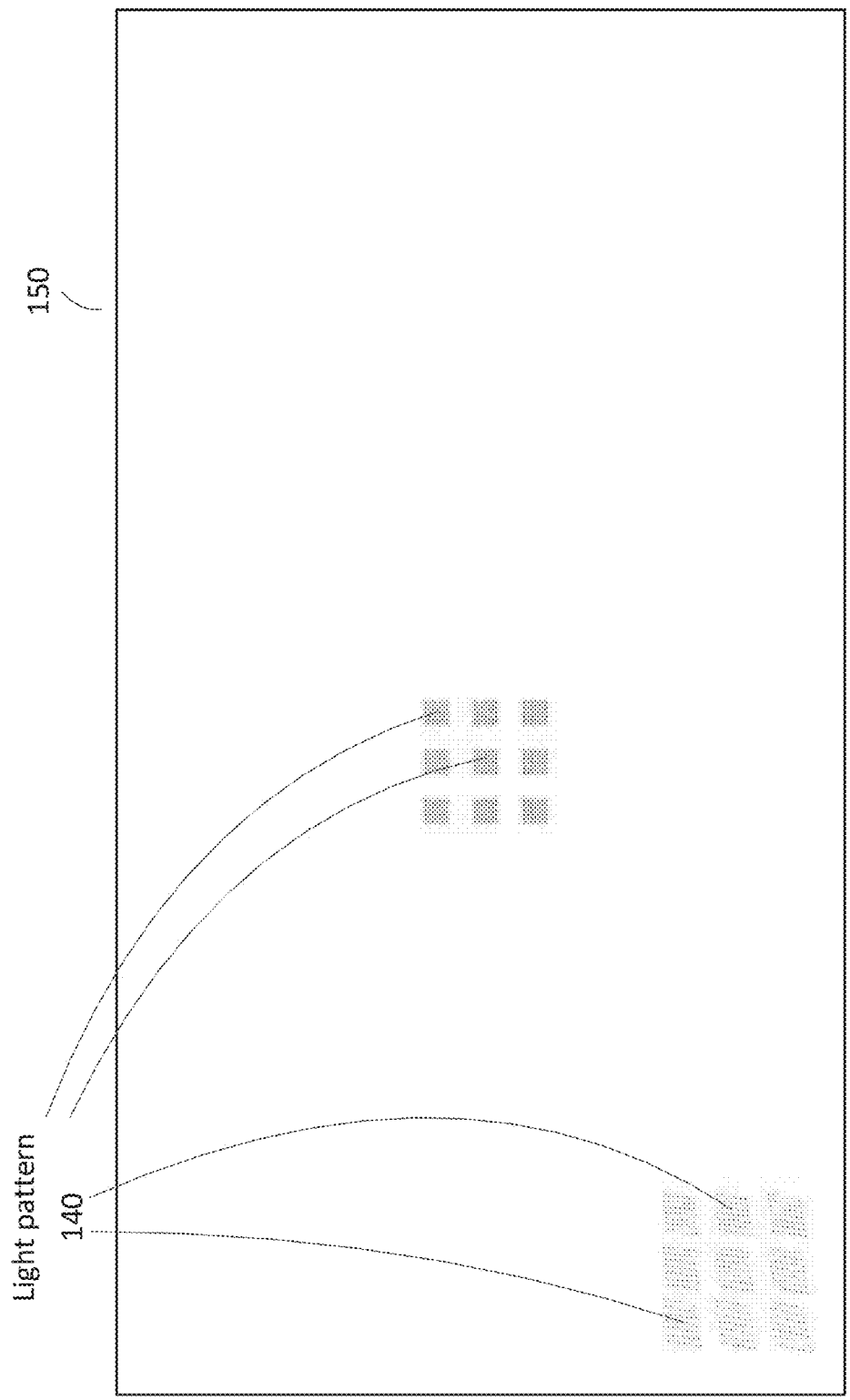

FIG. 12C illustrates a simplified configuration of system 200 which was used to generate the light patterns in FIGS. 12E and 12G. For simplicity of illustration, only 18 individual emitters 212 and their respective light beams are illustrated in the following examples. As seen in FIG. 12D, out of these 18 emitters 212, 9 emitters 212 are centered about the lens (i.e. are close to the optical axis) and 9 emitters 212 are at the edge of the field (remotely from the optical axis). As the light beam emitted by each emitter 212 passes through the DOE 230 (after being transformed by optical subunit 220), it produces its own tile pattern of 49 points. FIG. 12E illustrates the projection of the tile patterns generated by the emitters 212 of FIG. 12D on a projection plane that is perpendicular to the optical axis.

As can be seen in FIG. 12E, the nine tile patterns 140 which are located near the edge of the field are not rectangular (shaped more like a parallelogram than a rectangle), and the separation between the individual points of each tile pattern is larger than the separation between the points in the nine central tile patterns 140. Furthermore, in all of the field, the tile patterns 140 are not adjacent to each other, creating a discontinuity in the structured light pattern.

As aforementioned, the individual emitters 212 of emitter array 210 may be arranged in a non-regular (or semi-regular) configuration. The configuration of FIG. 12F may be used to correct a discontinuity which results in the example of FIGS. 12D and 12E from the regular distribution of the emitters 212 in emitter array 210.

As can be seen, the distance between the nine central emitters 212 was reduced, and is significantly smaller than the separation between the nine remote emitters 212, near the sides of emitter array 210. Furthermore, the nine remote emitters 212 are not arranged in a rectangular configuration. These nine remote emitters 212 may be arranged on a distorted grid (e.g. a regular XY grid to which pincushion distortion was applied).

FIG. 12G illustrates structured light pattern 150 which results from the emitters configuration of FIG. 12F. As can be seen, the light patterns 140 in each of the clusters (the central cluster of nine tile patterns and the remote cluster of nine tile patterns) are adjacent to each other, without discontinuities.

Generally with respect to system 200, it is noted that the positioning of the individual emitters 212 within emitter array 210 may be selected to reduce discontinuity between the light patterns 140 resulting from different emitters 212. Optionally the individual emitters 212 of emitter array 210 are arranged on a radially distorted regular grid (i.e. on a regular grid on which radial distortion transformation was applied). Different regular grids may be radially distorted for overcoming discontinuity—e.g. rectangular grid, hexagonal grid, and so on.

It is further noted that processing unit 260 (if implemented) may include algorithms which compensate for such distortion and/or discontinuity of the structured light pattern. It is noted that the arrangement of the individual emitters 212 may depend not only on the distortion of the collimator lens, but also on the distortion of the object space field of view (if known in advance). Notably, for 3D imaging the object space field is usually not known in advance (with the exception of calibration scenes, etc.). The emitter array 210 may be tailored for a particular optics of optical unit 220, any change in the optics would require different emitter array spacing configuration in order to reduce the distortion and the discontinuity.

FIG. 13 is a functional block diagram illustrating an example of optical system 204 in accordance with examples of the presently disclosed subject matter. Diagram 13.1 illustrates system 204 in a diagonal view, and diagram 13.2 illustrates system 204 in a side view. It is noted that system 204 may be implemented with any of the variations of system 200 discussed above. It is however noted that system 204 may incorporate any of the features, components and abilities discussed above with respect to system 200 as general. Furthermore, system 204 may incorporate any of the features, components and abilities discussed below with respect to systems 201, 202, 203 and 205. The components of system 204 are denoted using the same numeral reference used for the components of system 200, and the variations discussed with respect to these components in other part of the document may also pertain, mutatis mutandis, to system 204.

System 204 includes at least (a) diffractive optical element 230 which is capable of diffracting an incident coherent light beam to provide a light pattern, (b) emitter array 210 which includes a plurality of individual emitters 212 (the emitter array 210 is operable to emit a plurality of coherent light beams), and (c) optical subunit 220.

In system 204, the plurality of individual emitters 212 of emitter array 210 are arranged so as to form a planar emission plane (denoted 111), wherein each emitter in the emitter array is operable to emit a light beam.

Emission plane 111 is a plane in which the emitting ends of individual emitters 212 are located (as illustrated in both of diagrams 13.1 and 13.2). Emission plane 111 is planar in the sense that all of the emitting ends of individual emitters 212 are located on a flat plane.

It is noted that an emitter array whose emitters are arranged on a planar emission plane is usually simpler and cheaper to produce than an emitter array whose emitters are arranged on a non-flat emission plane. Furthermore, designing an emitter array characterized by a planar emission plane is simpler and cheaper than designing an emitter array with a non-flat emission plane.

The present disclosure teaches how to use an optical subunit 220 so as to enable using an emitter array with a planer emission plane while overcoming various optical issues. Further discussion is presented above, e.g. with respect to FIGS. 12A through 12G.

Optical subunit 220 in system 204 is operable to: (a) transform a plurality of light beams emitted by the emitter array, wherein the transformation includes expansion and/or collimation of the plurality of light beams; and (b) to direct the plurality of transformed light beams onto the diffractive optical element at different angles of incidence, resulting in providing of a plurality of light patterns by the diffractive optical element. DOE 230 of system 204 is capable of diffracting the transformed light beams to provide light patterns.

As discussed with respect to system 200, optionally optical subunit 220 includes a plurality of optical elements having a common optical axis common to the plurality of optical elements.

As discussed with respect to system 200, optionally optical subunit 220 is operable to transform the plurality of light beams 110 to provide the plurality of transformed light beams 130 using transforming optical components, out of the plurality of optical components, which are common to the plurality of light beams.

As discussed with respect to system 200, optionally emitter array 210 and optical subunit 220 are positioned relative to one another such that optical subunit 220 further transform the plurality of light beams 110 by deflecting the plurality of light beams 110 so that the plurality of transformed light beams 130 are projected onto DOE 230 at different angles of incidence, resulting in providing of a plurality of light patterns by DOE 230.

Figure 14:
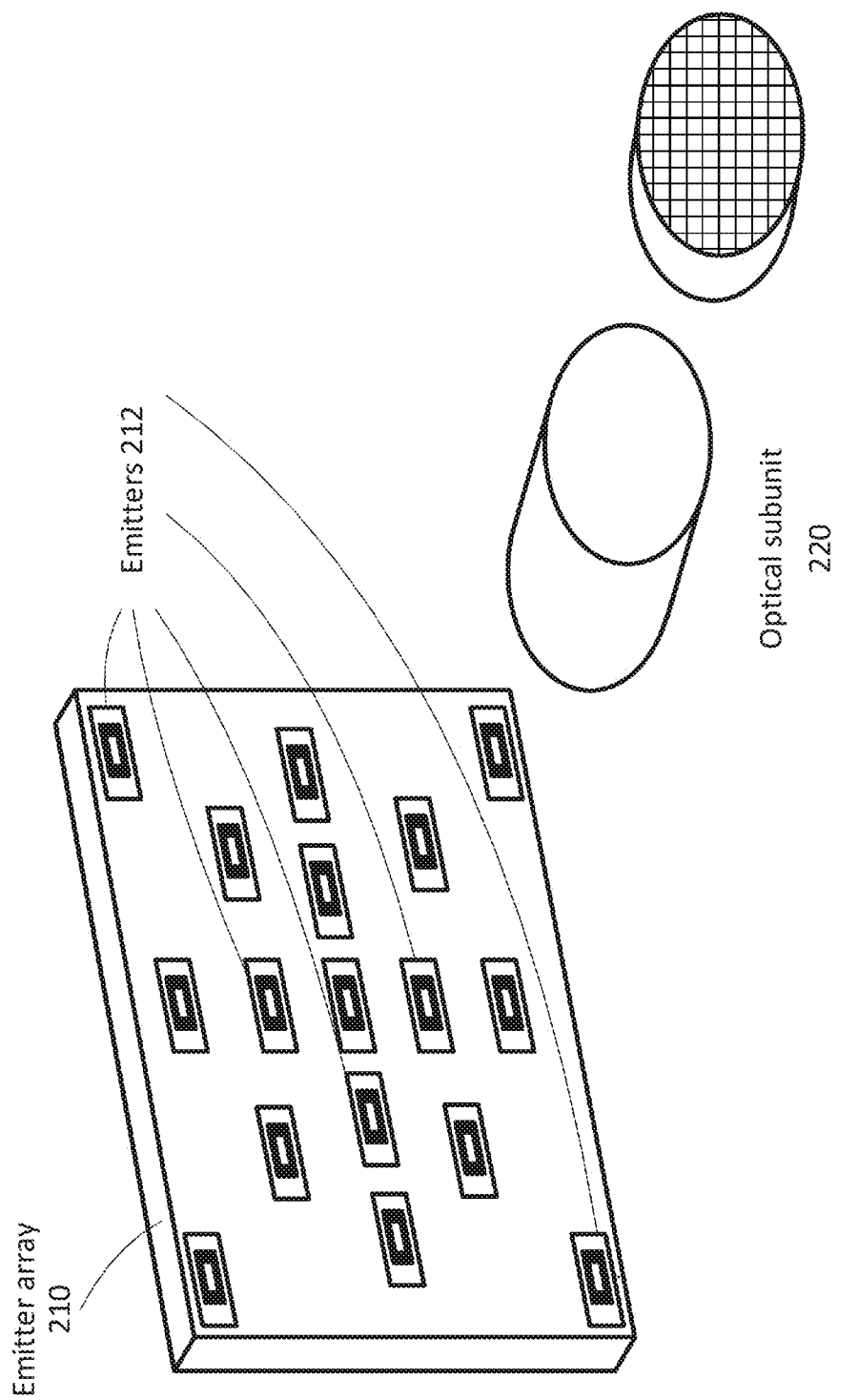

FIG. 14 is a functional block diagram illustrating an example of optical system 205 in accordance with examples of the presently disclosed subject matter. It is noted that system 205 may be implemented with any of the variations of system 200 discussed above. It is however noted that system 204 may incorporate any of the features, components and abilities discussed above with respect to system 200 as general. Furthermore, system 205 may incorporate any of the features, components and abilities discussed below with respect to systems 201, 202, 203 and 204. The components of system 205 are denoted using the same numeral reference used for the components of system 200, and the variations discussed with respect to these components in other part of the document may also pertain, mutatis mutandis, to system 204.

System 205 includes at least (a) diffractive optical element 230 which is capable of diffracting an incident coherent light beam to provide a light pattern, (b) emitter array 210 which includes a plurality of individual emitters 212 (the emitter array 210 is operable to emit a plurality of coherent light beams), and (c) optical subunit 220.

In system 205, the combination of optical subunit 220 and DOE 230 is characterized by a distortion function. The plurality of individual emitters 212 in system 205 are arranged in a non-uniform configuration whose relation to a predefined uniform grid is an inverse function of the distortion function. It is noted that in different systems, the relative amount of distortion caused by the optical subunit 220 and the DOE 230 may vary, and optionally all of the distortion may be caused by DOE 230, without additional distortion caused by optical subunit 230. In such case, the distortion function may characterize the DOE 230.

An example of the distortion function of optical subunit 220 is presented in FIGS. 12D and 12E. As can be seen, a regular grid of individual emitters 212 in FIG. 12D is transformed into a non-regular array of illumination. Method 900 in FIG. 25 discloses a method which may be used to determine the distortion function, and based on which to determine a non-uniformed configuration which may be used for the individual emitters of system 205.

As discussed with respect to system 200, optical subunit 220 of system 205 may be operable to direct the plurality of transformed light beams onto the diffractive optical element 230 at different angles of incidence, resulting in providing of a plurality of light patterns by diffractive optical element 230.

Figure 15:
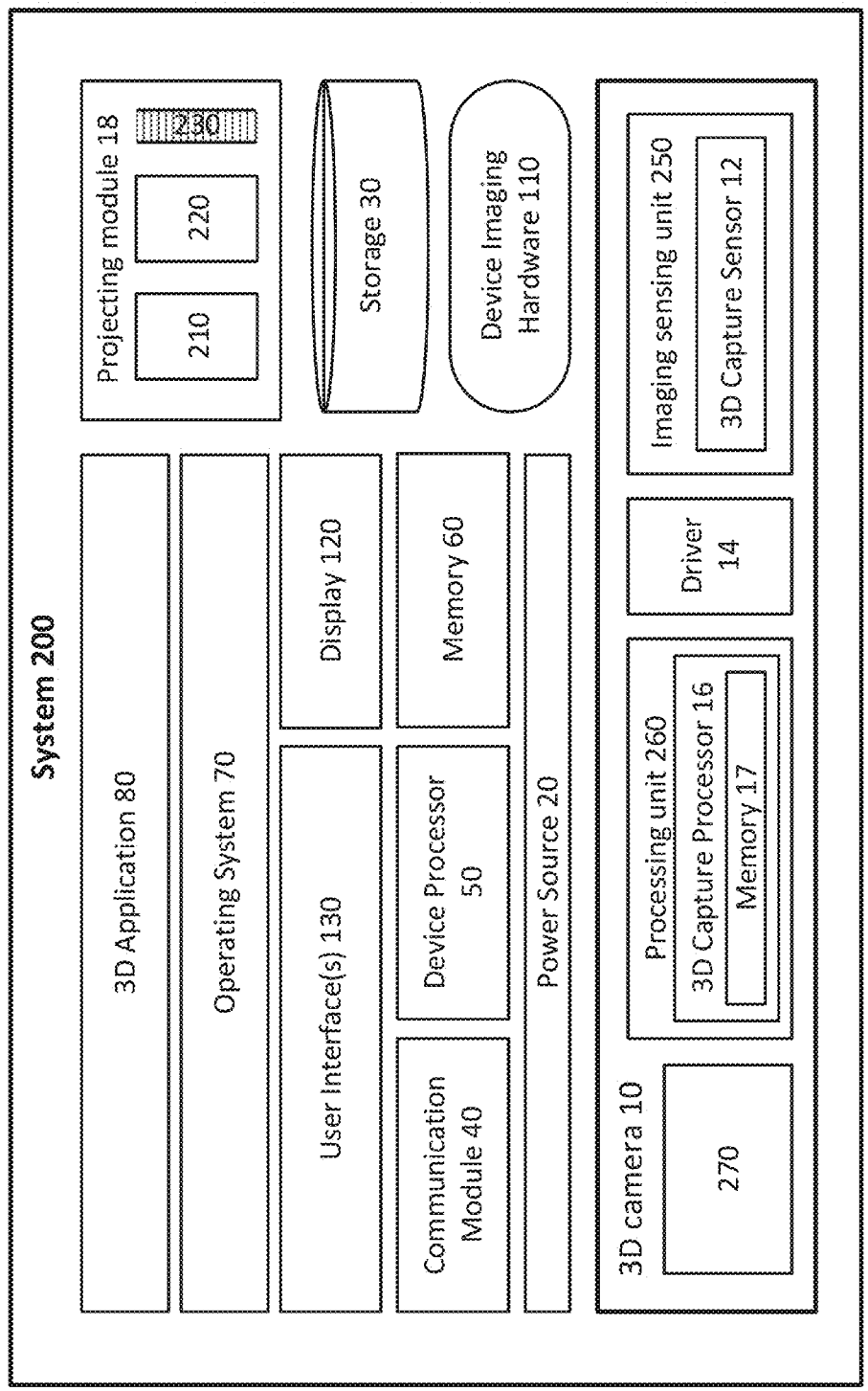

FIG. 15 is a functional block diagram illustrating an example of optical system 200, in accordance with examples of the presently disclosed subject matter. In FIG. 15 there is presented a possible utilization of the projection of the structured light pattern 150 in system 200, for capturing three dimensional (3D) images. The capturing of 3D images by system 200 is facilitated by determining range parameters for objects imaged in different pixels of the image. It is noted that these possible uses are offered by way of a non-limiting example, as many other uses will present themselves to a person who is of skill in the art. Furthermore, while the functionalities of utilizing the projection of system 200 are discussed as being implemented by components of the same system 200, it will be clear that such functionalities may also be implemented by an external system and with additional, fewer or other components for utilizing the projection.

The following discussion relates to a system for managing 3D capture. It will be clear to a person who is of skill in the art that the following discussion is also applicable to methods and computer program products for managing 3D capture, mutatis mutandis, and that the latter are not discussed in detail for reasons of brevity.

According to examples of the presently disclosed subject matter, managing the 3D capture can include managing use of resources in a mobile computing device, more particularly, a mobile communication device such as a smartphone, a tablet and/or their likes according to predefined rules or criteria. In further examples of the presently disclosed subject matter, managing the 3D capture can include managing use of one or more 3D capturing resources in a mobile communication device. Yet further by way of example, managing the 3D capture can include managing one or more of: power consumption, a memory and/or storage utilization, allocation communication bandwidth consumption, allocation of processing resources (e.g., CPU cycles) etc. In the following description, by way of non-limiting example for a mobile computing device, reference is typically made to a mobile communication device.

Throughout the following description, reference is made to the term "3D capture". The term 3D capture relates to a technological process which involves utilizing a plurality of resources of a mobile communication device to obtain depth or range data (3D data) with respect to a certain scene. Thus, according to examples of the presently disclosed subject matter, managing 3D capture can include managing operation of at least one resource that is involved in the 3D capture or managing operation of at least one software feature of the 3D capture. It would be appreciated that at least in some respects, in some cases, or under certain conditions modifying the operation of a resource that is involved in the 3D capture can affect the operation of at least one software feature of the 3D capture, and vice versa.

Referring to FIG. 15 (and to system 200 generally), it is noted that system 200 may be implemented as a mobile communication device, such as a smartphone, a lap-top computer or another hand-held device. As can be seen in FIG. 15, and by way of example, system 200 may include various components that are capable of providing 3D depth or range data. In the example of FIG. 15, there is shown a configuration of system 200 which includes an active stereo 3D camera 10, but in further examples of the presently disclosed subject matter, other known 3D cameras can be used. Those versed in the art can readily apply the teachings provided in the examples of the presently disclosed subject matter to other 3D camera configurations and to other 3D capture technologies.

By way of example, the 3D camera 10 can include: a 3D capture sensor 12 (which may optionally be part of the aforementioned imaging sensing unit 250 or replace it), a driver 14, a 3D capture processor 16 (which may optionally be part of the aforementioned processing unit 250 or replace it). System 200 also includes a projection module 18, which includes emitter array 210, optical subunit 220 and DOE 230. Optionally, projection module 18 may further include output optics 240.

In this example, the projection module 18 is configured to project a structured light pattern and the 3D capture sensor 12 is configured to capture an image which corresponds to the reflected pattern, as reflected from the environment onto which the pattern was projected. U.S. Pat. No. 8,090,194 to Gordon et. al. describes an example structured light pattern that can be used in a projection module component of a 3D camera, as well as other aspects of active stereo 3D capture technology and is hereby incorporated into the present application in its entirety. International Application Publication No. WO2013/144952 describes an example of a possible projection module design (also referred to as "flash design"), and is hereby incorporated by reference in its entirety.

By way of example, emitter array 210 which is included in the projection module 18 may include an IR light source, such that it is capable of projecting IR radiation or light, and the 3D capture sensor 12 can be and IR sensor, that is sensitive to radiation in the IR band, and such that it is capable of capturing the IR radiation that is returned from the scene. The projection module 18 and the 3D capture sensor 12 are calibrated. According to examples of the presently disclosed subject matter, the driver 14, the 3D capture processor 16 or any other suitable component of the system 200 can be configured to implement auto-calibration for maintaining the calibration among the projection module 18 and the 3D capture sensor 12.

The 3D capture processor 16 can be configured to perform various processing functions, and to run computer program code which is related to the operation of one or more components of the 3D camera. The 3D capture processor 16 can include memory 17 which is capable of storing the computer program instructions that are executed or which are to be executed by the processor 16.

The driver 14 can be configured to implement a computer program which operates or controls certain functions, features or operations that the components of the 3D camera 10 are capable of carrying out.

According to examples of the presently disclosed subject matter, system 200 can also include hardware components in addition to the 3D camera 10, including for example, a power source 20, storage 30, a communication module 40, a device processor 40 and memory 60 device imaging hardware 110 a display unit 120 and other user interfaces 130. It should be noted that in some examples of the presently disclosed subject matter, one or more components of system 200 can be implemented as distributed components. In such examples, a certain component can include two or more units distributed across two or more interconnected nodes. Further by way of example, a computer program, possibly executed by the device processor 40, can be capable of controlling the distributed component and can be capable of operating the resources on each of the two or more interconnected nodes.

It is known to use various types of power sources in a mobile communication device. The power source 20 can include one or more power source units, such as a battery, a short-term high current source (such as a capacitor), a trickle-charger, etc.

The device processor 50 can include one or more processing modules which are capable of processing software programs. The processing module can each have one or more processors. In this description, the device processor 50 different types of processor which are implemented in system 200, such as a main processor, an application processor, etc.). The device processor 50 or any of the processors which are generally referred to herein as being included in the device processor can have one or more cores, internal memory or a cache unit.

The storage unit 30 can be configured to store computer program code that is necessary for carrying out the operations or functions of system 200 and any of its components. The storage unit 30 can also be configured to store one or more applications, including 3D applications 80, which can be executed on system 200. In a distributed configuration one or more 3D applications 80 can be stored on a remote computerized device, and can be consumed by system 200 as a service. In addition or as an alternative to application program code, the storage unit 30 can be configured to store data, including for example 3D data that is provided by the 3D camera 10.

The communication module 40 can be configured to enable data communication to and from the mobile communication device. By way of example, examples of communication protocols which can be supported by the communication module 40 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

It should be noted that that according to some examples of the presently disclosed subject matter, some of the components of the 3D camera 10 can be implemented on the mobile communication hardware resources. For example, instead of having a dedicated 3D capture processor 16, the device processor 50 can be used. Still further by way of example, system 200 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device 100 processors.

System 200 can be configured to run an operating system 70. Examples of mobile device operating systems include but are not limited to: such as Windows Mobile™ by Microsoft Corporation of Redmond, Wash., and the Android operating system developed by Google Inc. of Mountain View, Calif. It is noted that if system 200 is not a mobile system, other operating systems may be used (e.g. Windows, Linux, etc.).

The 3D application 80 can be any application which uses 3D data. Examples of 3D applications include a virtual tape measure, 3D video, 3D snapshot, 3D modeling, etc. It would be appreciated that different 3D applications can have different requirements and features. A 3D application 80 may be assigned to or can be associated with a 3D application group. In some examples, the device 100 can be capable of running a plurality of 3D applications 80 in parallel.

Imaging hardware 110 can include any imaging sensor, in a particular example, an imaging sensor that is capable of capturing visible light images can be used. According to examples of the presently disclosed subject matter, the imaging hardware 110 can include a sensor, typically a sensor that is sensitive at least to visible light, and possibly also a light source (such as one or more LEDs) for enabling image capture in low visible light conditions. According to examples of the presently disclosed subject matter, the device imaging hardware 110 or some components thereof can be calibrated to the 3D camera 10, and in particular to the 3D capture sensor 12 and to the projection module 18. It would be appreciated that such a calibration can enable texturing of the 3D image and various other co-processing operations as will be known to those versed in the art.

In yet another example, the imaging hardware 110 can include a RGB-IR sensor that is used for capturing visible light images and for capturing IR images. Still further by way of example, the RGB-IR sensor can serve as the 3D capture sensor 12 and as the visible light camera. In this configuration, the driver 14 and the projection module 18 of the 3D camera, and possibly other components of the device 100, are configured to operate in cooperation with the imaging hardware 110, and in the example given above, with the RGB-IR sensor, to provide the 3D depth or range data.

The display unit 120 can be configured to provide images and graphical data, including a visual rendering of 3D data that was captured by the 3D camera 10, possibly after being processed using the 3D application 80. The user interfaces 130 can include various components which enable the user to interact with system 200, such as speakers, buttons, microphones, etc. The display unit 120 can be a touch sensitive display which also serves as a user interface.

The 3D capture processor 16 or the device processor 50 or any sub-components or CPU cores, etc. of such processing entities can be configured to process a signal that is received from the 3D capture sensor 12 or from the device imaging hardware 110, in case the device imaging hardware 110 is capable of and is configured to serve the 3D camera 10. For convenience, in the following description, the core 3D capture functions shall be attributed, in a non-limiting manner, to the 3D capture processor 16 and to the 3D capture processor 16. However, it would be appreciated that the functionality and task allocation between the various components and sub components of system 200 are often a design choice.

According to examples of the presently disclosed subject matter, the 3D capture processor 16 can be configured to collect imaging data, process the imaging data, analyze the imaging data, produce imaging results, imaging content, and/or imaging display, etc.

According to examples of the presently disclosed subject matter, the 3D capture processor 16 can receive as input an IR image and calibration information. By way of example, the calibration information may relate to IR sensor (as an example of a 3D capture sensor) and projector (such as the projection module 18). In some examples of the presently disclosed subject matter, the 3D capture processor 16 can also receive as input a color image, e.g., from the device imaging hardware 110, and a color camera—IR camera calibration information.

By way of example, the processing that is carried out by the 3D capture processor 16 can include pre-processing, optical character recognition (OCR), error correction and triangulation. The pre-processing function can include operations for removing sensor noise and for improving signal quality, e.g., by resolving optical issues, such as speckles. The OCR function translates areas in the image to one of a plurality of code words that were used in the pattern that was projected by the projection module 18 and which was captured by the 3D capture sensor 12. The error correction operation can include computations which use pre-existing knowledge on the projected pattern/code to correct erroneous labeling of code words or of features of code words (which can lead to changing of a label of one or more code words). The triangulation function takes into account the imaging geometry to extract the depth information. An example of a triangulation procedure that is made with reference to active triangulation methods is provided in U.S. Pat. No. 8,090,194 to Gordon et al.

According to examples of the presently disclosed subject matter, the 3D capture processor 16 can also perform a color projection function, whereby the color from a color sensor (e.g., from the device imaging hardware 110) is projected onto the 3D data. It would be appreciated that the color projection function (as any other function described here with reference to the 3D capture processor 16) can be carried out by the device processor 50 or any processing component thereof.

Additional processes which may involve processing operations and which can be implemented as part of a 3D data processing pipeline for certain 3D applications can (but not necessarily) include some (e.g., one, two, three, . . . ) of the following: live system control (e.g., auto gain, auto exposure, control of active source power and pulse duration, etc.), point cloud registration, denoising, feature classification, feature tracking, various 3D vision uses, passive camera processing (e.g., pose estimations, shape from motion etc.), inertial measurement unit (IMU) processing (e.g, kalman filters), time stamping, ISP functions (demosaic, gama correction), compression, calibration quality monitoring, etc. It would be appreciated that the above operations can be carried out on the 3D capture processor 16, on the device processor 50 or on both (the processing tasks can be divided among the various processing resource, either in advance or in real-time).

According to examples of the presently disclosed subject matter, the 3D camera 10, after processing of the signal from the sensor 12 and possibly from other sources, can be configured to provide as output one or more of the following: a set of 3D points, typically with normals (point cloud), where the normals can be computed using adjacent points; a textured mesh—triangulation (generating polygonal surface) using adjacent; depth map with color map (color projection). Those versed in the art would appreciate that additional outputs can be provided by the 3D camera 10. As mentioned above, some of the processing attributed in some examples of the presently disclosed subject matter to the 3D camera 10 and to the 3D capture processor 16 can be carried out outside the 3D camera 10, and in particular by the device processor 50, and so some of the output which are attributed here to the 3D camera 10 can be generated outside what is referred to as the 3D camera in the examples shown in FIG. 15 and in the description of FIG. 15 provided herein.

According to examples of the presently disclosed subject matter, the device processor 50, possibly in cooperation with the 3D capture processor 16, can be configured to determine or receive data with respect to the state of the resources of the mobile communication system 100. The resources state data can be organized in any suitable form. For example, related or alternative resources can be grouped, resources which are linked by some tradeoff can be linked, resources whose usage crossed some threshold can be grouped, etc.

According to examples of the presently disclosed subject matter, in addition to the usage state information, the device processor 50 can be configured to obtain or receive, e.g., from the memory 60, additional information which can be useful for determine the usage state of one or more resources of system 200. For example, the device processor 50 can obtain data which relates to expected resources usage, for example, as result of scheduled tasks or based on statistics with respect to the device 100 or its resources behavior in terms of resource usage and/or based on statistics with respect to the behavior of applications running on the device in terms of resource usage. In another example, expected resources usage can relate to tasks that are expected to be carried out, either as a result of processes that are already running one the mobile communication device, or for any other reason.

According to examples of the presently disclosed subject matter, the term "resource availability profile" is used in the description and in the claims to describe the data that is used in the mobile communication device to describe the current or expected state of one or more resources of the mobile communication device, in particular to describe the state of the resources that are associated with the operation of a 3D application, or which are expected to be effected by the operation of a 3D application or any of its features.

According to examples of the presently disclosed subject matter, the device processor 50 can be configured to continuously monitor the state of the resources of system 200 and can update to resource availability profile accordingly. In further examples of the presently disclosed subject matter the device processor 50 can be configured to routinely monitor the resources state and update the resource availability profile, where the timing of the update is either determine according to predefined intervals, or is determined based on some input that is received at the device processor. In yet another example, the device processor 50 updates to resource availability profile when a certain event occurs, such as an event which effects the availability of at least one resource of the mobile communication device.

Throughout the description and in the claims reference is made to the term "3D application". The term 3D application as used herein relates to a computer program code that can run as an application on a mobile communication platform (whether hosted locally or whether hosted remotely and consumed as a service on a mobile communication device), and which computer program code embodies at least one feature which uses 3D data, in particular 3D data that is provided by or obtained from a 3D camera. Such a feature is termed in the description and in the claims as a 3D capture feature. Many examples of 3D applications exist in the market and the following are a small sample of which: a virtual tape measure, a room modeling environment, 3D segmentation and model creation, augmented reality games, etc.

It would be appreciated that a 3D application, or a 3D capture feature of a 3D application can have certain attributes characteristics and requirements. Furthermore, in order to enable, support and/or execute different 3D capture features, different resources (hardware resource but possibly also software resources) allocation requirements can exist (including different levels of a given resource), or from another perspective, or according to different implementations, different 3D capture features can consume different resources (including different levels of a given resource).

For example, assume a 3D conferencing application having a full-view feature and a face-only feature, where the full scene feature involves capturing and processing 3D data from the entire field of view of the sensor, and the face-only feature involves utilizing only the resources that are required for obtaining 3D data of an area in the scene where the face of a person facing the 3D capture sensor is detected. Among the two features, it is highly probable that the full view feature of the 3D capture application will consume greater processing, memory and power resources compared to the face only feature.

According to examples of the presently disclosed subject matter, a given feature of a given 3D application 80 can be associated with a particular part of the software program code of the 3D application. Alternatively or additionally, a feature of a 3D application 80 can be associated with a particular resource, such a particular hardware component or a particular software program code external to 3D application 80 and running on system 200. For example, a feature of a 3D application can be associated with an inertial measurement unit (not shown) of system 200.

According to examples of the presently disclosed subject matter, for each feature there can be provided a cost measure. The term "cost measure" as used herein and in the claims relates to a measure of a feature's estimated, expected or measured consumption of a given resource or of a resource group, or of one resource from a resource group, or the measure can be global measure of the feature's resource consumption. In yet further example, the cost measure can relate to the feature's estimated, expected or measured consumption of a resource or resources at a given mode of the respective 3D capture application.

By way of example, the cost measure of each feature can include a plurality of measures for a plurality of resources. Still further by way of example, the cost measure can include measures for alternative resources, and such measures and the resources with which they are associated can be indicated as alternatives. It would be noted that providing such alternative measures can enable preforming various tradeoff computations including with respect to different configurations of a given feature, and in another example, with respect to implementation of different features in different 3D applications or in different operational mode of a given (the same) 3D application.

Furthermore, it is possible that two or more 3D applications which are functionally connected to one another would be executed in system 200, and the relation between the 3D applications can be indicated, e.g., to the device processor 50, and the device processor 50 can be configured to take into account the relations and cross effect of the related 3D applications of some features thereof when processing a cost measure of a given feature of one of the related 3D applications.

By way of example the cost measure of a given 3D application feature can be provided as explicit data that is stored as part of the feature program code, or that is otherwise associated with the feature program code. In a further example, the cost measure of a given 3D application feature can be determined (e.g., calculated) based on previous behavior of the feature and of one or more resources which are utilized to enable the feature. In yet further examples, the cost measure of a given 3D application feature can be determined based on statistical data, for example, based on the resource consumption of related features, possibly of related 3D applications, and possibly also under similar operating conditions, on similar mobile communication devices, etc.

The cost measure can be provided in various forms. For example, the cost measure can include information related to an amount or level of power (electricity) consumption, capacity consumption (e.g. consumption of processing power, consumption of memory, consumption of communication bandwidth, etc.). In another example, the cost measure can provide a measure of an aspect of user experience such as increased or reduced latency, frame rate, accuracy of output, etc.

According to examples of the presently disclosed subject matter, in addition to the cost measure of a given feature of a 3D capture application, a functional measure can be obtained with respect to the feature. The term "functional measure" as used herein relates to an indication provided in respect of the functional value of a 3D capture application feature in respect of which the functional measure is provided. By way of example, the functional value of a feature indicates the value, importance or contribution of the feature to the user experience. In another example, the functional value of a feature indicates the value, importance or contribution of the feature for enabling additional features of the 3D capture application, or the value, importance or contribution of the feature for enabling features of other applications.

Still further by way of example the functional measure of a given feature can relate to a specific mode of operation of the respective 3D capture application, and the functional measure relates to the functional value of the respective feature in the respective mode of the 3D capture application.

According to examples of the presently disclosed subject matter, each 3D application can have at least one mode of operation. According to examples of the presently disclosed subject matter, a 3D application can include a live-mode. The term "live-mode of a 3D capture application" (or "live-mode" in short) as used in the description and in the claims relates to a mode of the 3D application in which instant (real time or near real time, e.g., up to 1 second of latency) feedback is provided (e.g., presented on a display) to a user (human or program) of the 3D application. Still further by way of example, the feedback provided in the live mode of the 3D application, possibly together with additional features of the live mode, can facilitate a certain measure of control over the an ongoing capturing process of 3D data. For example, instant feedback which is provided by the mobile communication device in the live mode of a 3D application can enable modification of one or more configurations and/or features or usage of at least one resource of the mobile communication device the modify the results of the ongoing 3D capture process. Examples of modification which can be enabled by the live mode include changing an orientation of the 3D imaging components, modifying a level of illumination provided by the projector, changing the type of pattern that is used by the projector, and control over software resources of the mobile communication device, such as modifying a level of gain applied to the incoming signal from the sensor, changing the type of error correction used in the decoding process, etc.

According to examples of the presently disclosed subject matter, a resource of the mobile communication device, as used herein can relate to a component or a sub-component, a firmware routine, or a software program running of the mobile communication device.

As would be appreciated by those versed in the art, in case a 3D application also operates at a non-live mode, the hardware and/or software configuration that is used in the 3D capture live-mode can have effect on operation of the non-live mode of the 3D application, and can have an effect on the resources that are used in the non-live mode of the 3D application, including the level of usage, etc. In another example, the stream of data that is passed on a non-live mode of the 3D capture, e.g., for further processing can also be influenced by the actual implementation of the live-mode of the respective 3D application.

In the present disclosure and in the claims, the term "non-live mode of a 3D application" (or "non-live mode" in short) (e.g., latency is above 1 second or above 2-3 seconds), relates to a mode of operation of a 3D application, other than a live mode. According to examples of the presently disclosed subject matter, a non-live mode of a 3D application is a mode which does not take place concurrently with the 3D capture operation. Still by way of example, a non-live mode of a 3D application usually involves further utilization of resources, including, for example, further processing of the 3D data. Still further by way of example, the non-live mode can include further processing by the device processor 50 of system 200 or in another example, further processing by external (and remote) resources.

It would be appreciated that in addition to the live-mode of a given 3D application several non-live modes can exist, each of which can have different features, or features that have different configurations. By way of example, the modes can differ from one another in the amount of latency, as well as in other characteristics.

According to examples of the presently disclosed subject matter, a given mode of a 3D application can include at least two features, where the two features are alternative to one another, and wherein in the given mode of the application it is possible to use only one of the two features. Further by way of example, each one of the two alternative features can have a different resource consumption.

According to examples of the presently disclosed subject matter, two different modes of a certain 3D application can have one or more common 3D application features. Further by way of example, a given feature of a 3D application can have a different configuration or different characteristics in different modes of a given 3D application. It would be noted, a given feature which can have different resource consumption characteristics in different configurations of the feature. In case a 3D application that is subject to the resource management procedure according to examples of the presently disclosed subject matter, has identical sets of features across two modes of operation which are used in the resource management procedure, at least one of the features can have a different configuration in each of the two modes of operation.

In other examples, two different modes of a certain 3D application can have entirely different features (none of the features is common).

According to a further aspect of the presently disclosed subject matter, a 3D application or given features of a 3D application can have a local mode and a remote mode. According to examples of the presently disclosed subject matter, in the local mode of a given feature most, including all, of the resources which are consumed by the feature of the 3D application reside locally or are mostly local features of the mobile communication device, and in the remote mode of the feature most, including all, of the resources which are consumed by the feature are local on a remote node (are external to the mobile communication device), e.g, most of the resources are in the cloud.

In one example, the 3D capture processor 16 or the device processor 50 can be configured to determine which feature of a 3D application 80 to use in a given mode of the application, or whether to use a feature of a first mode of the 3D application or a feature of a second mode of the 3D application based on resource availability information relating to an availability or to a state of one or more resource of the mobile communication device, such battery power, processing power, memory resources, communication bandwidth, availability of remote processing, etc. Still further by way of example the decision regarding which feature to use in particular mode can be further based on one or more hardware cost parameters which are associated with the feature.

Figure 16:
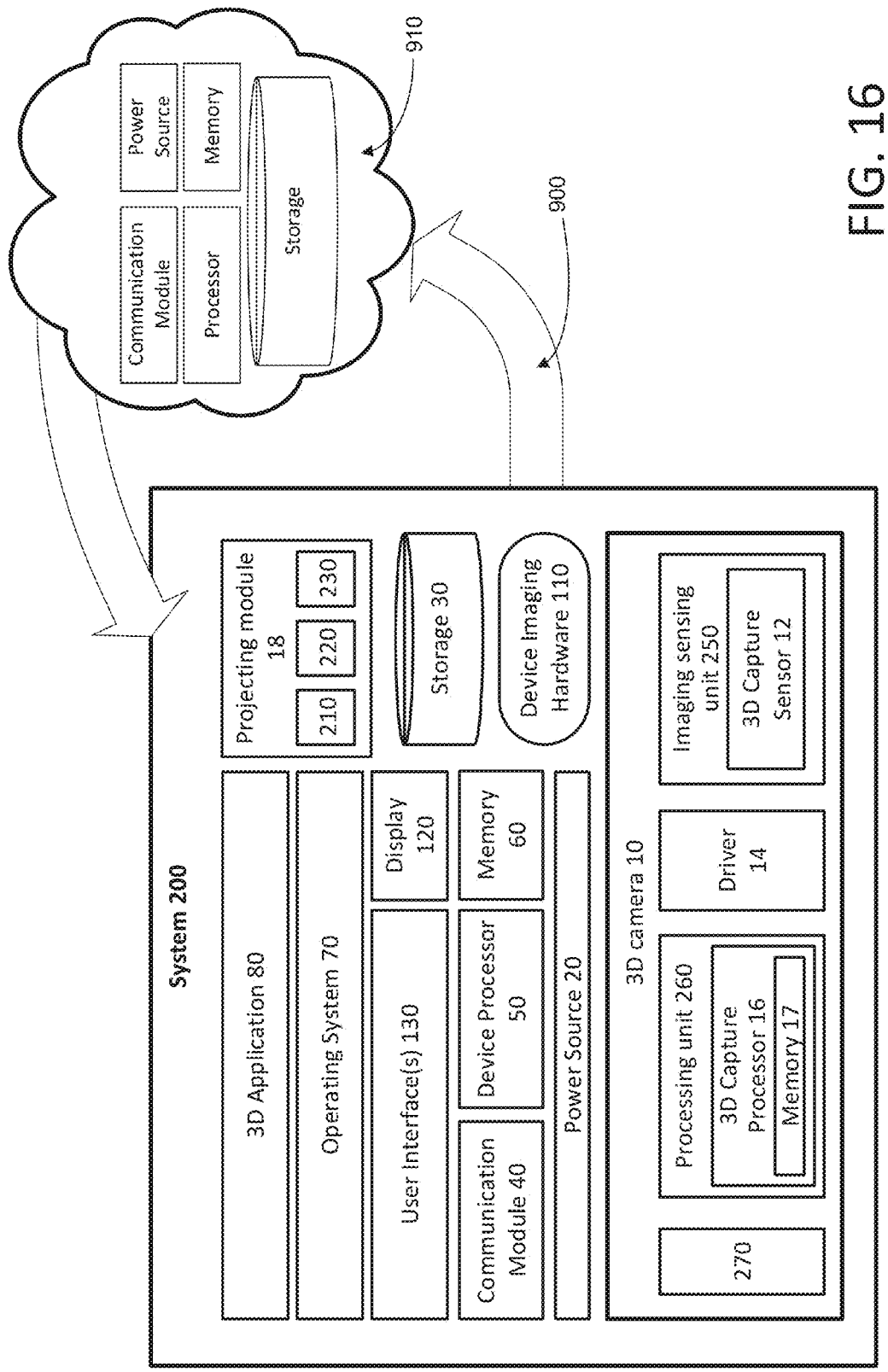
FIG. 16 is a block diagram illustration of a system according to examples of the presently disclosed subject matter, including support for a remote mode of a 3D capture application feature.

FIG. 16 is a block diagram illustration of a system according to examples of the presently disclosed subject matter, including support for a remote mode of a 3D capture application feature. As can be seen in FIG. 16, the system 900 includes a cloud platform 910, which includes resources that enable remote implementation of some or all of the process which are associated with a given feature of a 3D capture application.

Figure 17:
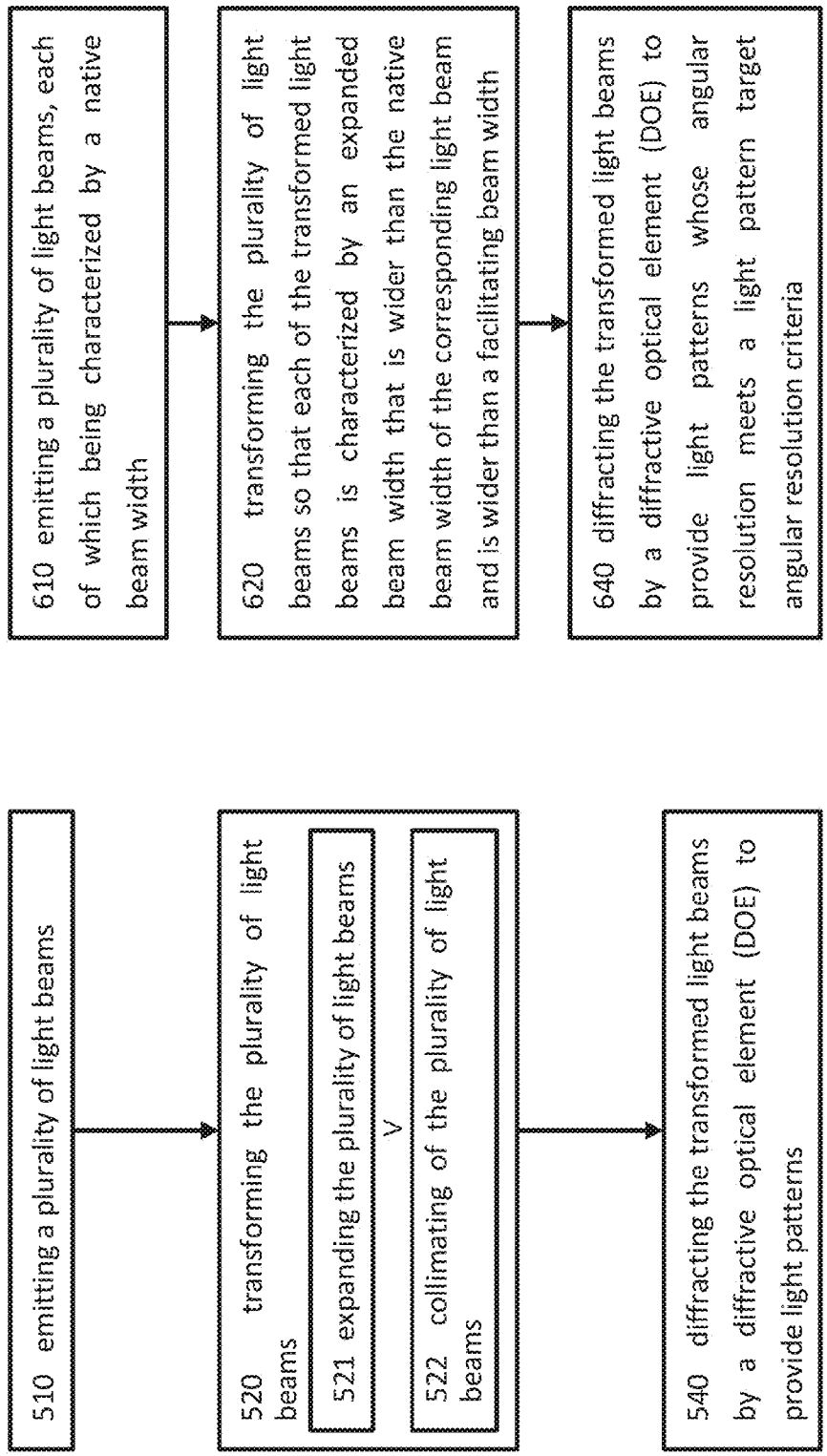

FIG. 17 is a flow chart illustrating an example of method 500, in accordance with examples of the presently disclosed subject matter. Method 500 is a method for projection. It is noted that method 500 may be implemented by a system such as systems 200, 201, 202, 203, 204 and 205, and that any variation and optional implementation which was discussed with respect to any one of systems 200, 201, 202, 203, 204 and 205 may also be implemented as part of method 500, mutatis mutandis.

Stage 510 of method 500 includes emitting a plurality of light beams. Optionally, the plurality of light beams is emitted by a plurality of individual emitters, each of the plurality of individual emitters emitting one of the plurality of light beams. Referring to the examples set forth with respect to the previous drawings, stage 510 may be implemented by emitters 212. It is noted that emitters which are used for the emitting of stage 510 may be included in a single emitters array (e.g. encased as a single unit, e.g. having a united power supply), but this is not necessarily so.

As aforementioned with respect to emitters 212, each emitter which is used for the emitting of stage 510 may be a vertical-cavity surface-emitting laser (VCSEL) emitter, but this is not necessarily so, and other type of emitters (and especially other laser emitters) may be used.

Stage 520 of method 500 includes transforming the plurality of light beams. Stage 520 includes at least one of stages 521 of expanding the plurality of light beams, and/or stage 522 of collimating of the plurality of light beams. Referring to the examples set forth with respect to the previous drawings, stage 520 may be implemented by optical subunit 220. As aforementioned with respect to optical subunit 220, the optical subunit used for the transforming may include a plurality of optical elements having a common optical axis common to the plurality of optical elements. The common optical axis may be folded once or more, but this is not necessarily so.

Stage 540 of method 500 includes diffracting the transformed light beams by a diffractive optical element (DOE) to provide light patterns. Stage 540 may include diffracting the transformed light beams by the DOE to provide a structured light pattern which includes the light pattern provided by diffraction of each of the transformed light beams. Referring to the examples set forth with respect to the previous drawings, stage 540 may be implemented by DOE 230.

Stage 540 may be preceded by stage 530 of directing the transformed light beams toward the DOE. Stage 530 is illustrated, for example, in FIG. 18. Referring to the examples set forth with respect to the previous drawings, stage 530 may be implemented by optical subunit 220.

Optionally, stage 520 of transforming may be executed by a telecentric optical subunit. Optionally, the transforming of stage 520 may be executed by an optical subunit, wherein the emitting is executed by a plurality of individual emitters which are positioned on a focal plane of the optical subunit.

Optionally, the method may include transforming the plurality of light beams which propagates in substantially parallel paths to an optical subunit which executes the transforming. Optionally, these parallel paths may be common to an optical axis of the optical subunit.

Figure 18:
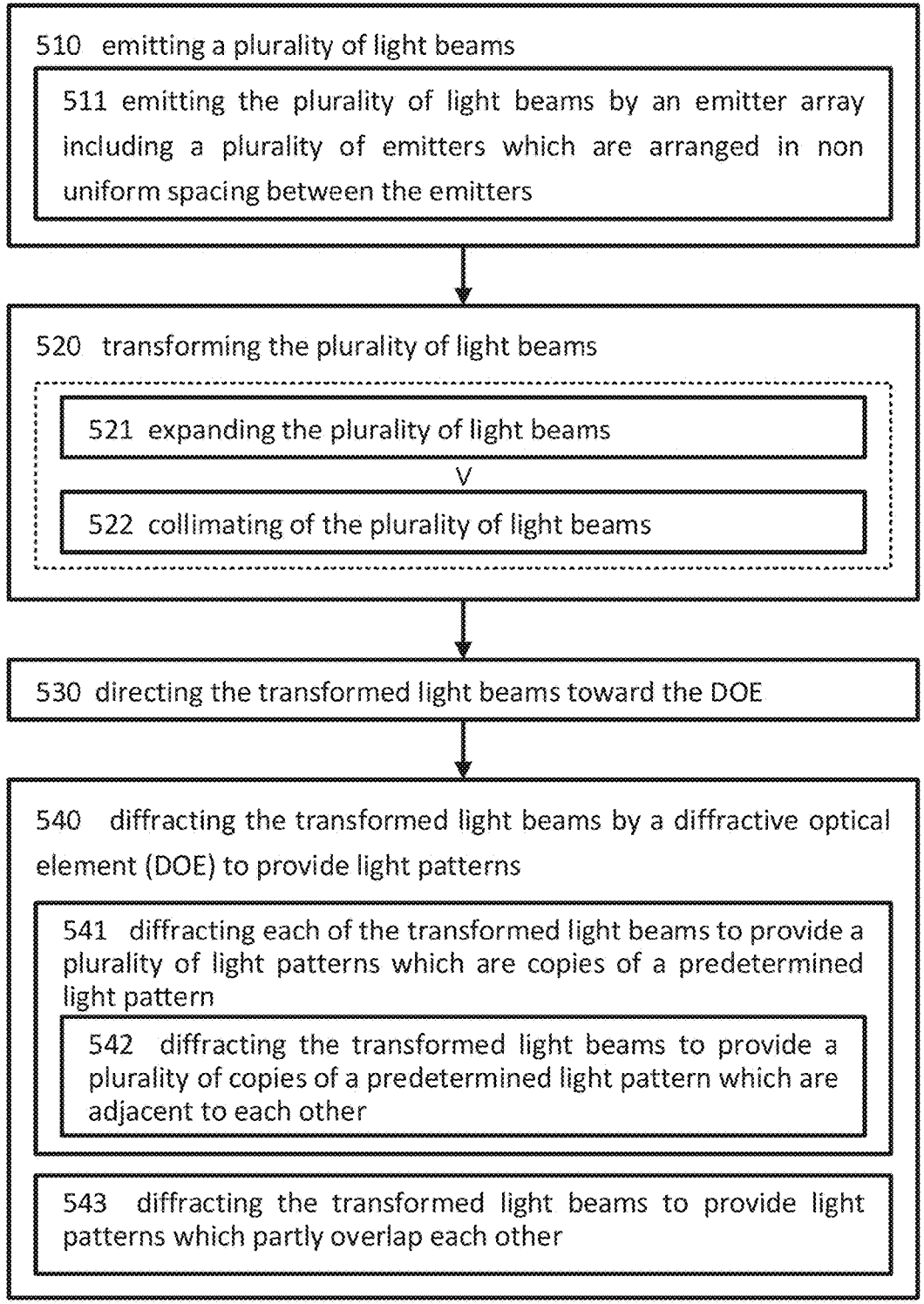

FIG. 18 is a flow chart illustrating an example of method 500, in accordance with examples of the presently disclosed subject matter. It is noted that not all of the stages which are illustrated in FIG. 18 should necessarily be implemented together, and that any combination of any of the optional stages may be implemented.

Optionally, stage 510 may include stage 511 of emitting the plurality of light beams by an emitter array including a plurality of emitters which are arranged in non-uniform spacing between the emitters (i.e. in spaces which differ in dimension, e.g. depending on the distance of an individual emitter from the optical axis). This may be used to improve the tiling between the projected light patterns, e.g. as discussed with respect to FIGS. 12A-12G.

Referring to stage 540 of diffracting the transformed light beams, it is noted that optionally, the plurality of light patterns provided by the diffractive optical element are copies of a predetermined light pattern. In other words, stage 540 may include stage 541 of diffracting each of the transformed light beams to provide a plurality of light patterns which are copies of a predetermined light pattern. Optionally, stage 541 may include diffracting each of the light patterns by the DOE to provide a copy of the predetermined pattern.

While not necessary so, the copies of the predetermined light pattern (if implemented) may be adjacent to each other. This may be used for tiling an area whose size is much larger (e.g. at least 50 times larger) than a size of any of the projected copies of the predetermined light pattern. This way, a relatively simple DOE (which is cheaper to design and to manufacture) which is designed to diffract an incident coherent light beam to provide a relatively simple light pattern—may be used to generate much larger and more complex or intricate structured light pattern, e.g. as demonstrated (in small scale, only 6 times larger) in FIG. 4A. Stage 541 may include stage 542 of diffracting the transformed light beams to provide a plurality of copies of a predetermined light pattern which are adjacent to each other.

Optionally, generating of the plurality of copies of the predetermined light pattern according to method 500 (e.g. using a single DOE) facilitates projection of a high contrast and high clarity overall output pattern of the optical system.

It is noted that stage 540 may include stage 543 of diffracting the transformed light beams to provide light patterns which partly overlap each other.

The partly overlapping light patterns may be copies of the predetermined light pattern (in which case each provided copy of the predetermined light pattern partly overlaps at least one other provided copy of the predetermined light pattern), but this is not necessarily so. Each of the partly overlapping light patterns may be diffracted from a light beam arriving from a single emitter, but this is not necessarily so.

Optionally, if stage 543 is implemented, the predetermined light pattern may include multiple copies of a repeated subpattern, wherein in each provided copy of the predetermined light pattern at least one subpattern overlaps a subpattern of at least one other provided copy of the predetermined light pattern generated by light originating from another light emitter. Further discussion is provided with respect to FIG. 4C.

Optionally, stage 510 of emitting the plurality of light beams may include stage 511 of controlling activation of different subgroups of emitters at different times, thereby resulting in providing of offset overall output patterns of the optical system at different times. Optionally, the light patterns provided by diffracting the light of each of the light emitters in each of the subgroups may be copies of the predetermined light pattern, but this is not necessarily so.

With respect to the emitting of stage 510, it is noted that the emitting may be executed by an emitter array which is dense with individual emitters of coherent light beams, thereby enabling spatially efficient providing of a high energy structured light pattern.

With respect to stage 510, optionally, the emitter array may include a plurality of individual emitters arranged so as to form a planar emission plane. That is, optionally, stage 510 of emitting the plurality of light beams may include emitting the plurality of light beams by an emitter array which include a plurality of individual emitters arranged so as to form a planar emission plane. Referring to the examples set forth with respect to the previous drawings, such an emitter as discussed with respect to FIG. 13, and all of the discussion which pertains to FIG. 13 is applicable to such a variation of stage 510, mutatis mutandis.

Referring to method 500 as a whole, a combination of (a) the optical subunit used in stage 520 and (b) the diffractive optical element used in stage 540 is characterized by a distortion function. Optionally, the emitter array used for the emitting of stage 510 may include a plurality of individual emitters which are arranged in a non-uniform configuration whose relation to a predefined uniform grid is an inverse function of the distortion function. That is, stage 510 may include emitting the plurality of light beams by an emitter array which includes a plurality of individual emitters which are arranged in a non-uniform configuration whose relation to a predefined uniform grid is an inverse function of the distortion function.

An example of the distortion function of optical subunit 220 is presented in FIGS. 12D and 12E. As can be seen, a regular grid of individual emitters 212 in FIG. 12D is transformed into a non-regular array of illumination. Method 900 in FIG. 25 discloses a method which may be used to determine the distortion function, and based on which to determine a non-uniformed configuration which may be used for the individual emitters of system 205.

FIG. 19 is a flow chart illustrating an example of method 600, in accordance with examples of the presently disclosed subject matter.

It is noted that method 600 may incorporate any of the stages and variations discussed above with respect to method 500 as general. Furthermore, method 600 may incorporate any of the stages and variations discussed below with respect to method 700 and to method 800. The stages of method 600 are denoted using the similar numeral reference used for the stages of method 500, increased by 100 (e.g. stage 610 is comparable to stage 510, and so on), and the variations discussed with respect to these stages in other parts of the document may also pertain, mutatis mutandis, to method 600. Referring to the examples set forth with respect to the previous drawings, method 600 may be implemented by system 201.

Stage 610 of method 600 includes emitting a plurality of light beams. Each of the plurality of light beams emitted in stage 610 is characterized by a native beam width.

Stage 620 includes transforming the plurality of light beams so that each of the transformed light beams is characterized by an expanded beam width that is wider than the native beam width of the corresponding light beam and is wider than a facilitating beam width. Referring to the examples set forth with respect to the previous drawings, stage 620 may be implemented by optical subunit 220.

Stage 640 includes diffracting the transformed light beams by a diffractive optical element (DOE) to provide light patterns whose angular resolution meets a light pattern target angular resolution criteria. Referring to the examples set forth with respect to the previous drawings, stage 640 may be implemented by DOE 230.

Referring to stage 610, optionally the emitting of stage 610 may include emitting the plurality of light beams whose native beam widths are narrower than the facilitating beam width by at least one order of magnitude.

FIG. 20 is a flow chart illustrating an example of method 600, in accordance with examples of the presently disclosed subject matter. It is noted that not all of the stages which are illustrated in FIG. 20 should necessarily be implemented together, and that any combination of any of the optional stages may be implemented.

Method 600 may include stage 630 of directing the transformed light beams toward the DOE. Referring to the examples set forth with respect to the previous drawings, stage 630 may be implemented by optical subunit 220.

Stage 630 may include stage 631 of deflecting (by refraction or otherwise) the plurality of light beams and projecting the plurality of transformed light beams onto the diffractive optical element at different angles of incidence. Referring to the examples set forth with respect to the previous drawings, stage 630 may be implemented by optical subunit 220.

Stage 640 which follows stage 630 (if implemented) includes providing a plurality of light patterns by the diffractive optical element, and providing a structured light pattern which includes the plurality of light patterns.

Optionally, stage 620 may include reducing beam divergence of the light beam. For example, if each light beam out of the plurality of light beams is characterized by a first beam divergence of that beam, stage 620 may include stage 621 of transforming the plurality of light beams so that each of the transformed light beams is characterized by a second beam divergence that is smaller than the first beam divergence of the corresponding light beam.

Optionally, stage 620 may include stage 621 of transforming the plurality of light beams so that the expanded beam widths of each of the plurality of transformed light beams is at least 3 times larger than the native beam width of the corresponding light beams.

FIG. 21 is a flow chart illustrating an example of method 700, in accordance with examples of the presently disclosed subject matter. It is noted that method 700 may incorporate any of the stages and variations discussed above with respect to method 500 as general. Furthermore, method 700 may incorporate any of the stages and variations discussed below with respect to method 600 and to method 800. The stages of method 700 are denoted using the similar numeral reference used for the stages of method 500, increased by 100 (e.g. stage 710 is comparable to stage 510, and so on), and the variations discussed with respect to these stages in other parts of the document may also pertain, mutatis mutandis, to method 700. Referring to the examples set forth with respect to the previous drawings, method 700 may be implemented by system 202.

Stage 710 of method 700 includes emitting a plurality of light beams. Each of the light beams emitted in stage 710 is characterized by a first beam divergence of that beam. Referring to the examples set forth with respect to the previous drawings, stage 710 may be implemented by emitter array 210.

Stage 720 of method 700 includes transforming the plurality of light beams so that each of the transformed light beams is characterized by a second beam divergence that is smaller than the first beam divergence of the corresponding light beam. Referring to the examples set forth with respect to the previous drawings, stage 720 may be implemented by optical subunit 220.

Optionally, the transforming may be executed by an optical subunit which is an optical assembly including a plurality of optical elements having a common optical axis common to the plurality of optical elements.

Optionally, the transforming may be executed by an optical subunit which is operable to transform the plurality of light beams to provide the plurality of transformed light beams using transforming optical components (included in the optical subunit) which are common to the plurality of light beams.

Stage 740 of method 700 includes diffracting the transformed light beams by a diffractive optical element (DOE) to provide light patterns.

With respect to method 700, it is noted that a facilitating beam divergence may be defined for the DOE (used in stage 740), so that incidence upon the DOE of coherent light beams whose divergence is lower than the facilitating beam divergence result in provision of light patterns whose contrast meets a light pattern target contrast criteria.

The transforming and the diffracting of the light beam in method 700 may be implemented so that the second beam divergences of the plurality of transformed light beams are lower than the facilitating beam divergence.

FIG. 22 is a flow chart illustrating an example of method 700, in accordance with examples of the presently disclosed subject matter. It is noted that not all of the stages which are illustrated in FIG. 22 should necessarily be implemented together, and that any combination of any of the optional stages may be implemented.

Stage 710 may include stage 711 of emitting the plurality of light beams so that the first beam divergence of any of the emitted light beams is larger than the facilitating beam divergence by at least one order of magnitude.

Method 700 may include stage 730 of directing the transformed light beams toward the DOE. Referring to the examples set forth with respect to the previous drawings, stage 730 may be implemented by optical subunit 220. Referring to the examples set forth with respect to the previous drawings, stage 730 may be implemented by optical subunit 220.

Stage 730 may include stage 731 of deflecting (by refraction or otherwise) the plurality of light beams and projecting the plurality of transformed light beams onto the diffractive optical element at different angles of incidence. Referring to the examples set forth with respect to the previous drawings, stage 730 may be implemented by optical subunit 220.

FIG. 23 is a flow chart illustrating an example of method 800, in accordance with examples of the presently disclosed subject matter. It is noted that method 800 may incorporate any of the stages and variations discussed above with respect to method 500 as general. Furthermore, method 800 may incorporate any of the stages and variations discussed below with respect to method 600 and to method 700. The stages of method 800 are denoted using the similar numeral reference used for the stages of method 500, increased by 100 (e.g. stage 810 is comparable to stage 510, and so on), and the variations discussed with respect to these stages in other parts of the document may also pertain, mutatis mutandis, to method 800. Referring to the examples set forth with respect to the previous drawings, method 800 may be implemented by system 203.

Stage 810 of method 800 includes emitting a plurality of light beams. Referring to the examples set forth with respect to the previous drawings, stage 810 may be implemented by emitter array 210.

Stage 820 of method 800 includes transforming the plurality of light beams. Stage 820 includes at least on of stages 821 of expanding the plurality of light beams, and/or stage 822 of collimating of the plurality of light beams. Referring to the examples set forth with respect to the previous drawings, stage 820 may be implemented by optical subunit 220. As aforementioned with respect to optical subunit 220, the optical subunit used for the transforming may include a plurality of optical elements having a common optical axis common to the plurality of optical elements. The common optical axis may be folded once or more, but this is not necessarily so.

Stage 830 of method 800 includes directing the plurality of transformed light beams onto a diffractive optical element at different angles of incidence. Referring to the examples set forth with respect to the previous drawings, stage 830 may be implemented by optical subunit 220. It is noted that the directing of stage 830 may be done by the same optical components used for executing stage 820 of transforming the plurality of light beams, or at least partly by other optical components.

Stage 840 of method 800 includes diffracting the plurality of transformed light beams by the diffractive optical element (DOE) to provide a plurality of light patterns.

Stage 840 of emitting includes stage 841 of emitting the plurality of light beams by a plurality of individual emitters which are positioned so that for each of the individual emitters there is at least one other individual emitter positioned at a distance which is smaller than any beam width of any transformed light beam out of the plurality of transformed light beams.

Figure 24:
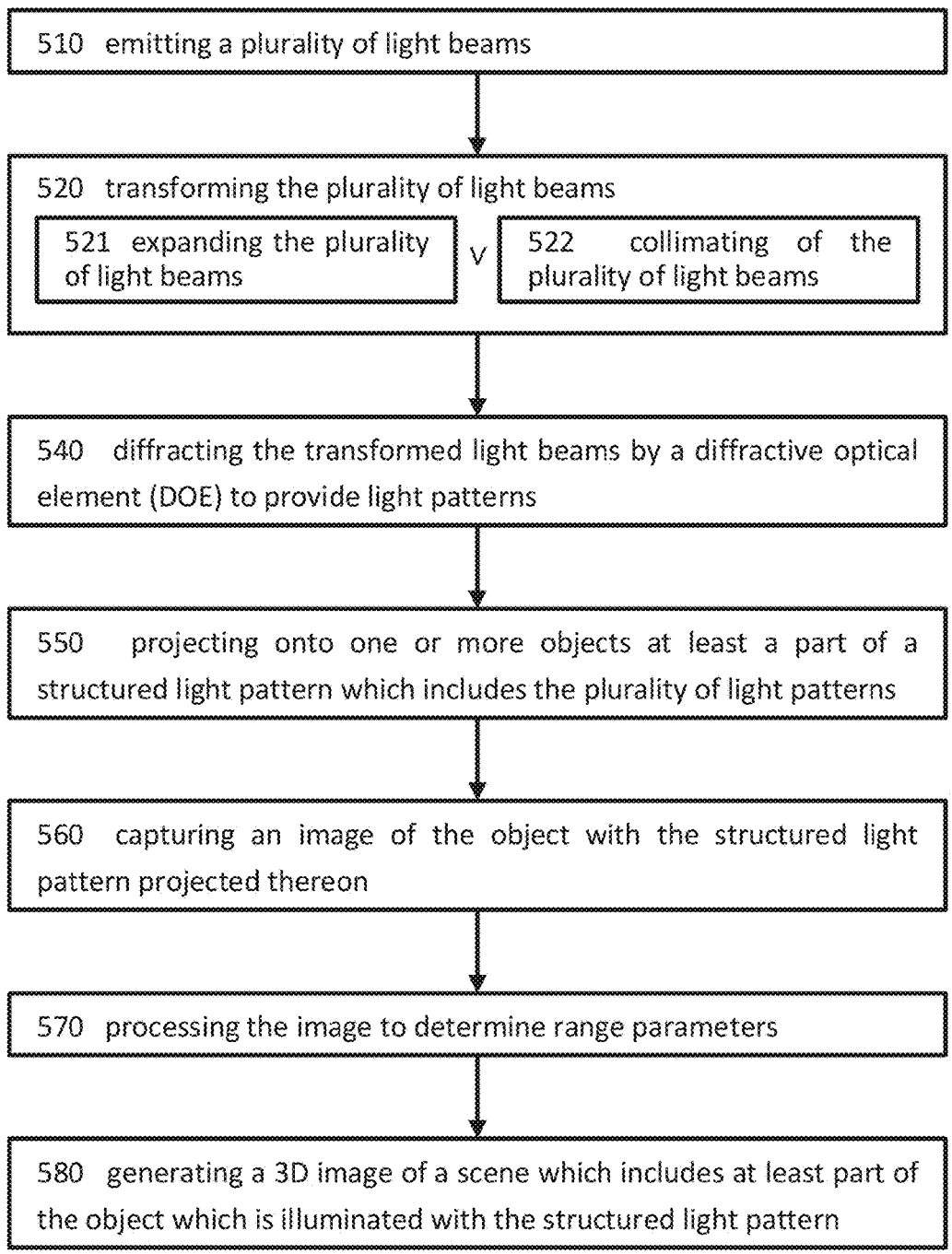

FIG. 24 is a flow chart illustrating an example of method 500, in accordance with examples of the presently disclosed subject matter. It is noted that stages 550, 560, 570 and 580 discussed below may be also included as part of methods 600, 700 and 800 (following stages 640, 740 and 840, respectively).

Method 500 may further include stage 550 of projecting onto one or more objects at least a part of a structured light pattern which includes the plurality of light patterns. Referring to the examples set forth with respect to the previous drawings, the projecting of stage 550 may be executed directly by the DOE (e.g. DOE 230), or by dedicated projecting optics (such as projecting optics 240).

Method 500 may further include stage 560 of capturing an image of the object with the structured light pattern projected thereon. Referring to the examples set forth with respect to the previous drawings, stage 560 may be implemented by imaging sensing unit 250.

Stage 560 may be followed by stage 570 of processing the image to determine range parameters. Referring to the examples set forth with respect to the previous drawings, stage 570 may be implemented by processing unit 260.

Optionally, stage 570 may be followed by stage 580 of generating a 3D image of a scene which includes at least part of the object which is illuminated with the structured light pattern. Referring to the examples set forth with respect to the previous drawings, the description of FIG. 15 may be applied, mutatis mutandis, to the process of stage 580.

Figure 25:
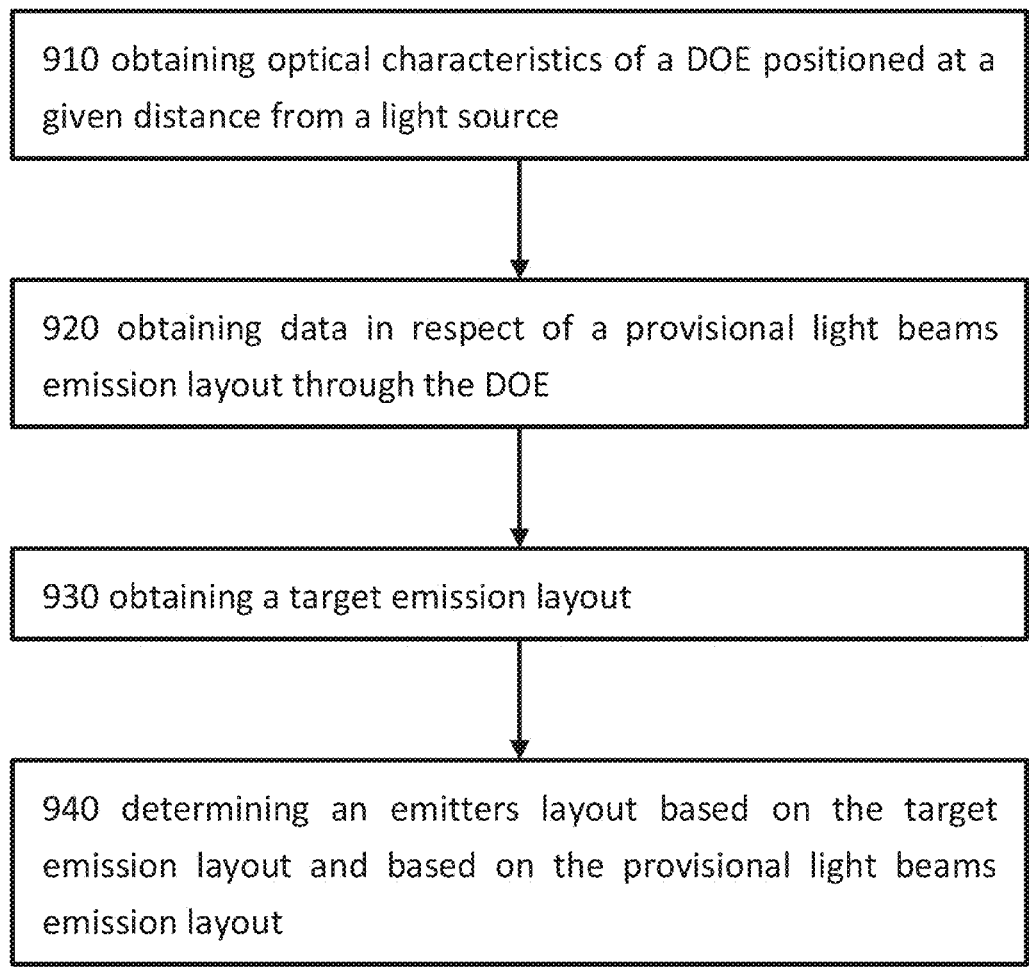
FIG. 25 is a flow chart illustrating an example of a method, in accordance with examples of the presently disclosed subject matter.

FIG. 25 is a flow chart illustrating an example of method 900, in accordance with examples of the presently disclosed subject matter. Method 900 may be used for determining an emitters layout. It is noted that method 900 may be used to determine an emitters layout for the emitter array of a system such as systems 200, 201, 202, 203, 204 and 205, and that any variation and optional implementation which was discussed with respect to any one of systems 200, 201, 202, 203, 204 and 205 may apply to the various stages of method 900, mutatis mutandis, where applicable.

Stage 910 of method 900 includes obtaining optical characteristics of a DOE positioned at a given distance from a light source. Referring to the examples set forth with respect to the previous drawings, the DOE may be DOE 230, and the light source may be emitter array 210.

Various kinds of optical characteristics may be obtained in various implementations of stage 910. Some examples of optical characteristics which may be obtained in stage 910 are: diffraction parameters of various areas on the DOE, size of the DOE, material of the DOE, shape of the DOE, and so on.

The obtaining of stage 910 may be executed in various ways. For example, stage 910 may include retrieving the optical characteristics from a database. For example, stage 910 may include retrieving the optical characteristics from a tangible data storage medium (e.g. a compact disk, a hard-drive, a magnetic tape, a random-access memory, and so on). For example, stage 910 may include obtaining the optical characteristics by measuring and/or otherwise examining the DOE. Other ways of obtaining the optical characteristics may also be implemented.

Stage 920 of method 900 includes obtaining data in respect of a provisional light beams emission layout through the DOE.

Various kinds of data in respect of a provisional light beams emission layout may be obtained in various implementations of stage 910. Some examples of data in respect of a provisional light beams emission layout which may be obtained in stage 920 are: distortion function of the DOE; distortion function of a combination of the DOE and connected optics (e.g. optical subunit 220 of system 220); design of the DOE, ray tracing simulation of light passing through the DOE, experimental result of light of the light source propagation through the DOE, and so on.

The obtaining of stage 920 may be executed in various ways. For example, stage 920 may include retrieving the data in respect of a provisional light beams emission layout from a database. For example, stage 920 may include retrieving the data in respect of a provisional light beams emission layout from a tangible data storage medium (e.g. a compact disk, a hard-drive, a magnetic tape, a random-access memory, and so on). For example, stage 920 may include obtaining the data in respect of a provisional light beams emission layout by simulating light propagation through the DOE. For example, stage 920 may include obtaining the data in respect of a provisional light beams emission layout by emitting light from a light source through the DOE and measuring light propagation through the DOE. Other ways of obtaining the optical characteristics may also be implemented.

Stage 930 of method 900 includes obtaining a target emission layout. Referring to the examples set forth with respect to the previous drawings, the target emission layout may be structured light pattern 150. Referring to the examples set forth with respect to the previous drawings, the target emission layout may be light pattern 140.

The obtaining of stage 930 may be executed in various ways. For example, stage 930 may include retrieving the target emission layout from a database. For example, stage 930 may include retrieving the target emission layout from a tangible data storage medium (e.g. a compact disk, a hard-drive, a magnetic tape, a random-access memory, and so on).

Stage 940 of method 900 includes determining an emitters layout based on the target emission layout and based on the provisional light beams emission layout. Referring to the examples set forth with respect to the previous drawings, the emitters layout determined in stage 940 may be an emitter layout according to which individual emitters 212 of emitter array 210 are arranged.

The determining of the emitters layout may include determining a 2D emitters layout (e.g. if a planar emission plane is used), and may also include determining a 3D emitters layout.

Optionally, stage 940 may include determining the emitters layout, such that light emitted by a light source positioned at the given distance from the DOE and having a plurality of emitters arranged according to the emitters layout is diffracted through the DOE is characterized by a layout (e.g. structured light, also referred below as the result structured light) that meets a target emission criterion that is based on the target emission layout.

For example, the target emission criterion (which may be a predefined criterion) may be that intensity differences between the intensity of the result structured light and the target emission layout at any point of the result structured light are below a certain (e.g. predefined) threshold, such as a certain percentage (say 90% or above. For example, the target emission criterion may be that the average intensity differences between the intensity of the result structured light and the target emission layout for the entire result structured light is below a certain (e.g. predefined) threshold, such as a certain percentage (say 90% or above).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. An optical system, comprising:
   an emitter array comprising a plurality of individual emitters, wherein each emitter in the emitter array is operable to emit a light beam;
   an optical subunit, operable to: (a) transform a plurality of light beams emitted by the emitter array, wherein the transformation includes expansion and/or collimation of the plurality of light beams; and (b) to direct the plurality of transformed light beams onto the diffractive optical element at different angles of incidence, resulting in providing of a plurality of light patterns by the diffractive optical element; and
   a diffractive optical element that is capable of diffracting the transformed light beams to provide light patterns;
   wherein for each individual emitter of the emitter array there is at least one other individual emitter of the emitter array positioned at a distance which is smaller than any beam width of any transformed light beam out of the plurality of transformed light beams.

2. The optical system according to claim 1, wherein the optical subunit comprises a plurality of optical elements having a common optical axis common to the plurality of optical elements.

3. The optical system according to claim 1, wherein the optical subunit is operable to transform the plurality of light beams to provide the plurality of transformed light beams is based on transforming optical components.

4. The optical system according to claim 1, wherein the emitter array and the optical subunit are positioned relative to one another such that the optical subunit further transform the plurality of light beams by deflecting the plurality of light beams so that the plurality of transformed light beams are projected onto the diffractive optical element at different angles of incidence, resulting in providing of a plurality of light patterns by the diffractive optical element.

5. The optical system according to claim 1, wherein a combination of the optical subunit and the diffractive optical element is characterized by a distortion function; wherein the plurality of individual emitters are arranged in a non-uniform configuration whose relation to a predefined uniform grid is an inverse function of the distortion function.

6. The optical system according to claim 1, wherein the plurality of individual emitters are positioned on a focal plane of the optical subunit.

7. The optical system according to claim 1, wherein each emitter in the emitter array is operable to emit a light beam which is characterized by a native beam width; wherein each of the transformed light beams is characterized by an expanded beam width that is wider than the native beam width of a corresponding light beam and is wider than a facilitating beam width.

8. The optical system according to claim 1, wherein the plurality of light patterns provided by the diffractive optical element are copies of a predetermined light pattern.

9. The optical system according to claim 8, wherein each provided copy of the predetermined light pattern partly overlaps at least one other provided copy of the predetermined light pattern, wherein the predetermined light pattern comprises multiple copies of a repeated subpattern, wherein in each provided copy of the predetermined light pattern at least one subpattern overlaps a subpattern of at least one other provided copy of the predetermined light pattern generated by light originating from another light emitter.

10. The optical system according to claim 8, further comprising an emitter array control system which is configured and operable to control activation of different subgroups of emitters of the emitter array, thereby resulting in providing of offset overall output patterns of the optical system at different times.

11. The optical system according to claim 1, wherein each emitter in the emitter array is operable to emit a light beam which is characterized by a native beam width; wherein each of the transformed light beams is characterized by an expanded beam width that is wider than the native beam width of a corresponding light beam, wherein the expanded beam widths of each of the plurality of transformed light beams is at least 3 times larger than the native beam width of the corresponding light beam.

12. The optical system according to claim 1, wherein for each individual emitter of the emitter array there is at least one other individual emitter of the emitter array positioned at a distance which is at least 10 times smaller than any beam-width of any transformed light beam out of the plurality of transformed light beams.

13. The optical system according to claim 1, wherein each emitter in the emitter array is operable to emit a light beam, out of the plurality of light beams, which is characterized by a first beam divergence; wherein the optical subunit is further operable to transform the plurality of light beams so that each of the transformed light beams is characterized by a second beam divergence that is smaller than the first beam divergence of the corresponding light beam.

14. The optical system according to claim 1, further comprising projection optics to image at least a part of a structured light pattern which comprises the plurality of light patterns onto an object, an imaging sensor adapted to capture an image of the object with the structured light pattern projected thereon, and a processing unit adapted to process the image to determine range parameters.

15. The optical system according to claim 1, wherein each emitter of the emitter array is a vertical-cavity surface-emitting laser emitter.

* * * * *